US012555931B2

(12) United States Patent
Papageorge et al.

(10) Patent No.: US 12,555,931 B2
(45) Date of Patent: Feb. 17, 2026

(54) MULTI-POLE ELECTRICAL WIRING DEVICES WITH WIRE TERMINATION ASSEMBLIES

(71) Applicant: Hubbell Incorporated, Shelton, CT (US)

(72) Inventors: Ryan Gene Papageorge, Shelton, CT (US); Thomas L. Scanzillo, Monroe, CT (US); Denny Lo, Bethlehem, CT (US); Scott Wurms, Shelton, CT (US); Roy J. Itzler, Orange, CT (US)

(73) Assignee: Hubbell Incorporated, Shelton, CT (US)

( * ) Notice: Subject to any disclaimer, the term of this patent is extended or adjusted under 35 U.S.C. 154(b) by 278 days.

(21) Appl. No.: 18/511,839

(22) Filed: Nov. 16, 2023

(65) Prior Publication Data

US 2024/0162633 A1 May 16, 2024

Related U.S. Application Data

(60) Provisional application No. 63/449,708, filed on Mar. 3, 2023, provisional application No. 63/449,692, filed (Continued)

(51) Int. Cl.

*H01R 4/48* (2006.01)
*H01R 4/26* (2006.01)

(Continued)

(52) U.S. Cl.

CPC ........... *H01R 4/48365* (2023.08); *H01R 4/26* (2013.01); *H01R 4/48185* (2023.08);

(Continued)

(58) Field of Classification Search

CPC .. H01R 4/48365; H01R 4/26; H01R 4/48185; H01R 4/4821; H01R 4/48455;

(Continued)

(56) References Cited

U.S. PATENT DOCUMENTS

| | | | |
|---|---|---|---|
| 1,994,880 | A | 3/1935 | Wallbillich |
| 2,015,858 | A | 10/1935 | Leviton |

(Continued)

FOREIGN PATENT DOCUMENTS

| | | |
|---|---|---|
| CA | 981354 | 1/1976 |
| CA | 1202095 | 3/1986 |

(Continued)

OTHER PUBLICATIONS

International Preliminary Report on Patentability in related International Application No. PCT/US2023/080134 mailed May 30, 2025. (13 pages).

(Continued)

*Primary Examiner* — Abdullah A Riyami
*Assistant Examiner* — Nader J Alhawamdeh
(74) *Attorney, Agent, or Firm* — Wissing Miller LLP

(57) ABSTRACT

Multi-pole or multi-phase electrical wiring devices that incorporate clamp-type wire termination assemblies are described. The electrical wiring devices include multi-pole motor switches. The electrical wiring devices include a plurality of wire termination assemblies. Each wire termination assembly includes a wire terminal and an activating member.

43 Claims, 36 Drawing Sheets

Related U.S. Application Data on Mar. 3, 2023, provisional application No. 63/449,700, filed on Mar. 3, 2023, provisional application No. 63/425,891, filed on Nov. 16, 2022.

(51) Int. Cl.
*H01R 9/24* (2006.01)
*H01R 13/514* (2006.01)

(52) U.S. Cl.
CPC ....... *H01R 4/4821* (2023.08); *H01R 4/48455* (2023.08); *H01R 9/2416* (2013.01); *H01R 13/514* (2013.01); *H01R 4/489* (2013.01)

(58) Field of Classification Search
CPC .... H01R 9/2416; H01R 13/514; H01R 4/489; H01R 9/24; H01R 4/4816; H01R 4/4833; H01H 3/08; H01H 71/1009; H01H 1/20
See application file for complete search history.

(56) References Cited

U.S. PATENT DOCUMENTS

| | | | | |
|---|---|---|---|---|
| 2,082,994 | A | 6/1937 | Wallbillich | |
| 2,163,722 | A | 6/1939 | Wallbillich | |
| 2,175,098 | A | 10/1939 | Wertzheiser | |
| 2,201,743 | A | 5/1940 | Peterson | |
| 2,201,751 | A | 5/1940 | Wertzheiser | |
| 2,238,386 | A | 4/1941 | Frank | |
| 2,463,033 | A | 3/1949 | Harnett | |
| 2,466,930 | A | 4/1949 | Cook | |
| 2,506,212 | A | 5/1950 | Cook | |
| 2,556,491 | A | 6/1951 | DeLorenzo | |
| 2,763,847 | A | 9/1956 | Hubbell | |
| 2,952,831 | A | 9/1960 | Ehrlich | |
| 3,431,546 | A | 3/1969 | Averill | |
| 3,439,315 | A | 4/1969 | Hamel et al. | |
| 3,660,728 | A | 5/1972 | Carter | |
| 3,713,071 | A | 1/1973 | Poliak et al. | |
| 3,740,613 | A | 6/1973 | Strachan | |
| 3,793,607 | A | 2/1974 | Smith et al. | |
| 3,891,293 | A | 6/1975 | Jones | |
| 3,904,266 | A | 9/1975 | Fitzpatrick | |
| 3,944,314 | A | 3/1976 | Weitzman | |
| 3,945,711 | A | 3/1976 | Hohorst et al. | |
| 3,999,829 | A | 12/1976 | Glaesel | |
| 4,060,305 | A | 11/1977 | Poliak et al. | |
| 4,099,826 | A | 7/1978 | Mazzeo et al. | |
| 4,172,628 | A | 10/1979 | Lingaraju | |
| 4,241,498 | A | 12/1980 | Brandeau | |
| 4,255,655 | A | 3/1981 | Kikuchi | |
| 4,286,836 | A | 9/1981 | Rumps | |
| 4,296,987 | A | 10/1981 | Lingaraju | |
| 4,372,693 | A | 2/1983 | Lutz | |
| 4,537,560 | A | 8/1985 | Emeterio et al. | |
| 4,748,431 | A | 5/1988 | Saunders et al. | |
| 4,749,368 | A | 6/1988 | Mouissie | |
| 4,759,726 | A | 7/1988 | Naylor et al. | |
| 4,767,340 | A | 8/1988 | Hohorst | |
| 4,768,981 | A | 9/1988 | Hohorst | |
| 4,793,823 | A | 12/1988 | Cozzens et al. | |
| 4,886,472 | A | 12/1989 | Tsai | |
| 4,995,829 | A | 2/1991 | Geib et al. | |
| 5,015,201 | A | 5/1991 | Brezee et al. | |
| 5,057,649 | A | 10/1991 | Ring | |
| 5,138,296 | A | 8/1992 | Borchardt et al. | |
| 5,151,642 | A | 9/1992 | Lombardi | |
| 5,181,310 | A | 1/1993 | Josephson | |
| 5,262,749 | A | 11/1993 | Kopelman | |
| 5,494,456 | A | 2/1996 | Kozel et al. | |
| 5,637,011 | A | 6/1997 | Meyerhoefer et al. | |
| 5,685,735 | A | 11/1997 | Hohorst | |
| 5,810,625 | A | 9/1998 | Klein | |
| 5,825,602 | A | 10/1998 | Tosaka et al. | |
| 5,866,844 | A | 2/1999 | Osterbrock et al. | |
| 5,975,938 | A | 11/1999 | Libby | |
| 5,975,940 | A | 11/1999 | Hartmann et al. | |
| 5,995,350 | A | 11/1999 | Kopelman | |
| 6,049,143 | A | 4/2000 | Simpson et al. | |
| 6,146,217 | A | 11/2000 | Osada | |
| 6,172,586 | B1 * | 1/2001 | Ferree | H01H 71/08 439/810 |
| 6,315,597 | B1 | 11/2001 | Coyne et al. | |
| 6,336,824 | B1 | 1/2002 | Sorig | |
| 6,368,149 | B1 | 4/2002 | Schmidt et al. | |
| 6,388,216 | B1 | 5/2002 | Puhalla et al. | |
| 6,406,323 | B2 | 6/2002 | Chung Long Shan | |
| 6,474,678 | B1 | 11/2002 | Ryan | |
| 6,477,021 | B1 | 11/2002 | Haun et al. | |
| 6,689,955 | B2 | 2/2004 | Doutaz | |
| 6,707,652 | B2 | 3/2004 | Engel | |
| 6,712,641 | B2 | 3/2004 | Beege et al. | |
| 6,743,029 | B1 | 6/2004 | Greene et al. | |
| 6,750,402 | B2 | 6/2004 | Geske | |
| 6,786,779 | B2 | 9/2004 | Feldmeier et al. | |
| 6,802,747 | B1 | 10/2004 | Orange | |
| 6,814,608 | B2 | 11/2004 | Kollmann | |
| 6,827,602 | B2 | 12/2004 | Greene et al. | |
| 6,861,189 | B1 | 3/2005 | Greene et al. | |
| 6,893,286 | B2 | 5/2005 | Drewes et al. | |
| 6,926,543 | B2 | 8/2005 | Poh et al. | |
| 6,943,310 | B2 | 9/2005 | Eisenhower | |
| 6,948,846 | B2 | 9/2005 | Engel | |
| 7,052,335 | B2 | 5/2006 | Matsuura et al. | |
| 7,097,518 | B2 | 8/2006 | Kraemer et al. | |
| 7,103,968 | B2 | 9/2006 | Karrasch | |
| 7,114,986 | B1 | 10/2006 | Toly | |
| 7,115,001 | B1 | 10/2006 | Brockman et al. | |
| 7,118,404 | B2 | 10/2006 | Ploesser | |
| 7,140,887 | B2 | 11/2006 | Poh et al. | |
| 7,150,646 | B2 | 12/2006 | Trumper | |
| 7,164,082 | B2 | 1/2007 | Kurek | |
| 7,175,485 | B1 | 2/2007 | Alderson et al. | |
| 7,238,043 | B2 | 7/2007 | Reibke et al. | |
| 7,241,188 | B2 | 7/2007 | Lin et al. | |
| 7,249,963 | B2 | 7/2007 | Ramm | |
| 7,270,581 | B2 | 9/2007 | Tiberio | |
| 7,507,106 | B2 | 3/2009 | Keswani et al. | |
| 7,544,103 | B2 | 6/2009 | Walter et al. | |
| 7,547,226 | B2 | 6/2009 | Koessler | |
| 7,651,363 | B2 | 1/2010 | Koellmann | |
| 7,704,095 | B2 | 4/2010 | Stromiedel | |
| 7,704,106 | B2 | 4/2010 | Koellmann | |
| 7,780,470 | B2 * | 8/2010 | Benoit | H01R 25/00 439/535 |
| 7,815,463 | B2 | 10/2010 | Gerberding | |
| 7,845,970 | B2 | 12/2010 | Stromiedel | |
| 7,909,664 | B2 | 3/2011 | Ilkhanov | |
| 7,963,812 | B2 | 6/2011 | Ilkhanov | |
| 8,047,883 | B2 | 11/2011 | Montalbano et al. | |
| 8,137,145 | B2 | 3/2012 | Joy | |
| 8,251,738 | B2 | 8/2012 | Heckert et al. | |
| 8,292,677 | B2 | 10/2012 | Gassauer | |
| 8,328,588 | B2 | 12/2012 | Ramm et al. | |
| 8,388,387 | B2 | 3/2013 | Koellmann | |
| 8,408,952 | B2 | 4/2013 | Wu | |
| 8,480,424 | B2 | 7/2013 | Koellmann et al. | |
| 8,535,084 | B2 | 9/2013 | Koellmann | |
| 8,632,355 | B2 | 1/2014 | Hartmann | |
| 8,794,994 | B2 | 8/2014 | Koellmann et al. | |
| 8,998,634 | B2 | 4/2015 | Koellmann | |
| 9,124,034 | B2 | 9/2015 | Koellmann et al. | |
| 9,130,285 | B2 | 9/2015 | Scanzillo et al. | |
| 9,209,530 | B2 | 12/2015 | Gassauer et al. | |
| 9,246,242 | B2 | 1/2016 | Scanzillo et al. | |
| 9,287,638 | B2 | 3/2016 | Germani | |
| 9,331,427 | B2 | 5/2016 | Tedeschi | |
| 9,413,082 | B2 | 8/2016 | Gassauer | |
| 9,466,895 | B2 | 10/2016 | Kollmann et al. | |
| 9,466,911 | B1 | 10/2016 | Wu | |
| 9,478,874 | B2 | 10/2016 | Stolze | |
| 9,502,790 | B2 | 11/2016 | Kollmann et al. | |
| 9,525,219 | B2 | 12/2016 | Kollmann et al. | |
| 9,543,700 | B2 | 1/2017 | Kollmann et al. | |

(56) References Cited

U.S. PATENT DOCUMENTS

| | | | | |
|---|---|---|---|---|
| 9,601,844 | B2 | 3/2017 | Gassauer et al. | |
| 9,614,301 | B2 | 4/2017 | Ludewig et al. | |
| 9,614,302 | B2 | 4/2017 | Harwath et al. | |
| 9,761,964 | B2 | 9/2017 | Meyer | |
| 9,799,997 | B2 | 10/2017 | Scanzillo et al. | |
| 9,812,822 | B2 | 11/2017 | Scanzillo et al. | |
| 9,842,408 | B2 | 12/2017 | Milne et al. | |
| 10,131,061 | B2 | 11/2018 | Krans et al. | |
| 10,141,674 | B2 | 11/2018 | Scanzillo et al. | |
| 10,427,201 | B2 | 10/2019 | Bungter et al. | |
| 10,431,950 | B2 | 10/2019 | Rzasa et al. | |
| 10,461,444 | B2 | 10/2019 | Scanzillo et al. | |
| 10,630,036 | B2 | 4/2020 | Rzasa et al. | |
| 10,637,165 | B2 | 4/2020 | Scanzillo et al. | |
| 10,965,042 | B2 | 3/2021 | Scanzillo et al. | |
| 10,992,067 | B2 | 4/2021 | Geske et al. | |
| 11,063,396 | B2 | 7/2021 | Iaconis et al. | |
| 11,495,895 | B2 | 11/2022 | Scanzillo et al. | |
| 11,563,281 | B2 | 1/2023 | Scanzillo et al. | |
| 12,184,026 | B2 | 12/2024 | Villard et al. | |
| 2004/0077210 | A1 | 4/2004 | Kollmann | |
| 2004/0248457 | A1 | 12/2004 | Walter | |
| 2005/0042912 | A1 | 2/2005 | Drewes et al. | |
| 2005/0090159 | A1 | 4/2005 | Luther et al. | |
| 2005/0212646 | A1 | 9/2005 | Watchorn et al. | |
| 2006/0028316 | A1 | 2/2006 | Fabian et al. | |
| 2006/0288140 | A1 | 12/2006 | Lin | |
| 2007/0006558 | A1 | 1/2007 | Ramm | |
| 2007/0026701 | A1 | 2/2007 | Kurek et al. | |
| 2007/0207662 | A1 | 9/2007 | Germani | |
| 2007/0238348 | A1 | 10/2007 | Kopelman | |
| 2010/0186234 | A1 | 7/2010 | Binder | |
| 2010/0304596 | A1 | 12/2010 | Ilkhanov | |
| 2010/0304597 | A1 | 12/2010 | Ilkhanov | |
| 2011/0207361 | A1 | 8/2011 | Heckert et al. | |
| 2014/0227914 | A1 | 8/2014 | Tedeschi | |
| 2015/0257636 | A1 | 9/2015 | Kohler | |
| 2015/0314434 | A1 | 11/2015 | Bevins, Jr. | |
| 2016/0036173 | A1* | 2/2016 | Scanzillo | H01R 4/48 439/682 |
| 2018/0198216 | A1* | 7/2018 | Scanzillo | H01R 4/48455 |
| 2019/0160643 | A1 | 5/2019 | Lefavour et al. | |
| 2019/0221951 | A1 | 7/2019 | Lotkemann et al. | |
| 2020/0235541 | A1 | 7/2020 | Rzasa | |
| 2021/0203087 | A1 | 7/2021 | Scanzillo et al. | |
| 2023/0074084 | A1* | 3/2023 | He | H01H 83/04 |
| 2023/0299507 | A1* | 9/2023 | Scanzillo | H01R 4/48 439/816 |
| 2023/0299508 | A1* | 9/2023 | Scanzillo | H01R 4/483 439/816 |
| 2023/0299509 | A1* | 9/2023 | Scanzillo | H05K 5/0247 439/816 |
| 2023/0299510 | A1* | 9/2023 | Scanzillo | H01R 13/504 439/709 |
| 2023/0299511 | A1* | 9/2023 | Scanzillo | H01R 4/4833 439/816 |
| 2024/0162632 | A1* | 5/2024 | Itzler | H01R 4/4821 |
| 2024/0162633 | A1* | 5/2024 | Papageorge | H01R 9/24 |
| 2024/0162634 | A1* | 5/2024 | Scanzillo | H01R 4/48365 |

FOREIGN PATENT DOCUMENTS

| | | |
|---|---|---|
| CA | 1203591 | 4/1986 |
| CA | 2939110 | 8/2015 |
| CA | 2996306 | 3/2017 |
| CN | 101051711 A | 10/2007 |
| CN | 201233969 | 5/2009 |
| CN | 101807756 | 8/2010 |
| CN | 202564566 | 11/2012 |
| CN | 103606765 | 2/2014 |
| CN | 103682774 | 3/2014 |
| CN | 103840294 | 6/2014 |
| CN | 205004486 | 1/2016 |
| CN | 205016755 | 2/2016 |
| DE | 102015119247 | 5/2017 |
| EP | 0131425 | 2/1991 |
| EP | 1553660 | 7/2005 |
| EP | 1490928 | 10/2005 |
| EP | 1608039 | 12/2005 |
| FR | 2312767 | 12/1976 |
| GB | 2272799 | 5/1994 |
| GB | 2292850 | 3/1996 |
| GB | 2393043 | 3/2004 |
| JP | 61014529 | 1/1986 |
| WO | 97003480 | 1/1997 |
| WO | 2017035469 | 3/2017 |
| WO | 2017035518 | 3/2017 |
| WO | 2017125441 | 7/2017 |

OTHER PUBLICATIONS

International Preliminary Report on Patentability in related International Application No. PCT/US2023/080163 mailed May 30, 2025. (16 pages).

International Preliminary Report on Patentability in related International Application No. PCT/US2023/080143 mailed May 30, 2025. (16 pages).

International Search Report and Written Opinion in corresponding International Application No. PCT/US23/80151 mailed on Apr. 4, 2024.

International Search Report and Written Opinion in related International Application No. PCT/US23/80143 mailed on Apr. 4, 2024.

Rockwell Automation 194E IEC Switch Disconnect 4 4 Pole, Jul. 2001 (1 page).

Wago Cage Clamp Tech Brochure, Sep. 2010 (22 pages).

Hubbell Disconnect Sw Brochure, Apr. 2013 (2 pages).

Marinco Power Products, Straight Blade Clamp-Lock (TM) Devices (15A & 20A), 2016 (3 pages).

Rockwell Automation 194E IEC Switch Disconnect 5 Specs May 2017 (26 pages).

Rockwell Automation 194E IEC Switch Disconnect 7 Brochure, Sep. 2017 (2 pages).

Hubbell Circuit Lock Brochure Wiring WLBDS003, Jun. 2018 (12 pages).

Lex Connector Power Conn Brochure, 2019 (12 pages).

Rockwell Automation 194E IEC Switch Disconnect 3 4 Pole, Jul. 2020 (2 pages).

Rockwell Automation 194E IEC Switch Disconnect 2, Nov. 2020 (2 pages).

Rockwell Automation 194E IEC Switch Disconnect 6 Specs, Nov. 2021 (14 pages).

International Search Report and Written Opinion in related International Application No. PCT/US2023/080134 mailed on Mar. 22, 2024. (13 pages).

International Search Report and Written Opinion in related PCT Application No. PCT/US2023/080163 dated May 9, 2024 (17 pages).

International Preliminary Report on Patentability in corresponding PCT Application No. PCT/US23/80151 dated Dec. 6, 2024 (42 pages).

* cited by examiner

Fig. 37
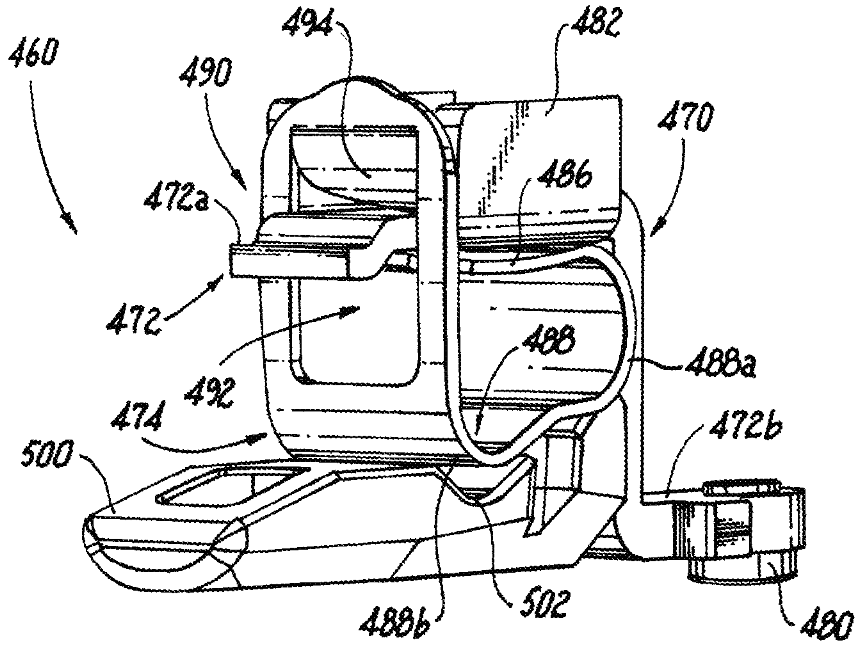
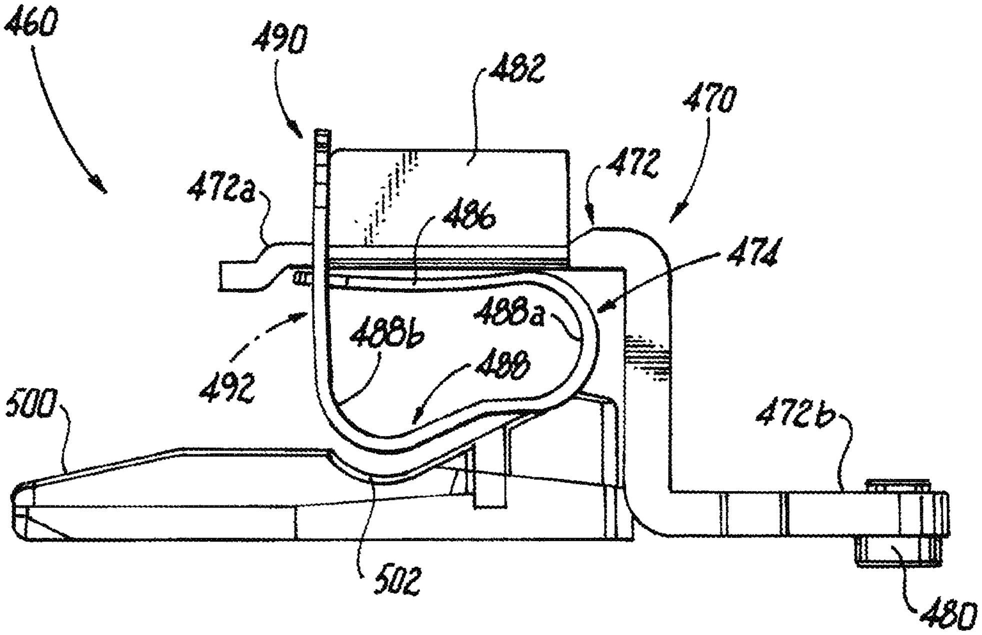
Fig. 38

MULTI-POLE ELECTRICAL WIRING DEVICES WITH WIRE TERMINATION ASSEMBLIES

CROSS-REFERENCE TO RELATED APPLICATIONS

The present application is based on and claims benefit from U.S. Provisional Patent Application No. 63/425,891 filed on Nov. 16, 2023 entitled "Multi-Pole Electrical Wiring Devices with Wire Termination Assemblies", and from U.S. Provisional Application No. 63/449,692 filed on Mar. 3, 2023 entitled "Multi-Pole Electrical Wiring Devices with Wire Termination Assemblies" and from U.S. Provisional Application No. 63/449,700 filed on Mar. 3, 2023 entitled "Multi-Pole Electrical Wiring Devices with Wire Termination Assemblies" and from U.S. Provisional Application No. 63/449,708 filed on Mar. 3, 2023 entitled "Multi-Pole Electrical Wiring Devices with Wire Termination Assemblies" the contents of each are incorporated herein in their entirety by reference.

BACKGROUND

Field

The present disclosure relates generally to wire termination assemblies for multi-phase or multi-pole electrical wiring devices, and more particularly to screwless wire termination assemblies for use in multi-pole or multi-phase disconnect switches.

Description of the Related Art

Present electrical wire terminations in many electrical wiring devices are either direct pressure type terminations or screw and clamp type terminations. In direct pressure type terminations, a terminal screw is tightened directly against an electrical wire to press the wire against a fixed plate. In screw and clamp type terminations, a wire is inserted between a fixed plate and a movable plate, and a terminal screw is tightened so that the wire is clamped between the plates. Screw terminations increase the time it takes to install the electrical wiring devices, especially multi-pole electrical wiring devices where two or more wires have to be connected to the wiring device. For example, for three-phase electrical motors, are typically controlled by a motor disconnect switch. Current motor disconnect switches are typically terminated using threaded fasteners, e.g., screws, that are sensitive to torque requirements to achieve proper wire termination strength. Additionally, the screw terminations may loosen when the motor disconnect switch is subjected to vibrations.

SUMMARY

The present disclosure provides embodiments of various multi-pole or multi-phase electrical wiring devices, including, but not limited to, motor disconnect switches and load control switches. An exemplary embodiment of a multi-pole electrical wiring device includes a main housing and at least one wire attachment assembly. The main housing has an interior that is at least partially hollow. The at least one wire attachment assembly is attachable to the main housing. The at least one wire attachment assembly includes an assembly housing and at least one wire termination assembly. The assembly housing is at least partially hollow. The assembly housing includes at least one wire receiving opening providing access from an exterior of the assembly housing to the hollow portion of the assembly housing, and at least one activating member opening providing access from an exterior of the assembly housing to the hollow portion of the assembly housing. The at least one wire termination assembly is positioned at least partially in the hollow portion of the assembly housing. When the at least one wire attachment assembly is attached to the main housing, at least a portion of the at least one wire termination assembly is positioned in the hollow portion of the interior of the main housing. The at least one wire termination assembly includes a wire terminal and an activating member. The wire terminal includes a clamp brace connected to a clamping member. The clamping member is movable between a closed position where a wire can be clamped between the clamping member and the clamp brace, and an open position where the wire can be inserted, through the at least one wire receiving opening in the assembly housing and between the clamping member and the clamp brace. The clamping member may include one or more wire press members where the wire can be clamped between the wire press member and the clamp brace instead of between the clamping member and the clamp brace. Preferably, the clamping member can clamp the wire with a force that is substantially perpendicular to a longitudinal axis of the wire. The activating member extends at least partially through the at least one activating member opening in the assembly housing. The activating member is interactive with the clamping member such that movement of the activating member in a first direction causes the activating member to apply a mechanical load to the clamping member. Applying a mechanical load to the clamping member causes the clamping member to move from the closed position to the open position. Movement of the activating member in a second direction removes the mechanical load from the clamping member so that the clamping member moves from the open position to the closed position.

Another exemplary embodiment of a multi-pole electrical wiring device includes a main housing and a plurality of wire attachment assemblies. The main housing has an interior that is at least partially hollow. The plurality of wire attachment assemblies are attachable to the main housing. Each of the plurality of wire attachment assemblies includes an assembly housing and a plurality of wire termination assemblies. The assembly housing has a plurality of cavities, a plurality of wire receiving openings and a plurality of activating member openings. In this embodiment, one of the plurality of wire receiving openings and one of the plurality of activating member openings provides access from an exterior of the assembly housing to one of the plurality of cavities. In this embodiment, one of the plurality of wire termination assemblies is positioned at least partially the one of the plurality of cavities. Each of the plurality of wire termination assemblies includes a wire terminal and an activating member. The wire terminal includes a clamp brace connected to a clamping member. The clamping member is movable between a closed position where a wire can be clamped between the clamping member and the clamp brace, and an open position where the wire can be inserted through the one of the plurality of wire receiving openings in the housing and between the clamping member and the clamp brace. The clamping member may include one or more wire press members, where a wire can be clamped between the wire press member and the clamp brace instead of between the clamping member and the clamp brace. Preferably, the clamping member can clamp the wire with a force that is substantially perpendicular to a longitudinal axis of the wire. The activating member extends at least partially through the one of the plurality of activating member openings in the assembly housing. The activating member is interactive with the clamping member such that movement of the activating member in a first direction causes the activating member to apply a mechanical load to the clamping member. Applying a mechanical load to the clamping member causes the clamping member to move from the closed position to the open position. Movement of the activating member in a second direction, removes the mechanical load from the clamping member so that the clamping member moves from the open position to the closed position.

For the embodiments above, the clamping member may be a biasing member. A non-limiting example of a biasing member is a spring. Further, for the embodiments above, movement of the activating member in the second direction may be opposite the movement of the activating member in the first direction. Movement of the activating member in the first direction and the second direction may be parallel to the clamp brace. Movement of the activating member in the first direction and the second direction may be linear. However, movement of the activating member in the first direction and the second direction may be one of linear movement or motion, rotational movement or motion, torque movement or motion, pivotable movement or motion and twist movement or motion. Movement of the activating member in the first and second directions may be relative to the clamping member. And, movement of the activating member in the first direction may be outward relative to the housing and movement of the activating member in the second direction may be inward relative to the housing.

Another exemplary embodiment of a multi-pole electrical wiring device includes a main housing, a line side wire attachment assembly and a load side wire attachment assembly. The main housing has an interior that is at least partially hollow. The line side wire attachment assembly is attachable to the main housing and the load side wire attachment assembly is attachable to the main housing. The line side wire attachment assembly includes an assembly housing and a plurality of wire termination assemblies. The assembly housing has a plurality of cavities, a plurality of wire receiving openings and a plurality of activating member openings. In this exemplary embodiment, one of the plurality of wire receiving openings and one of the plurality of activating member openings provides access from an exterior of the assembly housing to one of the plurality of cavities. In this exemplary embodiment, one of the plurality of wire termination assemblies is positioned at least partially the one of the plurality of cavities. Each of the plurality of line side wire termination assemblies includes a wire terminal and an activating member. The wire terminal includes a clamp brace connected to a clamping member. The clamping member is movable between a closed position where a wire can be clamped between the clamping member and the clamp brace, and an open position where the wire can be inserted through the one of the plurality of wire receiving openings in the housing and between the clamping member and the clamp brace. The clamping member may include one or more wire press members, where a wire can be clamped between the wire press member and the clamp brace instead of between the clamping member and the clamp brace, Preferably, the clamping member can clamp the wire with a force that is substantially perpendicular to a longitudinal axis of the wire. The activating member extends at least partially through the one of the plurality of activating member openings in the assembly housing. The activating member is interactive with the clamping member such that movement of the activating member in a first direction causes the activating member to apply a mechanical load to the clamping member. Applying a mechanical load to the clamping member causes the clamping member to move from the closed position to the open position. Movement of the activating member in a second direction removes the mechanical load from the clamping member so that the clamping member moves from the open position to the closed position.

Each load side wire attachment assembly includes a wire terminal and an activating member. The wire terminal includes a clamp brace connected to a clamping member. The clamping member is movable between a closed position where a wire can be clamped between the clamping member and the clamp brace, and an open position where the wire can be inserted through the one of the plurality of wire receiving openings in the housing and between the clamping member and the clamp brace. The clamping member may include one or more wire press members, where a wire can be clamped between the wire press member and the clamp brace instead of between the clamping member and the clamp brace, Preferably, the clamping member can clamp the wire with a force that is substantially perpendicular to a longitudinal axis of the wire. The activating member extends at least partially through the one of the plurality of activating member openings in the assembly housing. The activating member is interactive with the clamping member such that movement of the activating member in a first direction causes the activating member to apply a mechanical load to the clamping member. Applying a mechanical load to the clamping member causes the clamping member to move from the closed position to the open position. Movement of the activating member in a second direction removes the mechanical load from the clamping member so that the clamping member moves from the open position to the closed position.

Another exemplary embodiment of a multi-pole electrical wiring device includes a main housing, a line side wire attachment assembly and a load side wire attachment assembly. The main housing has an interior that is at least partially hollow. The line side wire attachment assembly is attachable to the main housing and the load side wire attachment assembly is attachable to the main housing. The line side wire attachment assembly includes an assembly housing and a plurality of wire termination assemblies. The assembly housing has a plurality of cavities, a plurality of wire receiving openings and a plurality of activating member openings. In this exemplary embodiment, one of the plurality of wire receiving openings and one of the plurality of activating member openings provides access from an exterior of the assembly housing to one of the plurality of cavities. In this exemplary embodiment, one of the plurality of wire termination assemblies is positioned at least partially the one of the plurality of cavities. Each of the line side wire termination assemblies includes a wire terminal and an activating member. The wire terminal includes a clamp brace connected to a clamping member. The clamping member is movable between a closed position where a wire can be clamped between the clamping member and the clamp brace, and an open position where the wire can be inserted between the clamping member and the clamp brace. The clamping member may include one or more wire press members, where a wire can be clamped between the wire press member and the clamp brace instead of between the clamping member and the clamp brace. Preferably, the clamping member can clamp the wire with a force that is substantially perpendicular to a longitudinal axis of the wire. The activating member extends at least partially through the one of the plurality of activating member openings in the assembly housing. The activating member is interactive with the clamping member such that movement of the activating member in a first direction from a first position to a second position causes the activating member to move the clamping member from the closed position to the open position. Movement of the activating member in a second direction permits the clamping member to automatically move from the open position to the closed position. In this exemplary embodiment, the activating member can remain in the first position or the second position until manually moved.

Each load side wire attachment assembly includes an assembly housing and a plurality of wire termination assemblies. The assembly housing has a plurality of cavities, a plurality of wire receiving openings and a plurality of activating member openings. In this exemplary embodiment, one of the plurality of wire receiving openings and one of the plurality of activating member openings provides access from an exterior of the assembly housing to one of the plurality of cavities. In this exemplary embodiment, one of the plurality of wire termination assemblies is positioned at least partially the one of the plurality of cavities. Each of the plurality of load side wire termination assemblies includes a wire terminal and an activating member. The wire terminal includes a clamp brace connected to a clamping member. The clamping member is movable between a closed position where a wire can be clamped between the clamping member and the clamp brace, and an open position where the wire can be inserted between the clamping member and the clamp brace. The clamping member may include one or more wire press members, where a wire can be clamped between the wire press member and the clamp brace instead of between the clamping member and the clamp brace. Preferably, the clamping member can clamp the wire with a force that is substantially perpendicular to a longitudinal axis of the wire. The activating member extends at least partially through the one of the plurality of activating member openings in the housing. The activating member is interactive with the clamping member such that movement of the activating member in a first direction from a first position to a second position causes the activating member to move the clamping member from the closed position to the open position. Movement of the activating member in a second direction permits the clamping member to automatically move from the open position to the closed position. In this exemplary embodiment, the activating member may remain in the first position or the second position until manually moved.

For each of the embodiments contemplated by the present disclosure, the clamping member for the line side wire termination assemblies and the load side wire termination assemblies may be a biasing member. A non-limiting example of a biasing member is a spring. Further, for each of the embodiments contemplated by the present disclosure, movement of the activating member for the line side wire termination assemblies and the load side wire termination assemblies in the second direction may be opposite the movement of the activating member in the first direction. Movement of the activating member for the line side wire termination assemblies and the load side wire termination assemblies in the first direction and the second direction may be parallel to the clamp brace. Movement of the activating member for the line side wire termination assemblies and the load side wire termination assemblies in the first direction and the second direction may be linear. However, movement of the activating member for the line side wire termination assemblies and the load side wire termination assemblies in the first direction and the second direction may be one of linear movement or motion, rotational movement or motion, torque movement or motion, pivotable movement or motion and twist movement or motion. Movement of the activating member for the line side wire termination assemblies and the load side wire termination assemblies in the first and second directions may be relative to the clamping member. And, movement of the activating member for the line side wire termination assemblies and the load side wire termination assemblies in the first direction may be outward relative to the housing and movement of the activating member in the second direction may be inward relative to the housing.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 37 is a perspective view of one of the wire termination assemblies of FIG. 34;

FIG. 38 is a side elevation view of the wire termination assembly of FIG. 37;

DETAILED DESCRIPTION

Figure 1:
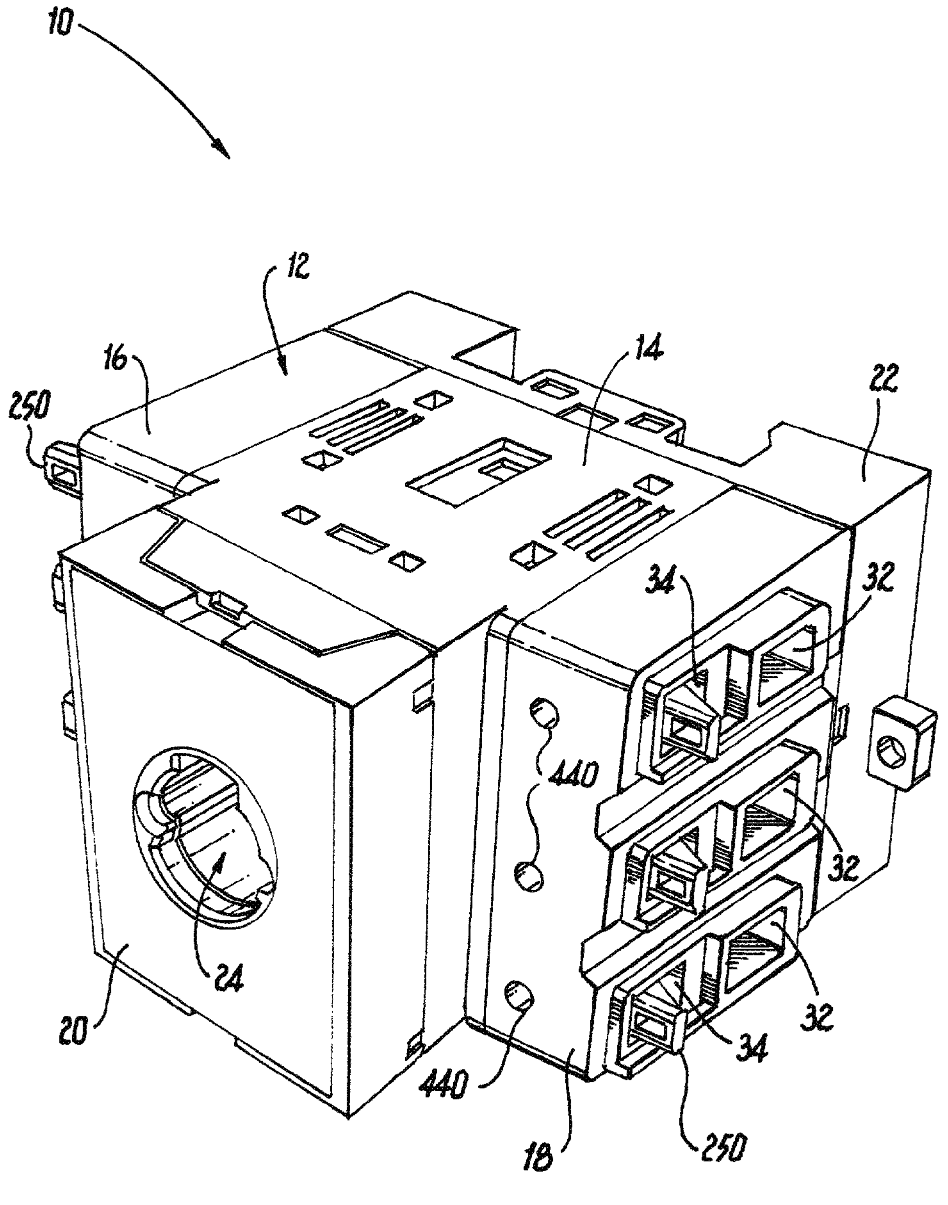
FIG. 1 is a top perspective view of an exemplary embodiment of a multi-pole electrical wiring device according to the present disclosure, including an exemplary embodiment of a wire termination assemblies according to the present disclosure.
Figure 2:
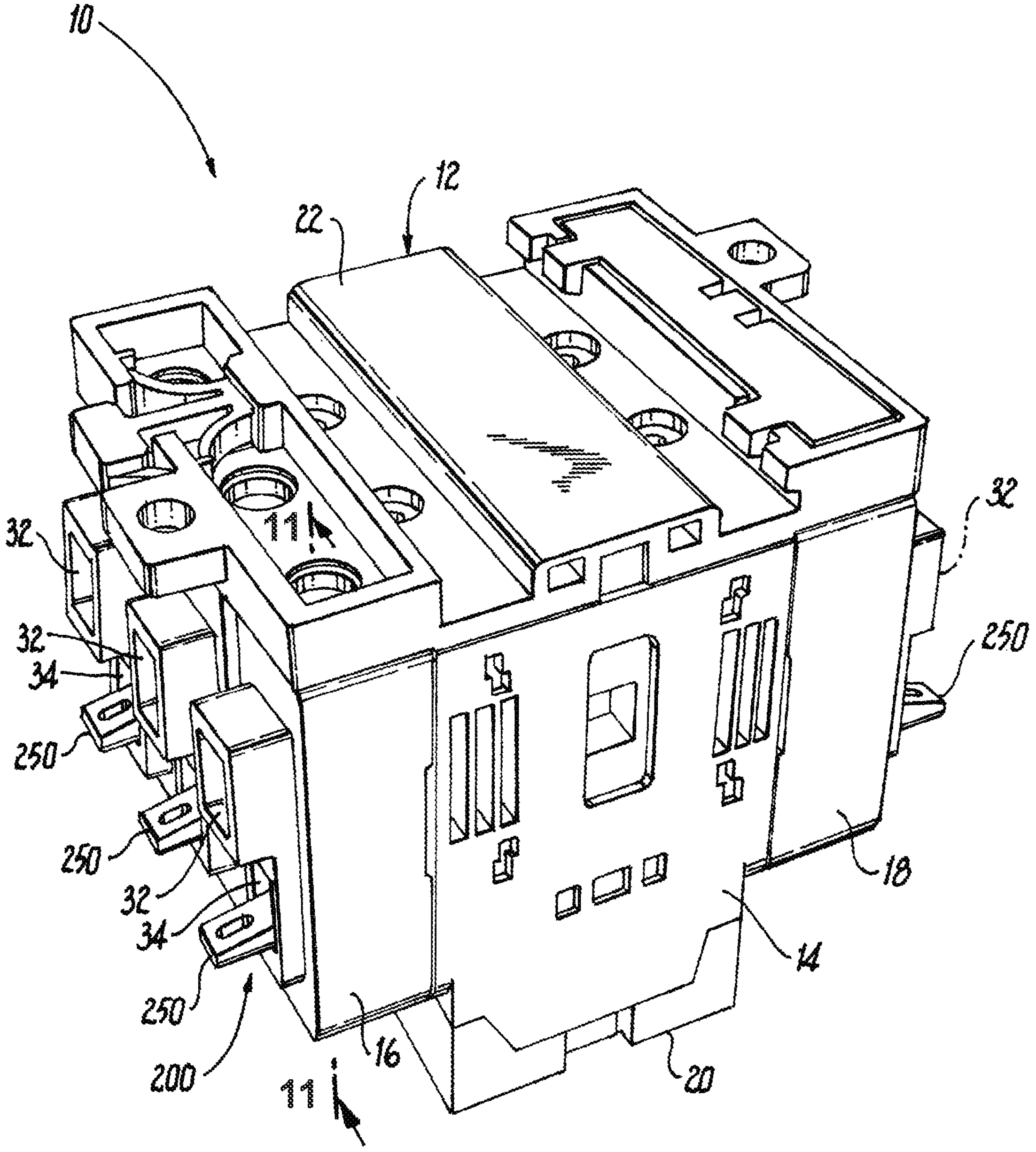
FIG. 2 is a bottom perspective view of the multi-pole electrical wiring device of FIG. 1.

Exemplary embodiments of multi-pole or multi-phase electrical wiring devices that incorporate the wire termination assemblies and/or wire attachment assemblies according to the present disclosure are shown and described. Non-limiting examples of the multi-pole or multi-phase electrical wiring devices contemplated by the present disclosure include motor disconnect switches and load control switches. In some embodiments, the motor disconnect switches may include one or more auxiliary disconnect switches.

For ease of description, the multi-pole or multi-phase electrical wiring devices contemplated by the present disclosure may also be referred to herein as the "electrical wiring devices" in the plural and the "electrical wiring device" in the singular. For ease of description, the wire termination assemblies may also be referred to herein as the "wire terminations" or the "terminations" in the plural and the "wire termination" or the "termination" in the singular. In addition, the electrical conductors may also be referred to as the "wires" in the plural and the "wire" in the singular. Further, the electrical conductors can be any size wire used to conduct electricity, such as 14 AWG wire, 12 AWG wire, 10 AWG wire or 8 AWG wire. Generally, 14 AWG wires are rated for between 15 and 18 amps, 12 AWS wires are rated for between 20 and 25 amps, 10 AWG wires are rated for between 25 and 30 amps, 8 AWG wires are rated for between 35 and 40 amps, and 6 AWG wires are rated for between 45 and 50 amps.

In the exemplary embodiment shown in FIGS. 1-5, the electrical wiring device may be a multi-pole switch, e.g., a three-pole switch. In the exemplary embodiment shown in FIGS. 6 and 7, the multi-pole or multi-phase electrical wiring device combines the multi-pole switch of FIGS. 1-5 with an auxiliary switch. For ease of description, the multi-pole switch may also be referred to herein as the "switch" in the singular and the "switches" in the plural. The switches and auxiliary switches contemplated may be used to control the operation of multi-phase motors, e.g., three-phase motors.

Figure 3:
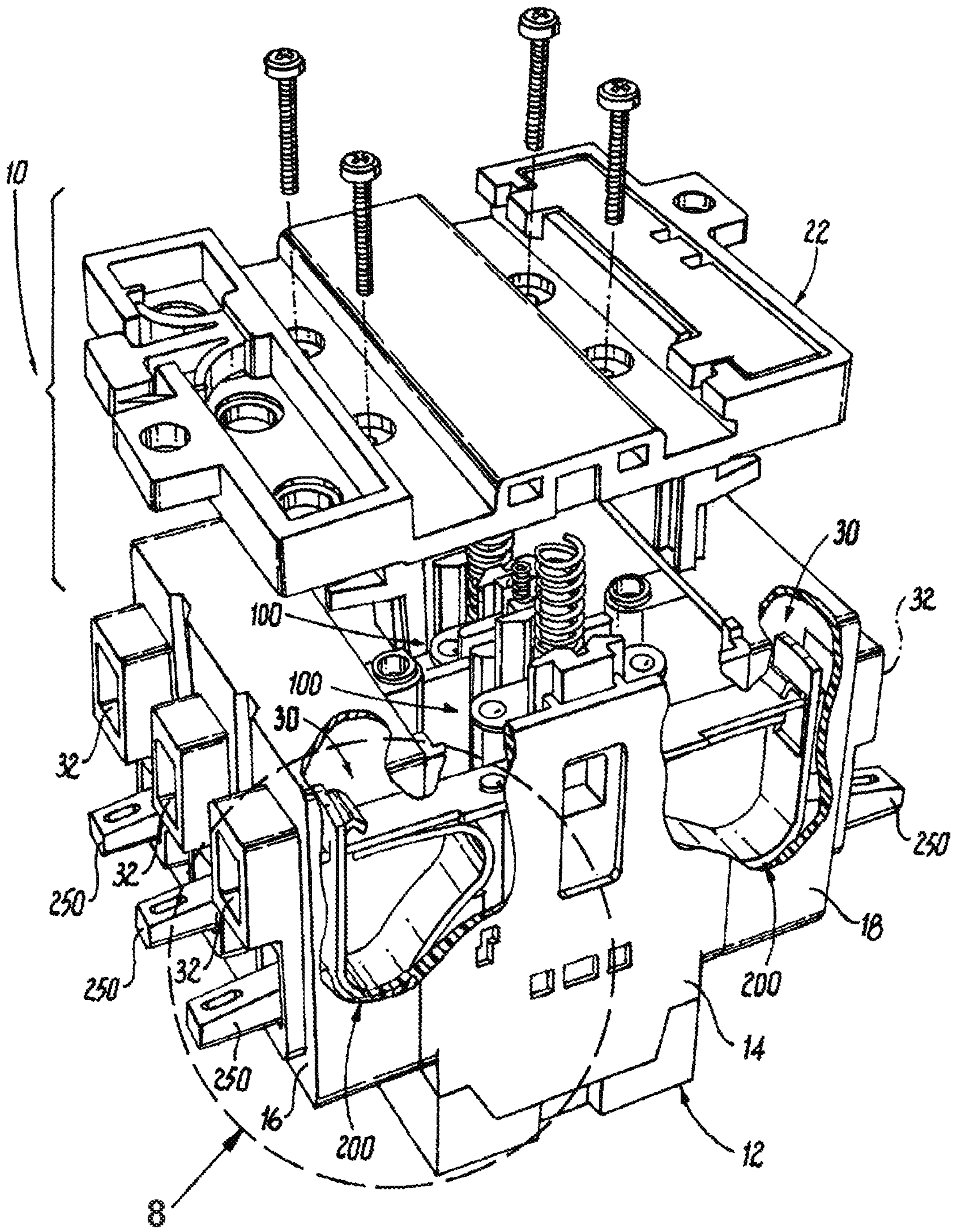
FIG. 3 is an exploded bottom perspective view of the multi-pole electrical wiring device of FIG. 2, illustrating the wire termination assemblies within the multi-pole electrical wiring device.
Figure 4:
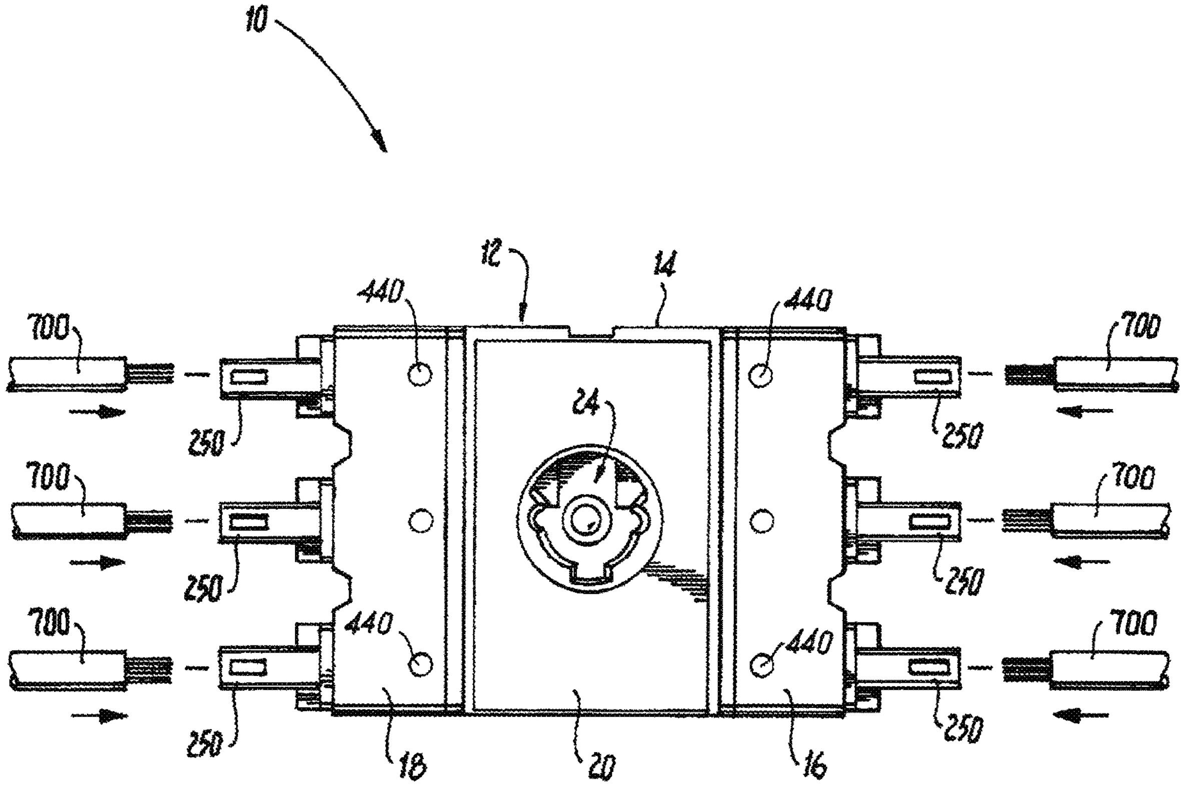
FIG. 4 is a top plan view of the multi-pole electrical wiring device of FIG. 1, illustrating a plurality of wires staged for insertion into the wire termination assemblies within the multi-pole electrical wiring device.

Referring to the exemplary embodiment of FIGS. 1-5, the switch 10 has a housing 12 that includes a main body portion 14, a pair of wire attachment portions 16 and 18, a top portion 20 and a base 22. The housing 12 is preferably made of suitably rigid electrical insulating materials, such as plastic materials, including injection molded thermoplastic materials, such as Nylon, and can be a standalone unit or configured to fit within an electrical enclosure. Within the main body portion 14 of the housing 12 are the components that perform the make and break functions of the switch 10. A non-limiting example of the components within the main body portion that perform the make and break functions of the switch 10 are included in, for example, the HBLDS3RS Disconnect Switch sold by Hubbell Incorporated, which is incorporated herein in its entirety by reference. Generally, the main portion 14 includes a plurality of spring loaded switch contacts 100, seen in FIG. 3, that are accessible when the base 22 is removed from the housing 12. Each switch contact 100 acts as a jumper between corresponding pairs of wire termination assemblies 200 positioned at least partially within and accessible from the wire attachment portions 16 and 18. The top portion 20 of the housing 12 includes an on-off control assembly 24. The on-off control assembly 24 is operatively coupled to the switch contacts 100 such that the on-off control assembly 24 moves the switch contacts 100 between make and break positions. Each wire attachment portion 16 and 18 is secured to or integrally formed into the main body portion 14. In the exemplary embodiment shown, each wire attachment portion 16 and 18 includes one or more wire termination chambers or cavities 30 seen in FIG. 3, one or more wire receiving openings 32 and one or more activating member openings 34, seen in FIGS. 1 and 2. Each wire termination chamber or cavity 30 is configured to receive and position a wire terminal assembly 200 within the wire attachment portion 16 or 18, as shown in FIG. 3. In this configuration, one of the one or more wire receiving openings 32 and one of the one or more activating member openings 34 provide access from an exterior of the housing to one of the one or more wire termination chambers or cavities 30.

Figure 5:
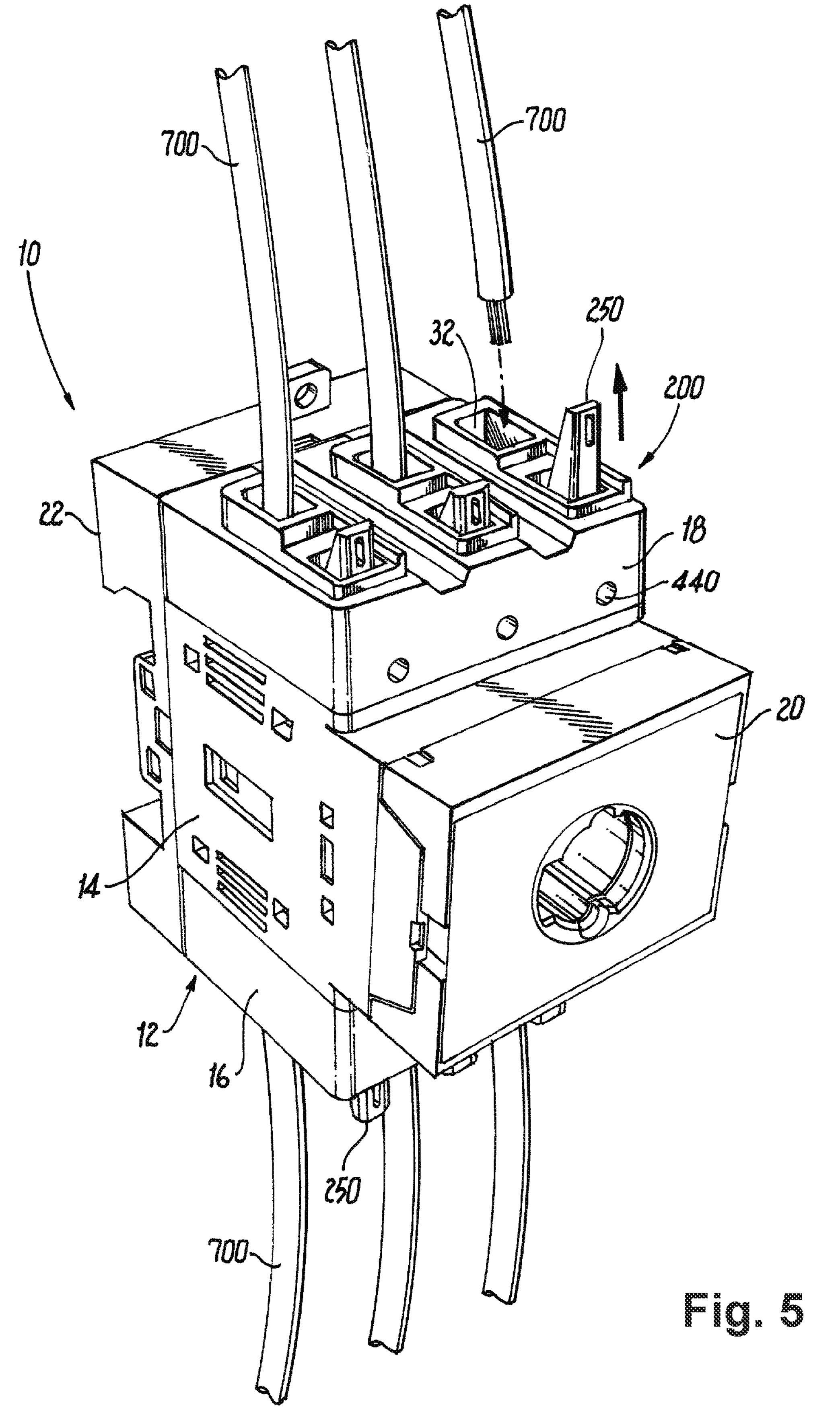
FIG. 5 is another top perspective view of the multi-pole electrical wiring device of FIG. 1, illustrating electrical wires connected to the wire termination assemblies within the multi-pole electrical wiring device, and an electrical wire staged for insertion into a wire termination assembly within the multi-pole electrical wiring device.
Figure 6:
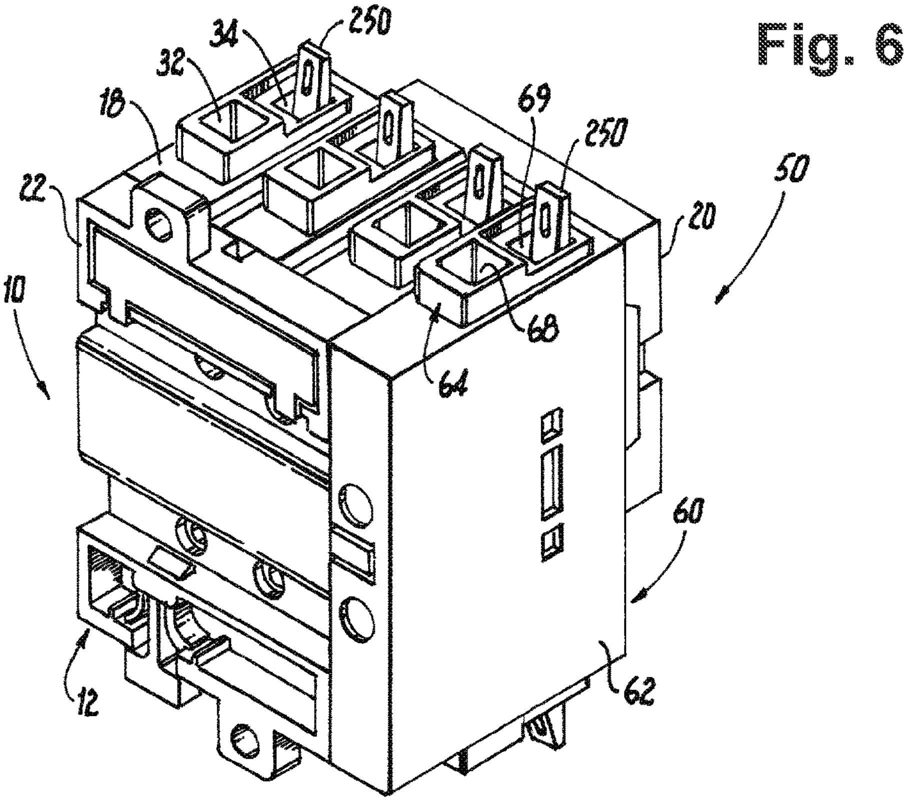
FIG. 6 is a bottom perspective view of another exemplary embodiment of a multi-pole electrical wiring device according to the present disclosure, illustrating a main electrical wiring device and an auxiliary electrical wiring device attached to the main electrical wiring device.
Figure 7:
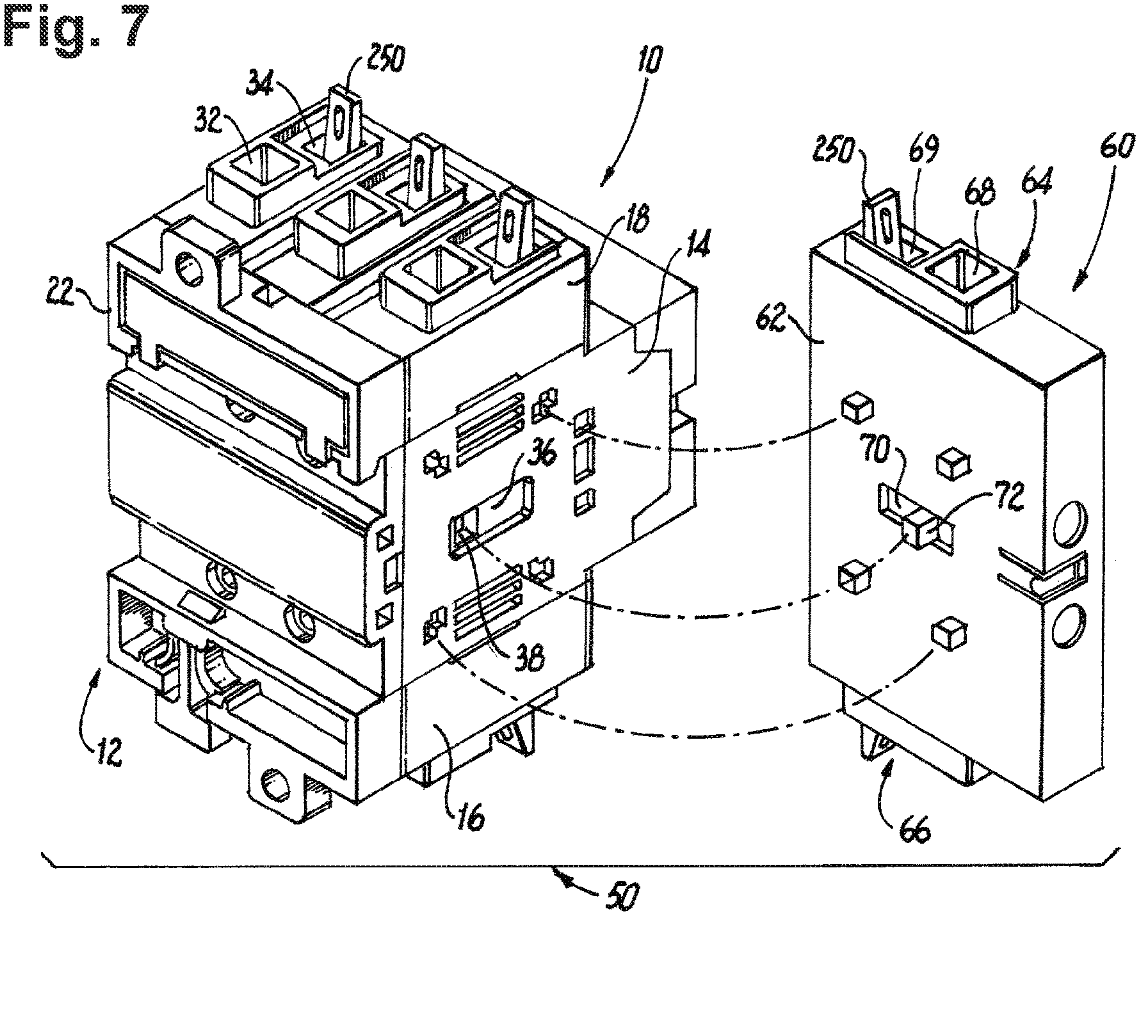
FIG. 7 is an exploded bottom perspective view of the electrical wiring device of FIG. 6, illustrating the auxiliary electrical wiring device separated from the main electrical wiring device.

Referring to the exemplary embodiment of FIGS. 6 and 7, the multi-pole or multi-phase electrical wiring device is a switch 50 that combines the multi-pole switch 10 of FIGS. 1-5 and one or more auxiliary switches 60. In the embodiment shown, there is a single auxiliary switch shown. The auxiliary switch 60 has a housing 62 that includes a pair of wire attachment portions 64 and 66. The housing 62 is preferably made of suitably rigid electrical insulating materials, such as plastic materials, including injection molded thermoplastic materials, such as Nylon, and can be a stand-alone unit or configured to fit within an electrical enclosure. Within the housing 62 are the components that perform the make and break functions of the switch 60. A non-limiting example of the components within the housing 62 that perform the make and break functions of the switch 60 are included in, for example, the HBLAC2 Auxiliary Disconnect Switch sold by Hubbell Incorporated, which is incorporated herein in its entirety by reference. Generally, housing 62 includes a spring loaded switch contact (not shown) that is similar to the switch contacts 100, seen in FIG. 3 and described above. The switch contact 100 acts as jumper between corresponding pairs of wire termination assemblies 200 positioned at least partially within the wire attachment portions 64 and 66, similar to that shown in FIG. 3. To move the switch contact between the make and break positions, a switch arm lever 70 is operatively coupled to the components within the housing 62 that perform the make and break functions of the switch 60. More specifically, the main body 14 of the housing 12 of the switch 10 has auxiliary trigger arm 36 operatively coupled to the components in the main body 14 of the housing 12 that are the components that perform the make and break functions of the switch 10. The auxiliary trigger arm 36 has a recess 38 that is accessible from an exterior of the main body 14 of the housing 12, as seen in FIG. 7. In addition, the switch arm lever 70 includes a tab 72 extending from the housing 62, as seen in FIG. 7. The tab 72 is configured and dimensioned to be received in the recess 38 of the auxiliary trigger arm 36 so that when the switch 10 is in the make position the auxiliary trigger arm 36 causes the switch arm lever 70 to move the switch contact within the housing 62 to a make position, and when the switch 10 is in the break position the auxiliary trigger arm 36 causes the switch arm lever 70 to move the switch contact within the housing 62 to a break position.

Continuing to refer to FIGS. 6 and 7, the housing 62 includes one or more chambers or cavities (not shown) that are similar to the chambers or cavities 30 described above. Each chamber or cavity is configured to receive and position a wire termination assembly 200 within the housing 62. Each wire attachment portion 64 and 66 is secured to or integrally formed into the housing 62 and includes a wire receiving opening 68 and an activating member opening 69. In this configuration, one of the plurality of wire receiving openings 68 and one of the plurality of activating member openings 69 provide access from an exterior of the housing 62 to one of the plurality of chambers or cavities within the housing 62. Each wire terminal assembly 200 is configured to receive and clamp a wire, such as wire 700 shown in FIG. 5, to the switch 60, and to mate with the switch contact of the switch 60.

Figure 8:
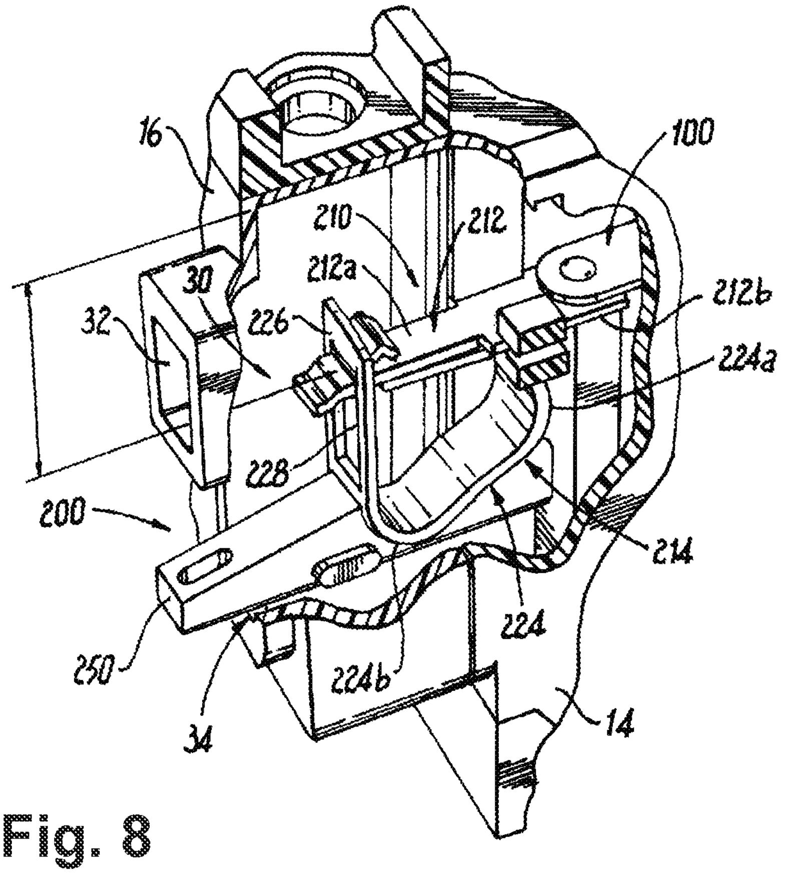
FIG. 8 is an enlarged perspective view of a portion of the electrical wiring device of FIG. 3 taken from detail 8, illustrating a wire termination assembly within the electrical wiring device.
Figure 9:
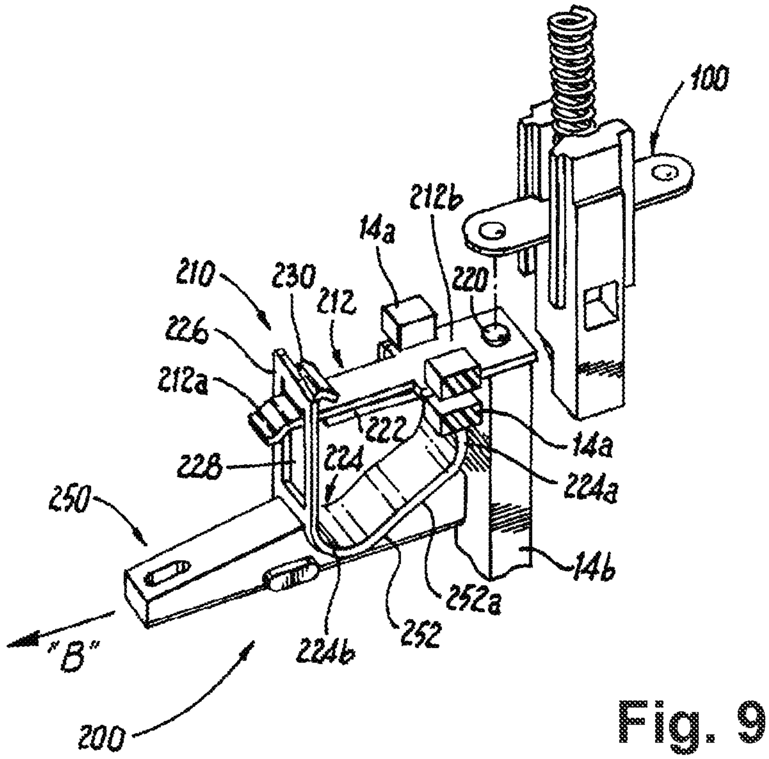
FIG. 9 is a perspective view of the exemplary embodiment of the wire termination assemblies incorporated into the electrical wiring device of FIG. 8.
Figure 10:
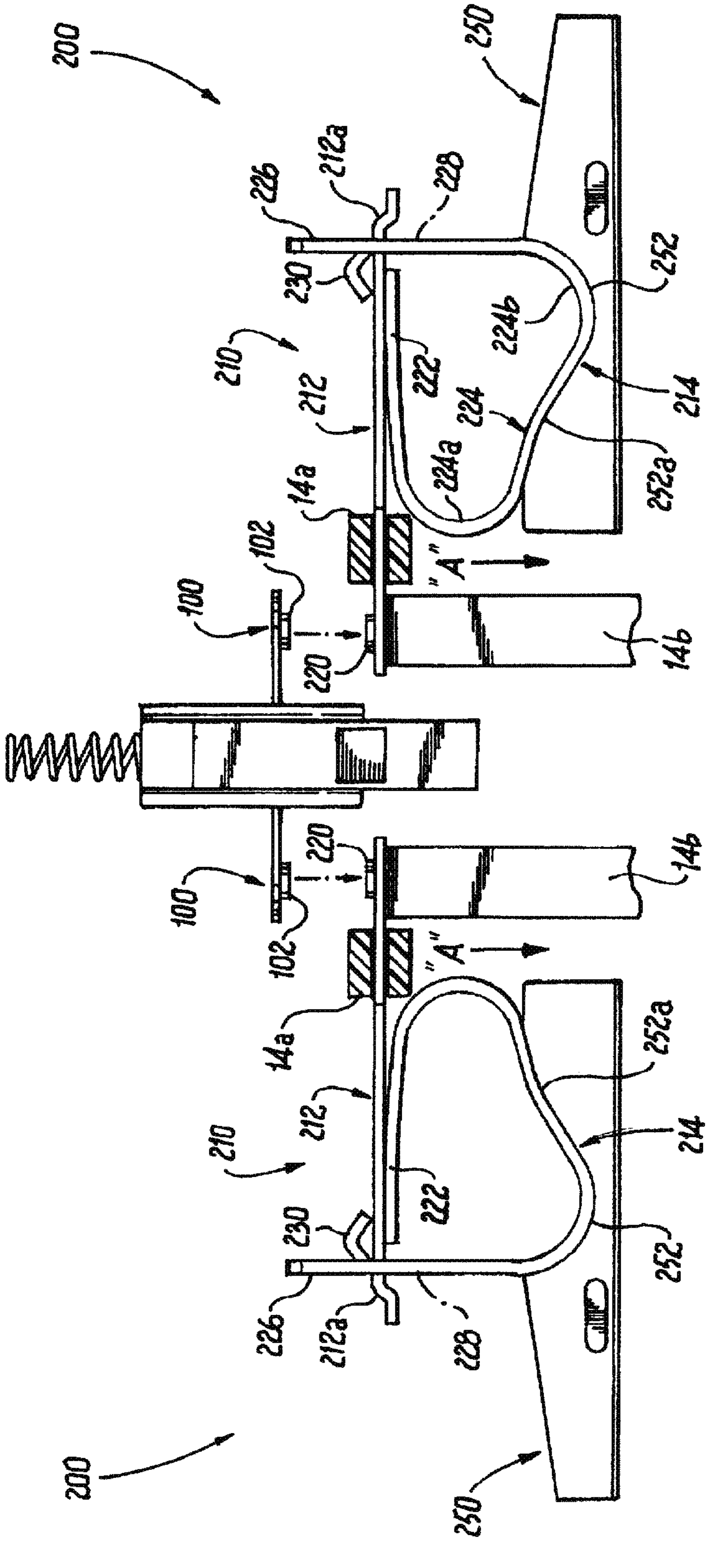
FIG. 10 is a side elevation view of two wire termination assemblies within the electrical wiring device of FIG. 3, which when in a closed position form an electrically conductive path between wires connected to the two wire termination assemblies.

Turning to FIGS. 8-10, an exemplary embodiment of a wire termination assembly 200 according to the present disclosure is shown. Each wire termination assembly 200 is configured to receive and clamp a wire, such as wire 700 shown in FIG. 5, to the switch 10, and to mate with the switch contacts 100 of the switch 10. In the exemplary embodiment shown, the wire termination assembly 200 includes a wire terminal 210 and an activating member 250. The wire terminal 210 is at least partially made of an electrically conductive material, such as brass, copper or aluminum. In an exemplary embodiment, at least a portion of the wire terminal 210 is made of a resilient material with sufficient stiffness to flex when a mechanical load is applied and return to its normal position when the mechanical load is removed. An example of such a resilient material is spring steel. The wire terminal 210 can be formed as a unitary or monolithic structure, or the wire terminal 210 can be individual components mechanically fitted together, e.g., clipped together, or secured together by, for example, a solder joints, a brazed joints, or a welded joints. The activating member 250 is preferably made of suitably rigid electrical insulating materials, such as plastic materials. Non-limiting examples of plastic materials include injection molded thermoplastic materials, such as Nylon. The activating member 250 may also be referred to herein as a "plunger" in the singular and "plungers" in the plural.

Continuing to refer to FIGS. 8-10, the wire terminal 210 is a mechanical clamping terminal that may use one or more clamping members 214 that can deflect under a mechanical load applied by the plunger 250 and recover to their initial shape when the mechanical load is removed. The energy stored by the one or more clamping members 214 should be sufficient to apply a constant and continuous force to mechanically secure one or more wires, e.g., wires 700 shown in FIGS. 4 and 5, to the wire terminal 210. In the exemplary configuration shown in FIGS. 8-10, the wire terminal 210 includes a clamp brace 212 and a clamping member 214. The clamp brace 212 is an electrically conductive fixed terminal body that may be a substantially planar shaped member or an arcuate shaped member having a first end 212*a* secured to the clamping member 214. The clamp brace 212 may be secured to the clamping member 214 by, for example, mechanically fitting, e.g., clipping, the clamp brace 212 to the clamping member 214, or a solder joint, a brazed joint, or a welded joint. The clamp brace 212 has a second end 212*b* that extends from the wire attachment portion 16 or 18 into the main body portion 14 of the housing 12. Preferably, the second end 212*b* of the clamp brace 212 is fixed or secured to the main body portion 14 of the housing 12 to limit and possibly prevent flexing of the second end 212*b* of the clamp brace 212 during operation of the switch 10. In an exemplary embodiment, a portion of the second end 212*b* of the clamp brace 212 may be positioned within slots on a portion 14*a* of the main body portion 14. Further, a portion of the second end 212*b* of the clamp brace 212 may rest on or be secured to a wall 14*b* within the main body portion 14 of the housing, as shown in FIG. 10. By resting the second end 212*b* of the clamp brace 212 on or securing the second end 212*b* of the clamp brace 212 to the wall 14*b*, flexing of the second end 212*b* of the clamp brace 212 in the direction of arrow "A" is limited or possibly prevented. The second end 212*b* of the clamp brace 212 may include an electrical contact pad 220 that is configured and dimensioned to contact an electrical contact pad 102 on the switch contact 100, as shown in FIG. 10.

Figure 11:
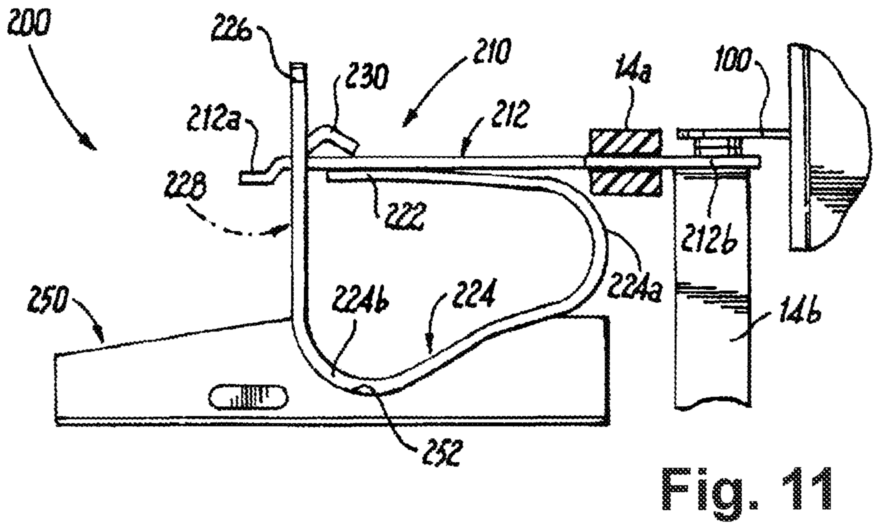
FIG. 11 is the side elevation view of one of the wire termination assemblies of FIG. 10, illustrating the wire termination assembly in a closed position.
Figure 12:
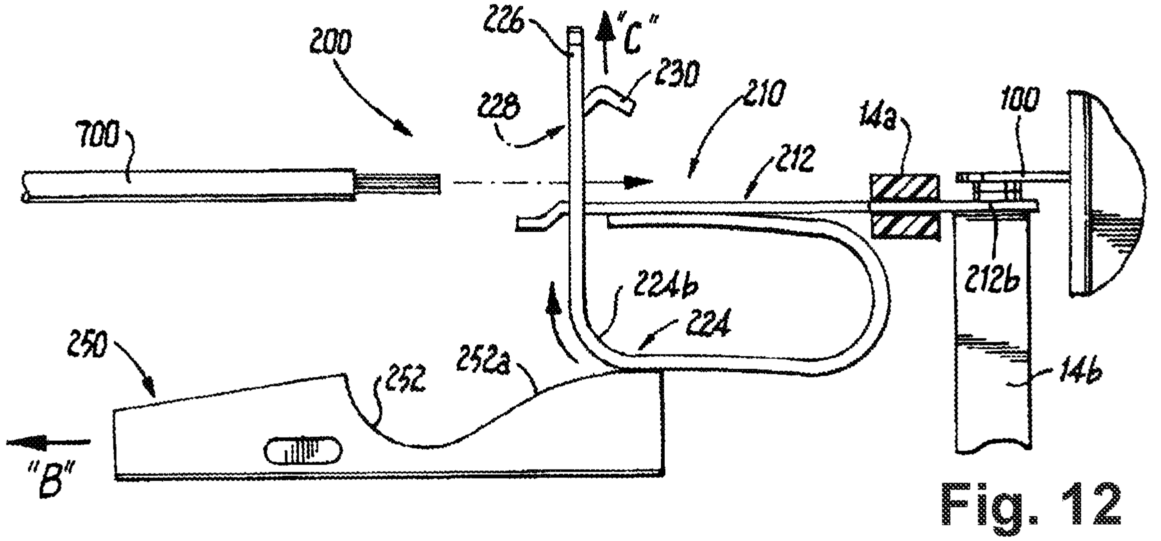
FIG. 12 is the side elevation view of the wire termination assembly of FIG. 11, illustrating the wire termination assembly in an open position and an electrical wire being inserted into the wire termination assembly.
Figure 13:
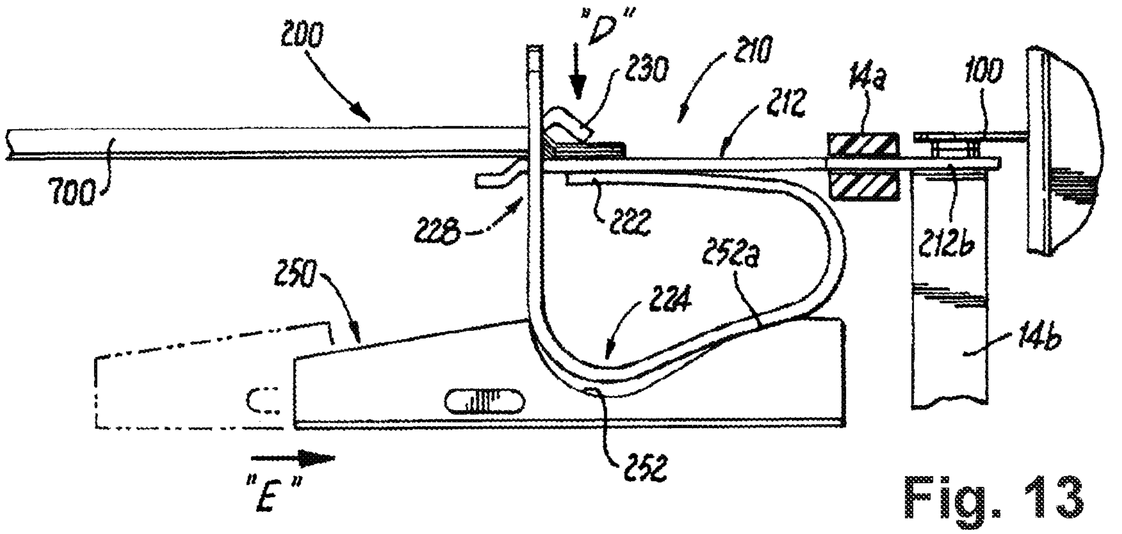
FIG. 13 is the side elevation view of the wire termination assembly of FIG. 12, illustrating the wire termination assembly returned to the closed position so that the electrical wire is clamped to the wire termination assembly.
Figure 14:
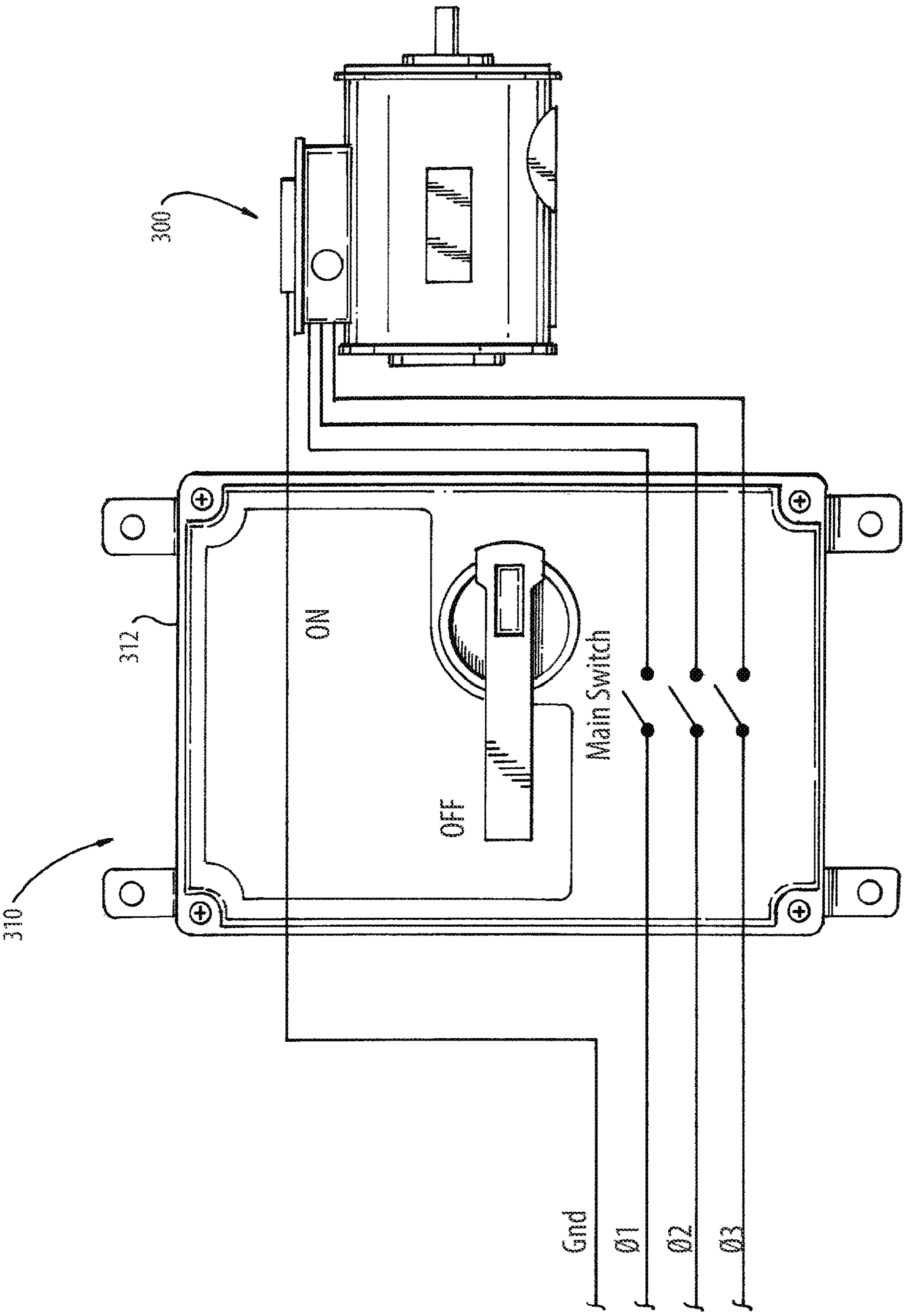
FIG. 14 is a schematic representation of an exemplary use configuration for the multi-pole electrical wiring device according to the present disclosure, illustrating a three-phase motor and a three-phase motor disconnect switch assembly used to control the operation of the motor.
Figure 15:
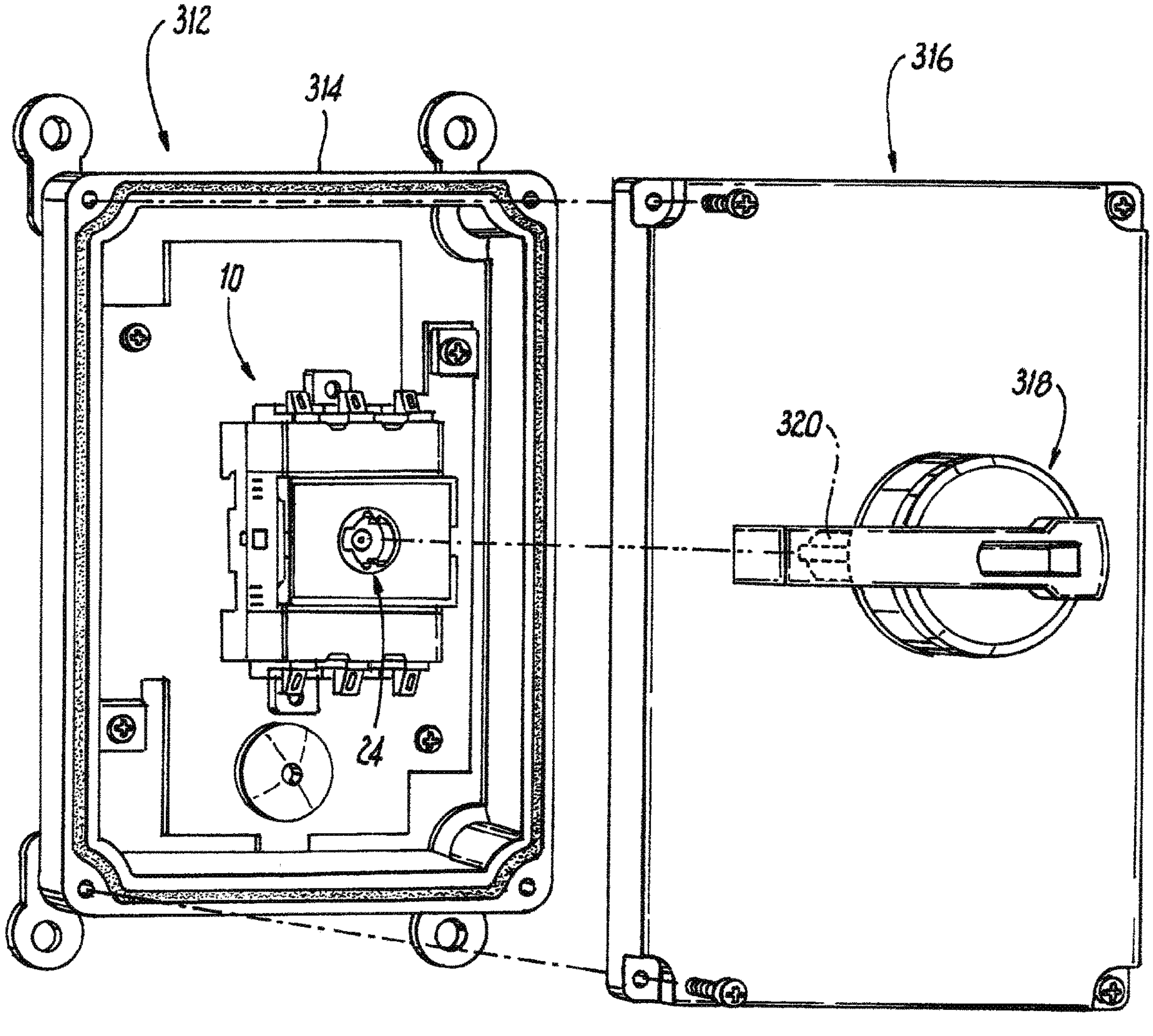
FIG. 15 is an exploded perspective view of the motor disconnect switch assembly of FIG. 14, illustrating a multi-pole electrical wiring device within an enclosure.
Figure 16:
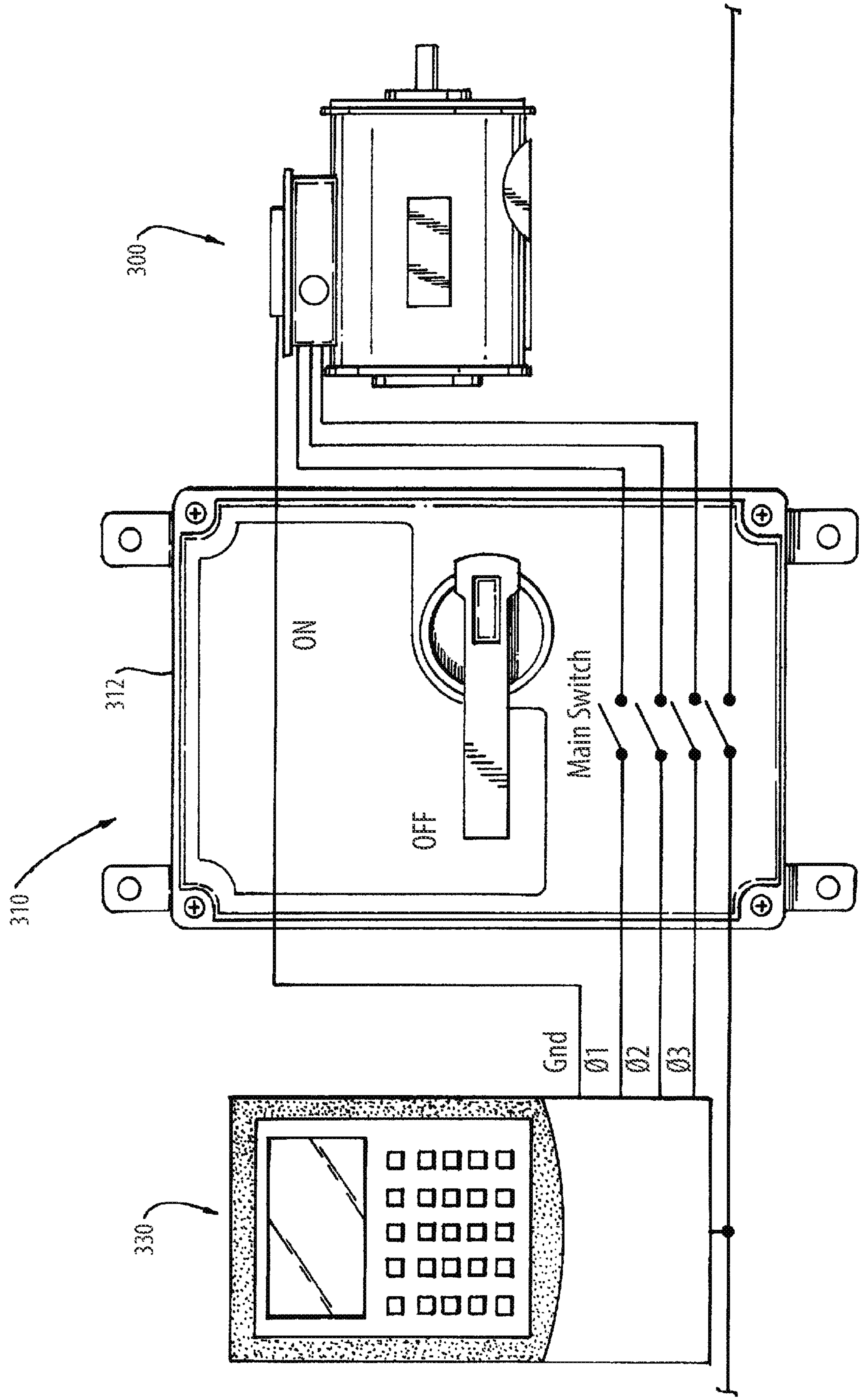
FIG. 16 is a schematic representation of another exemplary use configuration for the multi-pole electrical wiring device according to the present disclosure, illustrating of a three-phase motor, a three-phase motor drive unit and a multi-pole motor disconnect switch assembly between the motor and the motor drive unit.
Figure 17:
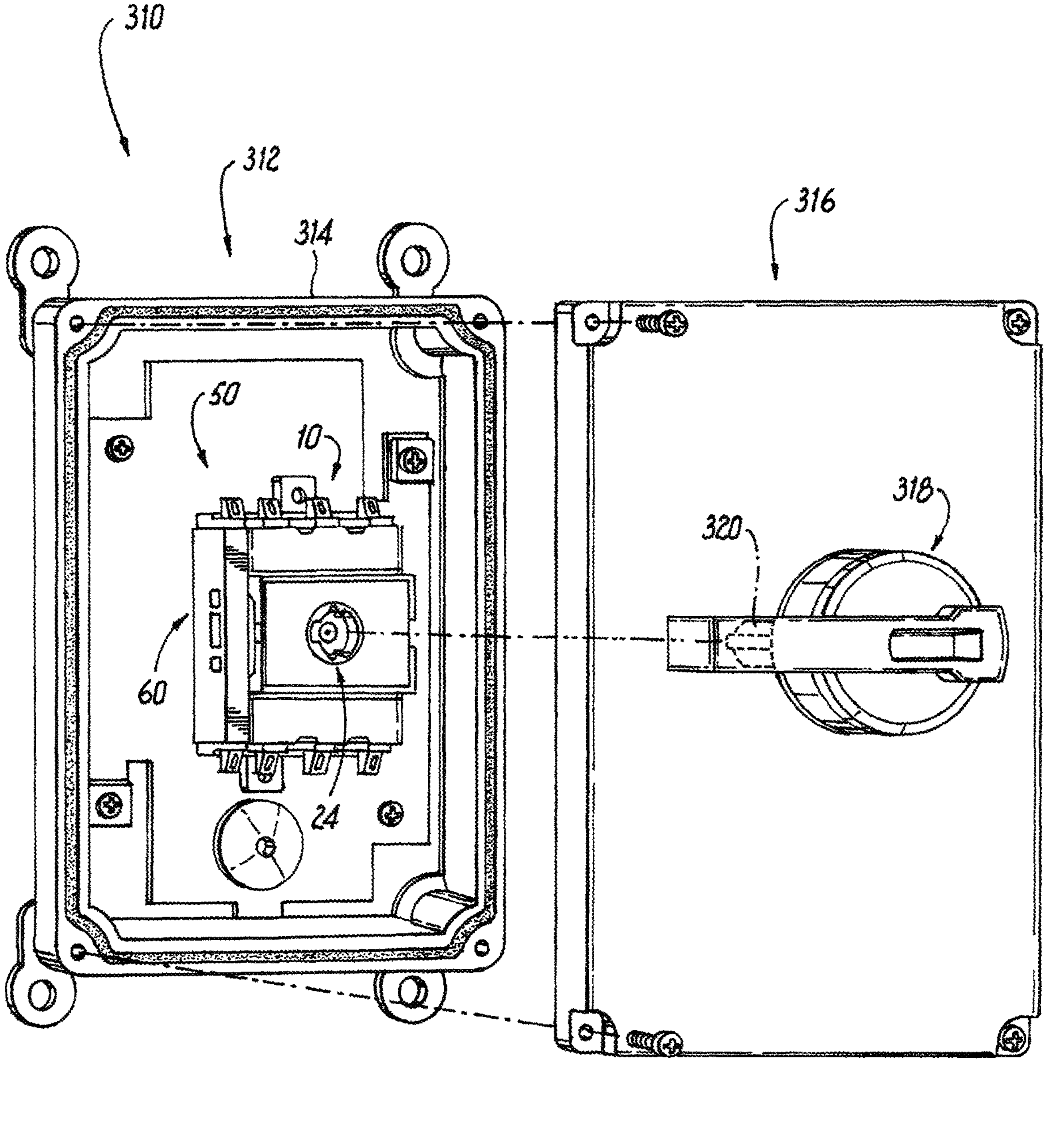
FIG. 17 is an exploded perspective view of the motor disconnect switch assembly of FIG. 16, illustrating a multi-pole main electrical wiring device and an auxiliary electrical wiring device attached to the main electrical wiring device within an enclosure.
Figure 18:
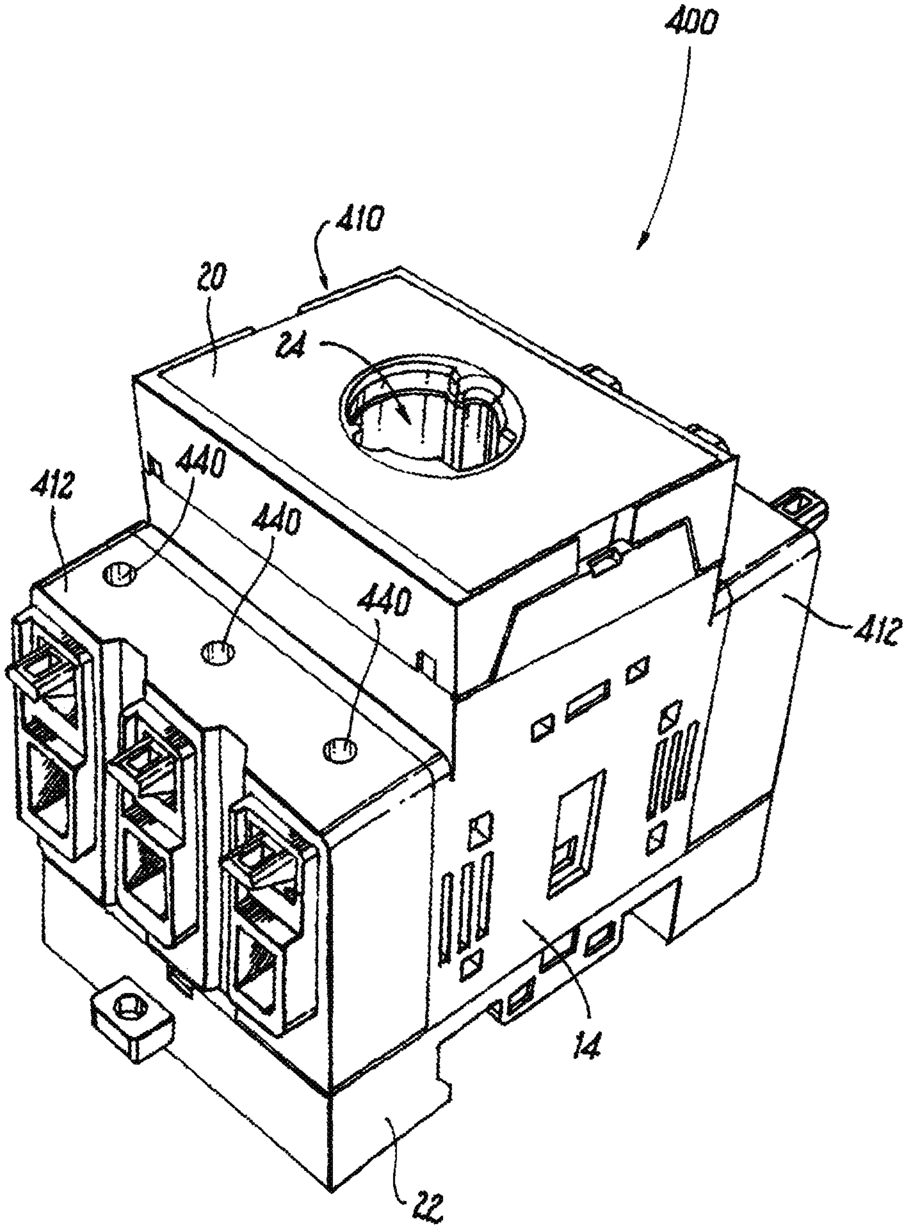
FIG. 18 is a top perspective view of another exemplary embodiment of a multi-pole electrical wiring device according to the present disclosure, illustrating an exemplary embodiment of a wire attachment assembly according to the present disclosure having a plurality of wire termination assemblies according to the present disclosure.

Referring to FIGS. 8-13, in the exemplary embodiment shown, the clamping member 214 includes a brace contact member 222, a biasing member 224 and a clamp arm 226. The brace contact member 222 can be a substantially planar shaped member or an arcuate shaped member that is configured to mate with the clamp brace 212 and is mechanically fitted to, e.g., clipped to, the clamp brace 212 or secured to the clamp brace by, for example, a solder joint, a brazed joint, or a welded joint. A non-limiting example of the biasing member 224 is a spring, such as a clamp spring. In the embodiments shown, the biasing member 224 is a spring. However, the present disclosure contemplates other types of mechanisms that can apply a constant and continuous force on the wire to electrically clamp, couple or otherwise connect the wire 700 to the wire terminal 210 in various temperatures and environmental conditions. The biasing member 224 has a first lobe 224*a* and a second lobe 224*b*. The first lobe 224*a* and the second lobe 224*b* are configured to interact with the plunger 250 so that movement of the plunger relative to the biasing member 224 is translated to the application of a mechanical load on the biasing member 224 or the removal of the mechanical load on the biasing member. For example, the plunger 250 can be a rectangular shaped member having a notch 252 that is configured to receive the second lobe 224*b* of the biasing member 224, as shown in FIGS. 8 and 10. The notch 252 has a camming surface 252*a* that rides along the biasing member 224 when the plunger 250 is moved in the direction of arrow "B," seen in FIG. 12, applying a mechanical load on the biasing member 224 causing the biasing member to deflect in the direction of arrow "C" toward the open position. The clamp arm 226 extends from the second lobe 224*b* of the biasing member 224 toward the clamp brace 212, as shown. The clamp arm 226 has an elongated opening 228 configured to receive a portion of the clamp brace 212 and at least a portion of a wire press member 230. The wire press member 230 is configured to contact and press a wire, e.g., wire 700 seen in FIGS. 12 and 13, against the clamp brace 212 when the wire is positioned between the clamp brace 212 and the wire press member 230 and the clamping member 214 is in the closed position, as shown in FIG. 13. The clamp arm 226 is movable relative to the clamp brace 212 between the closed position, seen in FIGS. 11 and 13, and the open position, seen in FIG. 12.

As noted, the wire terminal 210 can connect to electrical conductors of different sizes. For example, if the electrical wiring device, e.g., switch 10, is rated for 20 amps, then the wire terminal 210 should also be configured and rated for at least 20 amps. The wire size, i.e., the bare conductor size, for 20 amps is 12 AWG wire such that the clamp arm 226 should be able to move to an open position where the outer diameter of 12 AWG wire can fit. As another example, if the electrical wiring device is rated for 30 amps, then the wire terminal 210 should also be rated for at least 30 amps. The wire size, i.e., the bare conductor size, for 30 amps is 10 AWG wire such that the clamp arm 226 should be able to move to an open position where the outer diameter of 10 AWG wire can fit. As another example, if the electrical wiring device is rated for 40 amps, then the wire terminal 210 should also be rated for at least 40 amps. The wire size, i.e., the bare conductor size, for 40 amps is 8 AWG wire such that the clamp arm 226 should be able to move to an open position where the outer diameter of 8 AWG wire can fit. As another example, if the blade-type electrical receptacle is rated for 50 amps, then the wire terminal 210 should also be rated for at least 50 amps. The wire size, i.e., the bare conductor size, for 50 amps is 6 AWG wire such that the clamp arm 226 should be able to move to an open position where the outer diameter of 6 AWG wire can fit.

The biasing member 224 is made of a resilient material with sufficient stiffness to flex when the plunger 250 pushes the biasing member 224 from the closed position, seen in FIG. 11, to the open position, seen in FIG. 12. As noted, when in the closed position, the biasing member 224 can apply a force, e.g., a spring force, through the wire press member 230 to a wire 700 inserted between the wire press member 230 and the clamp brace 212, as shown in FIG. 13. A non-limiting example of the biasing member 224 is a spring, such as a clamp spring. In the embodiments shown, the biasing member 224 is a spring. However, the present disclosure contemplates other types of mechanisms that can apply a constant and continuous force on the wire to electrically clamp, couple or otherwise connect the wire 700 to the wire terminal 210 in various temperatures and environmental conditions. The biasing member 224 can be made of metal, such as spring steel. The biasing force, e.g., spring force) exerted by the biasing member 224 clamping a wire between the wire press member 230 and the clamp brace 212 should be sufficient to apply a constant and continuous force on the wire to electrically clamp, couple or otherwise connect the wire 700 to the wire terminal 210 in various temperatures and environmental conditions. The biasing member 224 is configured so that it is normally biased toward the closed position, i.e., in the direction of arrow "D" which is away from the clamp brace 212, as seen in FIG. 13. In the normal position of the biasing member 224 without a conductor inserted into the elongated opening 228, the wire press member 230 of the clamp arm 226 can contact the clamp brace 212, as shown in FIG. 11.

Referring to FIGS. 11-15, an exemplary embodiment of a use scenario for the switch 10 described herein is shown. In this exemplary embodiment, a 30 amp, three-phase electrical motor 300 is controlled by a disconnect switch assembly 310. The disconnect switch assembly 310 includes an electrical enclosure or electrical box 312 having a main body 314 and a removable cover 316. For ease of description, the electrical enclosure or electrical box 312 may also be referred to herein as the "enclosure" in the singular and the "enclosures" in the plural. The enclosure 312 may be a weatherproof or watertight enclosure. A switch 10 is secured in the main body 314 of the enclosure 312. As described herein, the switch 10, seen in FIG. 1, uses wire termination assemblies 200 to terminate electrical conductors or wires within the enclosure 312. To connect wires within the enclosure 312 to the switch 10, an installer, e.g., an electrician, strips the insulation from the end of each wire, as shown in FIG. 12. In the exemplary embodiment shown in FIGS. 14-15, the switch 10 is a three-pole switch that has six wire termination assemblies 200, such that six wires can be connected to the switch 10. The six wires include line side phase 1, phase 2 and phase 3 wires, and load side phase 1, phase 2 and phase 3 wires. However, it is also contemplated that each wire termination assemblies 200 could be configured to electrically connect more than one wire to the wire termination assemblies 200. The plunger 250 for each wire termination assembly 200 extends through the activating member opening 34 in the wire attachment portions 16 or 18 of the switch housing 12. The portion of the plunger 250 extending from the housing 12 are then moved, e.g., pulled, in the direction of arrow "B," seen in FIG. 12, which in this case is outward relative to the wire attachment portions 16 or 18 of the housing 12. Moving the plunger 250 in the direction of arrow "B" causes the camming surface **252*a* of the notch 252 in the plunger 250 to ride along the biasing member 224 applying a mechanical load on the biasing member 224. Applying a mechanical load on the biasing member 224, causes the biasing member 224 to deflect in the direction of arrow "C," seen in FIG. 12, from the closed position toward the open position. With the wire terminals 210 in the open position, the electrical wires 700 are then inserted into the appropriate wire receiving apertures 32 in the wire attachment portions 16 or 18 of the switch housing 12, seen in FIG. 5. The wire receiving apertures 32 also guide the bare end of the wires 700 into the portion of the elongated opening 228 of the clamping member 214 between clamp brace 212 and wire press member 230. When the bare end of each wire 700 is positioned between the clamp brace 212 and the wire press member 230, the respective plunger 250 is then moved, e.g., pushed in the direction of arrow "E," seen in FIG. 13, back into the activating member opening 34 in the wire attachment portions 16 or 18. Moving the plungers 250 in the direction of arrow "E" removes the mechanical load applied by the plunger 250 on the biasing member 224 so that the energy stored by the biasing member 224 moves the biasing member 224 to the closed position with sufficient force to secure or clamp the wire 700 between the clamp brace 212 and the wire press member 230 completing an electrically conductive path between the wire 700 and the wire termination assembly 200. It is noted that when the plunger 250 is moved in the direction of arrow "B" to a first position, plunger 250 extends out of the wire attachment portion 16 or 18 of the housing 12 a distance that is greater than when the plunger 250 is moved in the direction of arrow "E" to a second position, as shown in FIG. 5. The second direction may be a direction that is opposite the first direction. In addition, it is noted that when the plunger is moved to the first position or the second position, the plunger 250** may remain in the first position or the second position until the plunger is manually moved to the other position.

With the wires 700 connected to the switch 10 and the motor 300, when the control knob 318 rotatably attached to the switch cover 316 is rotated from an "off" position to an "on" position, the drive rod 320 attached to the control knob 318 rotates the on-off control assembly 24 causing contact pads 102 the switch contact 100 of the switch 10 into engagement with the electrical contact pads 220 on the clamp brace 212 of the wire termination assemblies 200 completing an electrically conductive path from the wires 700 to the motor 300 turning the motor on.

Referring to FIGS. 11-13, 16 and 17, an exemplary embodiment of a use scenario for the switch 50 described herein is shown. In this exemplary embodiment, a 30 amp, three-phase electrical motor 300 is controlled by a disconnect switch assembly 310 and a motor driver 330. The disconnect switch assembly 310 is the same as described above, except the switch 50 is used instead of switch 10. To connect wires within the enclosure 312 to the switch 50, an installer, e.g., an electrician, strips the insulation from the end of each wire. In the exemplary embodiment shown in FIGS. 16-17, the switch 10 is a three-pole switch that has six wire termination assemblies 200, such that six wires can be connected to the switch 10. The six wires include line side phase 1, phase 2 and phase 3 wires, and load side phase 1, phase 2 and phase 3 wires. In addition, the auxiliary switch 60 is a single pole switch with a line and load side control wires.

The plunger 250 for each wire termination assembly 200 of switch 10 extends through the activating member opening 34 in the wire attachment portions 16 or 18 of the switch housing 12, and the plunger 250 for each wire termination assembly 200 of switch 60 extends through the activating member opening 69 in the wire attachment portions 64 or 66 of the auxiliary switch housing 62. The portion of the plunger 250 extending from the housings 12 and 62 are then moved, e.g., pulled, in the direction of arrow "B," seen in FIG. 12. Moving each plunger 250 in the direction of arrow "B" causes the camming surface **252*a* of the notch 252 in the plunger 250 to ride along the biasing member 224 applying a mechanical load on the biasing member 224. Applying a mechanical load on the biasing member 224, causes the biasing member 224 to deflect in the direction of arrow "C," seen in FIG. 12, from the closed position toward the open position. With the wire terminals 210 in the open position, the electrical wires 700 are then inserted into the appropriate wire receiving apertures 32 in the wire attachment portions 16 or 18 of the switch housing 12 and the wire receiving apertures 68 in the wire attachment portions 64 or 66 of the auxiliary switch housing 62. The wire receiving apertures 32 and 68 also guide the bare end of the wires 700 into the portion of the elongated opening 228 of the clamping member 214 between clamp brace 212 and wire press member 230. When the bare end of each wire 700 is positioned between the clamp brace 212 and the wire press member 230, the respective plunger 250 is then moved, e.g., pushed in the direction of arrow "E". Moving the plungers 250 in the direction of arrow "E" removes the mechanical load applied by the plunger 250 on the biasing member 224 so that the energy stored by the biasing member 224 moves the biasing member 224 to the closed position with sufficient force to secure or clamp the wire 700 between the clamp brace 212 and the wire press member 230 completing an electrically conductive path between the wire 700 and the wire termination assembly 200. It is noted that when the plunger 250 is moved in the direction of arrow "B" to a first position, plunger 250 extends out of the wire attachment portion 16 or 18 of the housing 12 a distance that is greater than when the plunger 250 is moved in the direction of arrow "E" to a second position, as shown in FIG. 5. The second direction may be a direction that is opposite the first direction. In addition, it is noted that when the plunger is moved to the first position or the second position, the plunger 250** may remain in the first position or the second position until the plunger is manually moved to the other position.

With the wires 700 connected to the switch 50, the motor drive 330 and the motor 300, when the control knob 318 rotatably attached to the switch cover 316 is rotated from an "off" position to an "on" position, the drive rod 320 attached to the control knob 318 rotates the on-off control assembly 24 causing contact pads 102 the switch contact 100 of the switch 50 into engagement with the electrical contact pads 220 on the clamp brace 212 of the wire termination assemblies 200 completing an electrically conductive path from the wires 700 to the motor 300 and providing power to the motor driver 330. The motor driver 330 can then be programmed to turn the motor 300 "on" and "off".

For the embodiments of FIGS. 14-17, to remove a wires from the wire termination assemblies 200, the plungers 250 for each wire termination assembly 200 extending through the activating member opening 34 in the wire attachment portions 16 or 18 of the switch housing 12 and/or activating member opening 69 of the switch housing 62 are moved in the direction of arrow "B," seen in FIG. 12. Moving the plungers 250 in the direction of arrow "B" causes the camming surface **252*a* of the notch 252 in the plunger 250 to ride along the biasing member 224 applying a mechanical load on the biasing member 224 causing the biasing member to deflect from the closed position to the open position as described above. With the wire terminals 210 in the open position, the electrical wires 700 can be removed from the switch 10 and/or the switch 60**.

The activating member 250 is described herein as moving in the directions of arrows "B" and "E" as shown in FIGS. 12 and 13. Movement of the activating member 250 shown in FIGS. 12 and 13 is a linear motion. While the activating member 250 is shown as moving linearly, the present disclosure contemplates other movement of the activating member 250. As non-limiting examples, movement of the activating member 250 can be rotational or torque motion, or movement of the activating member 250 may be pivotable motion, or movement of the activating member 250 can be a twisting motion. An example of rotational movement of the activating member is shown and described in commonly owned U.S. Pat. No. 11,495,895, which is incorporated herein in its entirety by reference. Movement of the activating member 250 may also be referenced relative to the wire terminal 210, or relative to components of the wire terminal 210, or to the housing 12. For example, the activating member 250 can move relative to the clamping member 214 or the clamp brace 212.

In the exemplary embodiments shown in FIGS. 18-46 and 47-53, the electrical wiring device may be a multi-pole switch, e.g., a three-pole switch. As set forth above, for ease of description, the multi-pole switch may also be referred to herein as the "switch" in the singular and the "switches" in the plural. The exemplary embodiments of FIGS. 18-46 and 47-53 also contemplate the inclusion of the auxiliary switches described herein and shown in FIGS. 6 and 7. The switches and auxiliary switches contemplated may be used to control the operation of multi-phase motors, e.g., three-phase motors.

Referring to FIGS. 18-46, additional exemplary embodiments of a switch 400 according to the present disclosure is shown. The switch 400 includes similar features as described above for the embodiments of FIGS. 1-18 such that like elements use the same reference numerals. The switch 400 has a housing 410 and one or more wire attachment assemblies 412, seen in FIGS. 19-22. The switch housing 410 includes a main body portion 14, a top portion 20 and a base 22. The switch housing 410 is preferably made of suitably rigid electrical insulating materials, such as plastic materials, including injection molded thermoplastic materials, such as Nylon, and can be a standalone unit or configured to fit within an electrical enclosure. The top portion 20 of the switch housing 410 includes the on-off control assembly 24. The on-off control assembly 24 is operatively coupled to the switch contacts 100 such that the on-off control assembly 24 moves the switch contacts 100 between make and break positions.

Referring to FIGS. 19-22, the main body portion 14 of the switch housing 410 has a pair of end walls 14*a* and a pair of side walls 14*b*. The pair of end walls 14*a* and the pair of side walls 14*b* are joined together forming an interior of the main body portion 14 that is at least partially hollow. The at least partially hollow interior of the main body portion 14 may include one or more cavities or openings in which to receive components that perform the make and break functions of the switch 400. Within the main body portion 14 of the switch housing 410 are the components that perform the make and break functions of the switch 400. A non-limiting example of the components within the main body portion 14 that perform the make and break functions of the switch 400 are included in, for example, the HBLDS3RS Disconnect Switch sold by Hubbell Incorporated, which is incorporated herein in its entirety by reference. Generally, the main portion 14 includes the plurality of spring loaded switch contacts 100, seen in FIGS. 3 and 43, that are accessible when the base 22 is removed from the switch housing 410. Each switch contact 100 acts as a jumper between corresponding pairs of wire termination assemblies 460, described below, forming part of the wire attachment assemblies 412. The end walls 14*a* of the main body portion 14 include one or more notches, channels or other openings 14*c* from an interior of the main body portion 14 through to an exterior of the end walls 14*a*, as shown. In addition, the end walls 14*a* include one or more apertures or other openings 14*d*. For ease of description, the one or more notches, channels or other openings 14*c* may also be referred to herein as a “notch” in the singular and as “notches” in the plural, and the one or more apertures or other openings 14*d* may also be referred to herein as an “aperture” in the singular and as “apertures” in the plural. The notches 14*c* and apertures 14*d* are used to mate the wire attachment assemblies 412 to the main body portion 14 of the switch housing 410 as described below.

Figure 26:
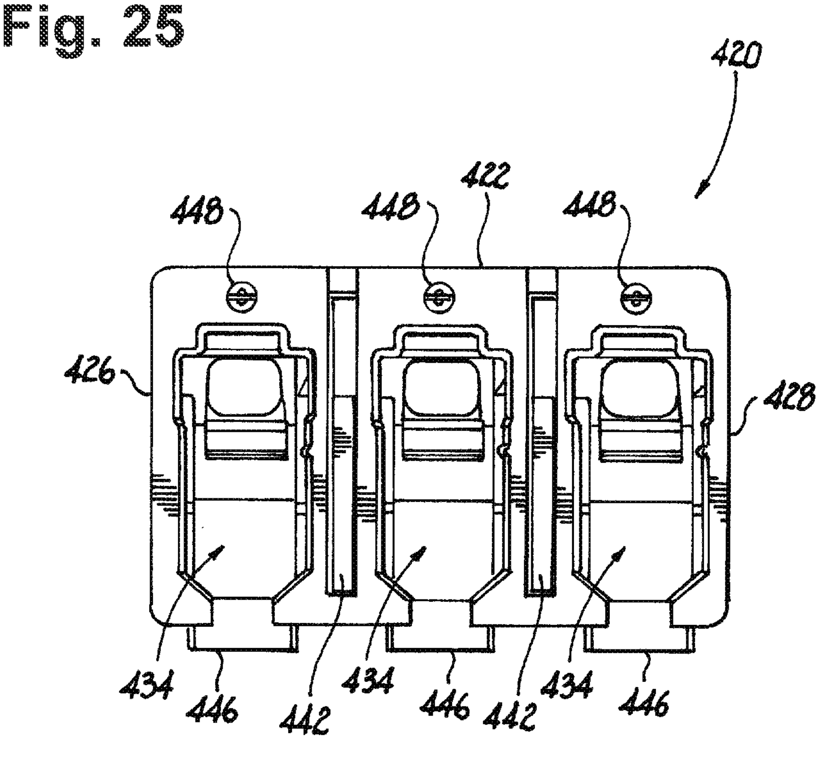
FIG. 26 is a rear elevation view of the housing of FIG. 24.
Figure 27:
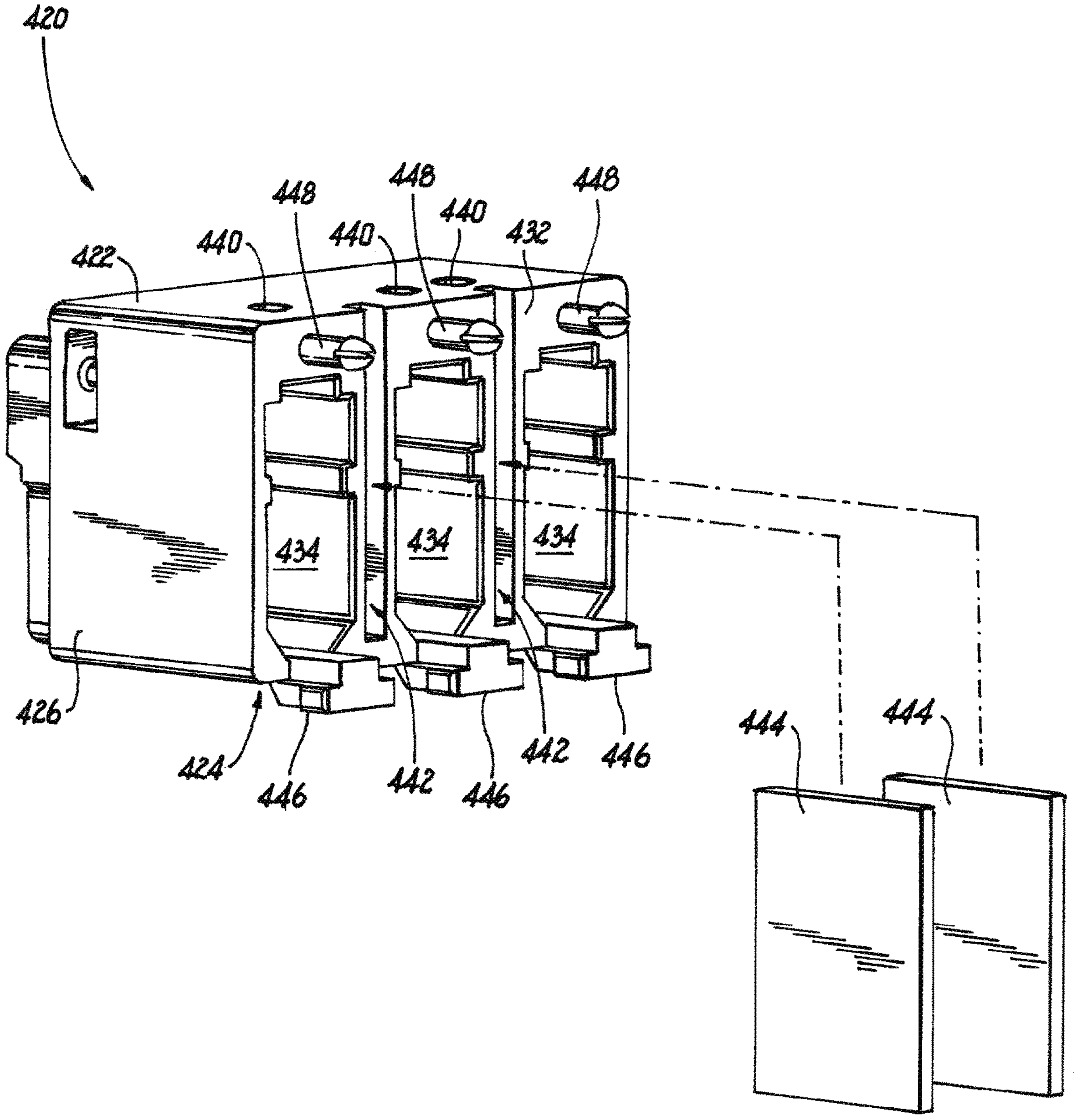
FIG. 27 is an exploded perspective view from a rear of the housing of the wire attachment assembly of FIG. 24, illustrating multiple cavity isolating members staged for insertion into the housing.
Figure 28:
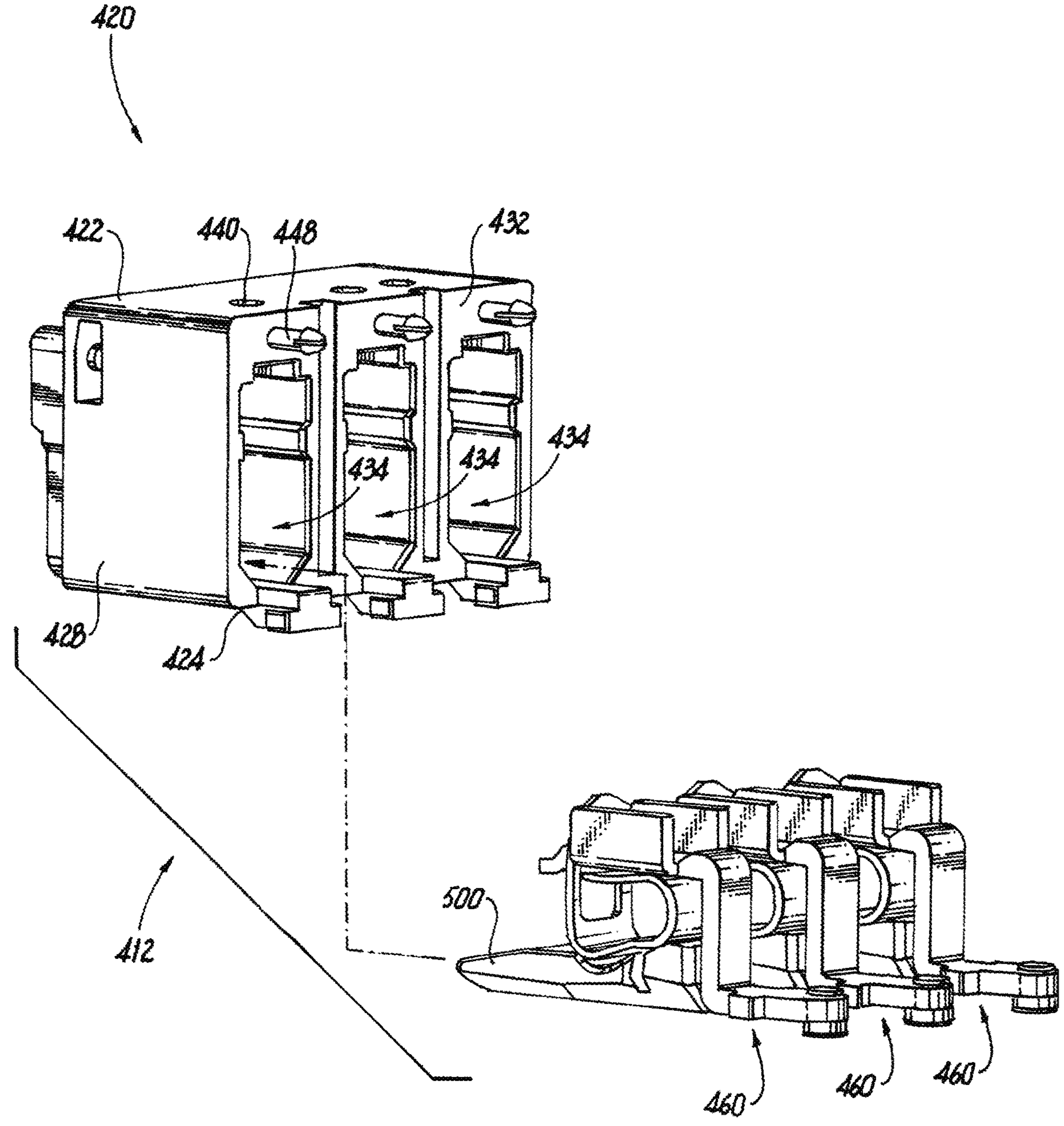
FIG. 28 is an exploded rear perspective view of the wire attachment assembly of FIG. 19, illustrating the multiple wire termination assemblies positioned for insertion into a respective wire termination cavity of the housing.
Figure 29:
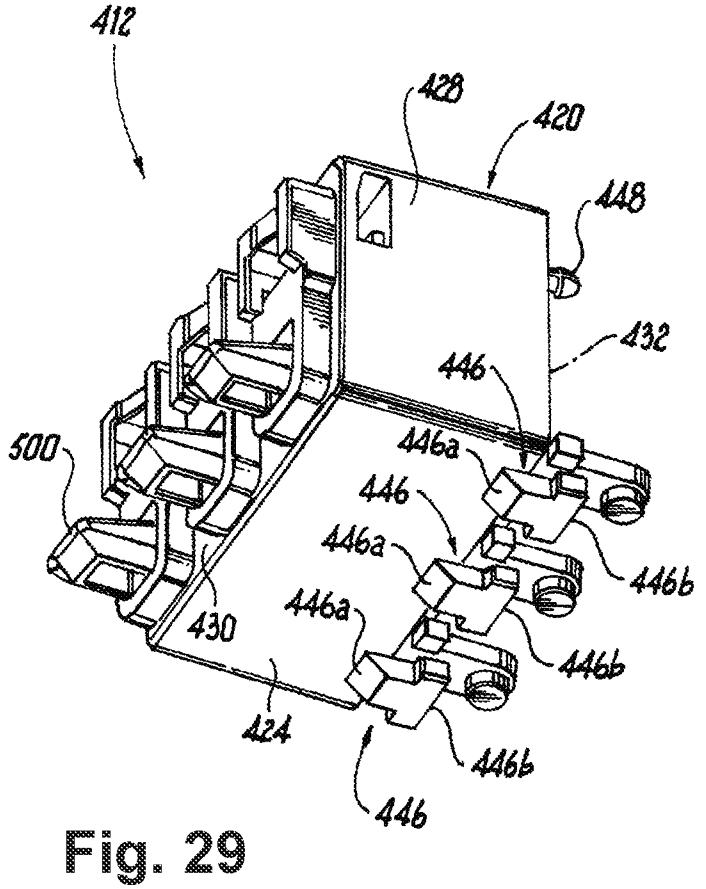
FIG. 29 is a perspective view from a bottom of an exemplary embodiment of a wire attachment assembly according to the present disclosure, illustrating the housing of FIG. 28 and a plurality of wire termination assemblies positioned in the housing.
Figure 30:
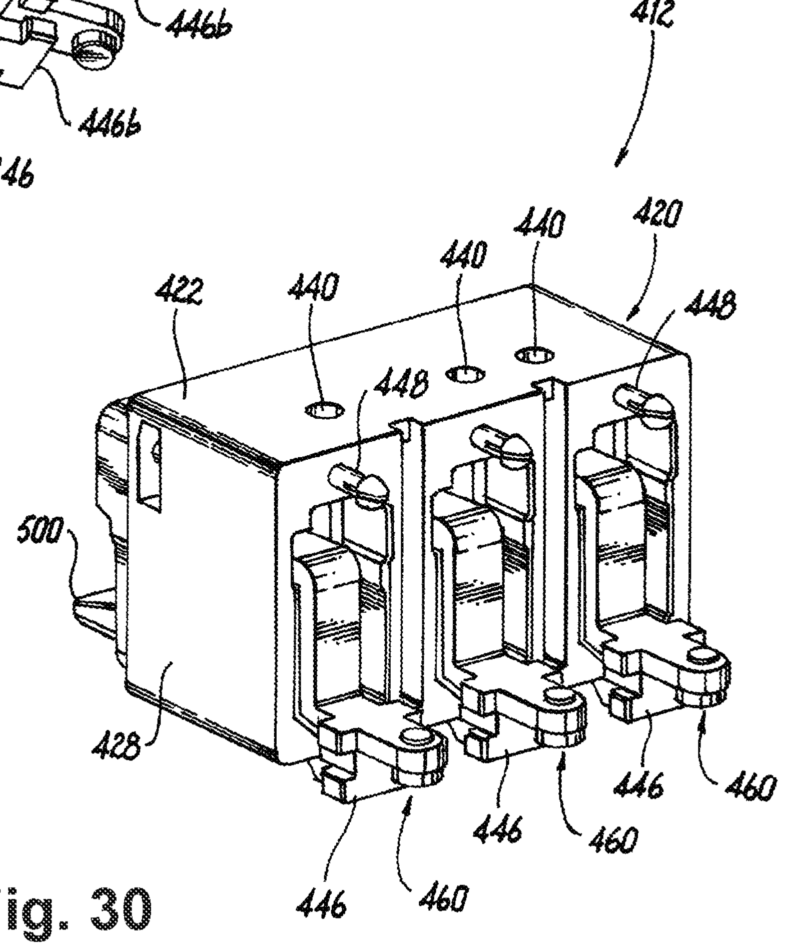
FIG. 30 is a perspective view from a rear of the wire attachment assembly of FIG. illustrating contacts for each wire termination assembly extending at least partially out of the housing.
Figure 31:
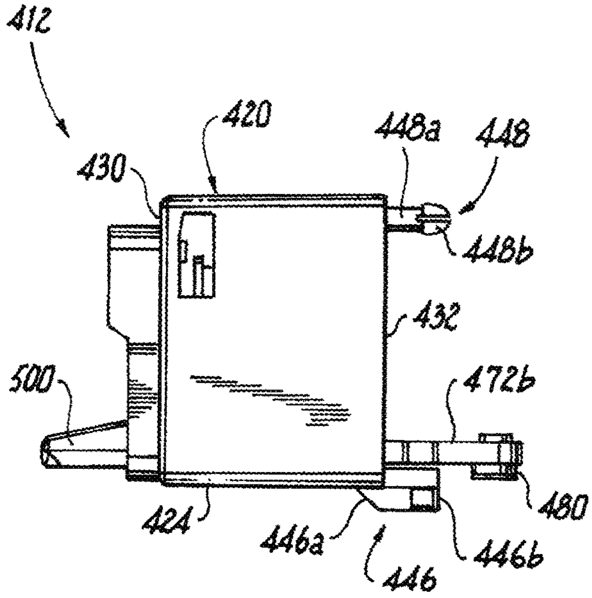
FIG. 31 is a side elevation view of the wire attachment assembly of FIG. 29, illustrating assembly interlocking members and assembly retaining members.
Figure 32:
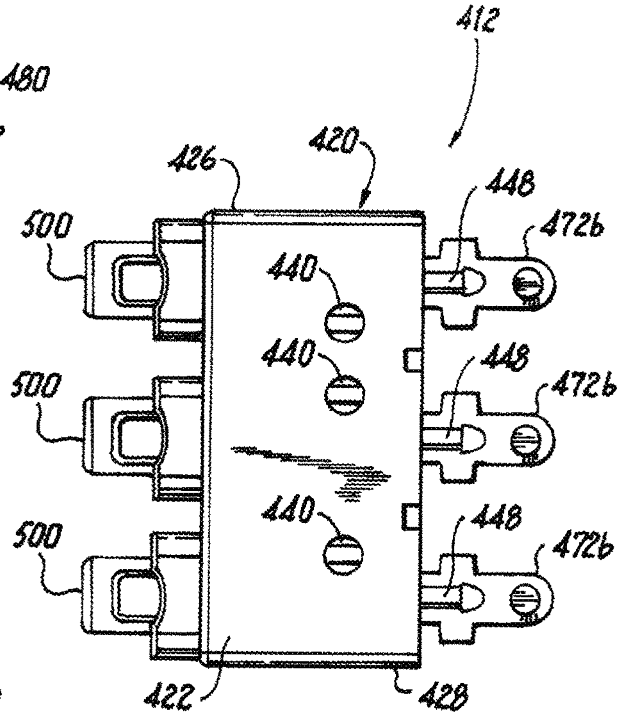
FIG. 32 is a top plan view of the wire attachment assembly of FIG. 29, illustrating a plurality of contact apertures extending through a top surface of the housing.
Figure 33:
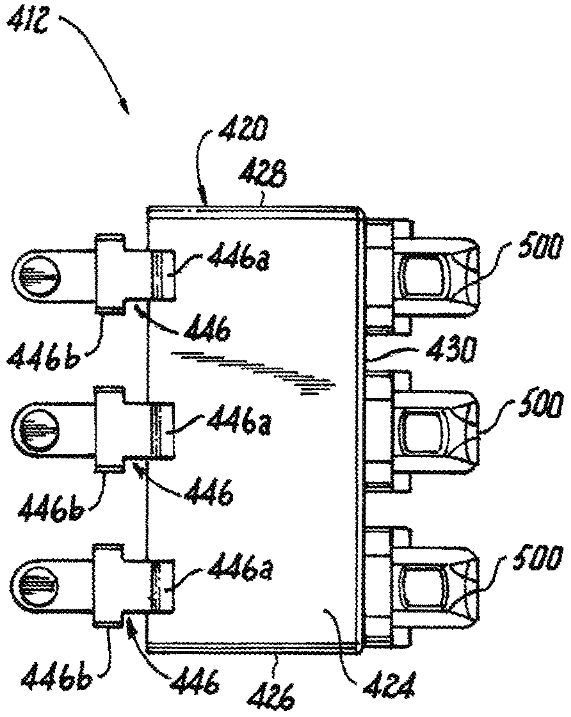
FIG. 33 is a bottom plan view of the wire attachment assembly of FIG. 29, illustrating the assembly interlocking members.
Figure 34:
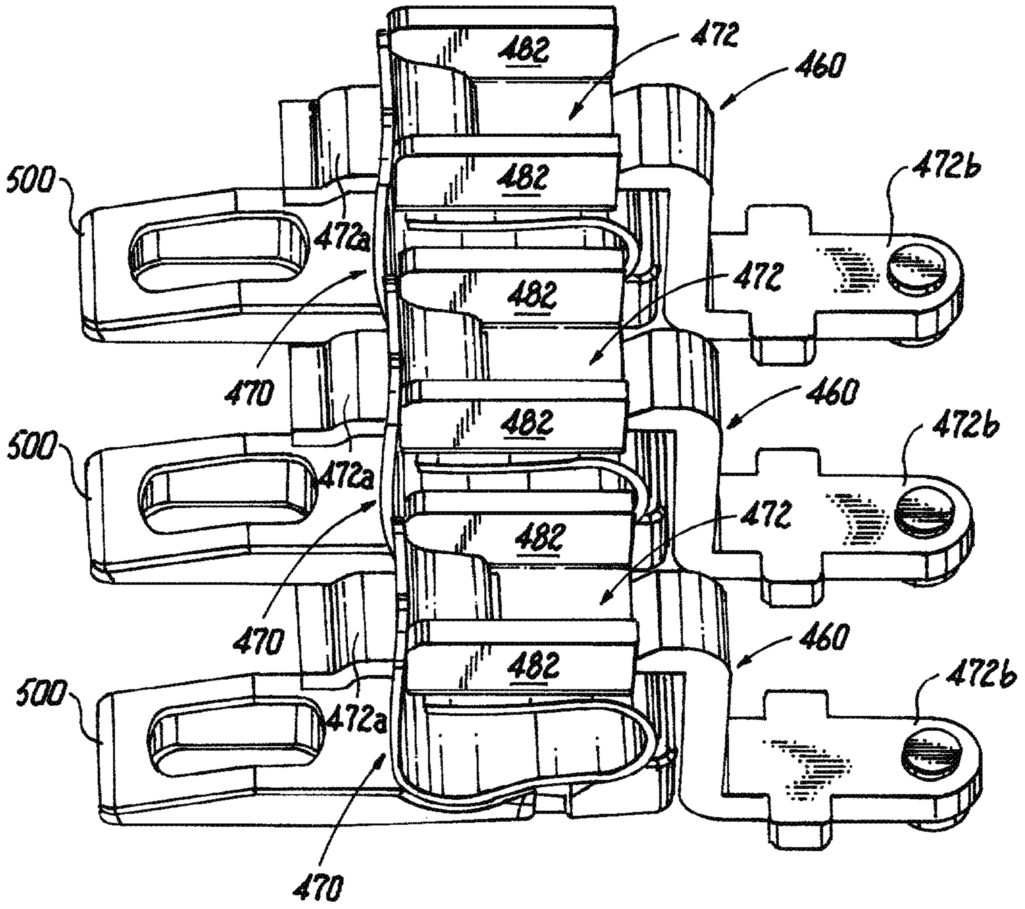
FIG. 34 is a top perspective view from a side of the wire termination assemblies of FIG. 28.
Figure 35:
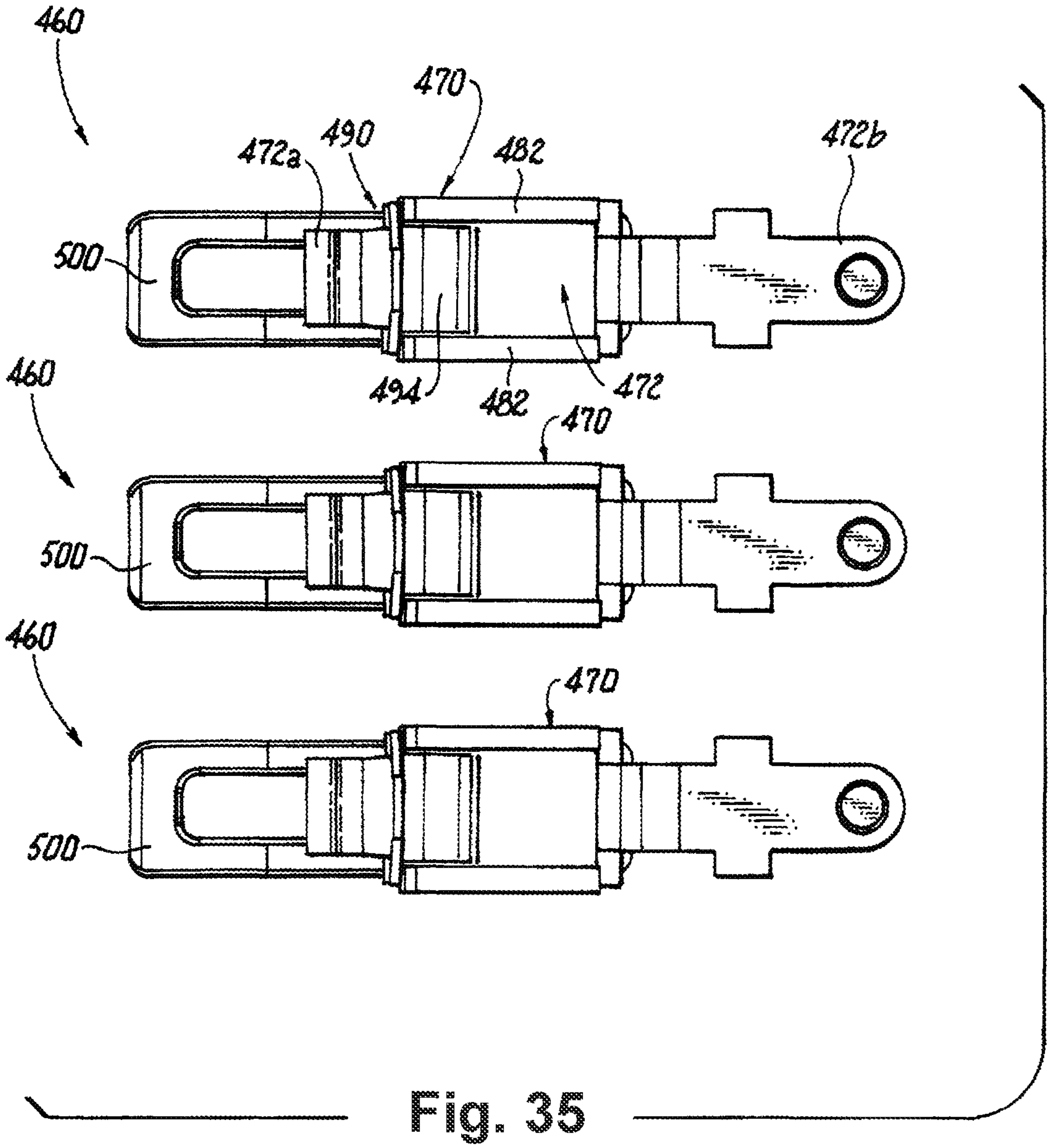
FIG. 35 is a top plan view of the wire termination assemblies of FIG. 34.
Figure 36:
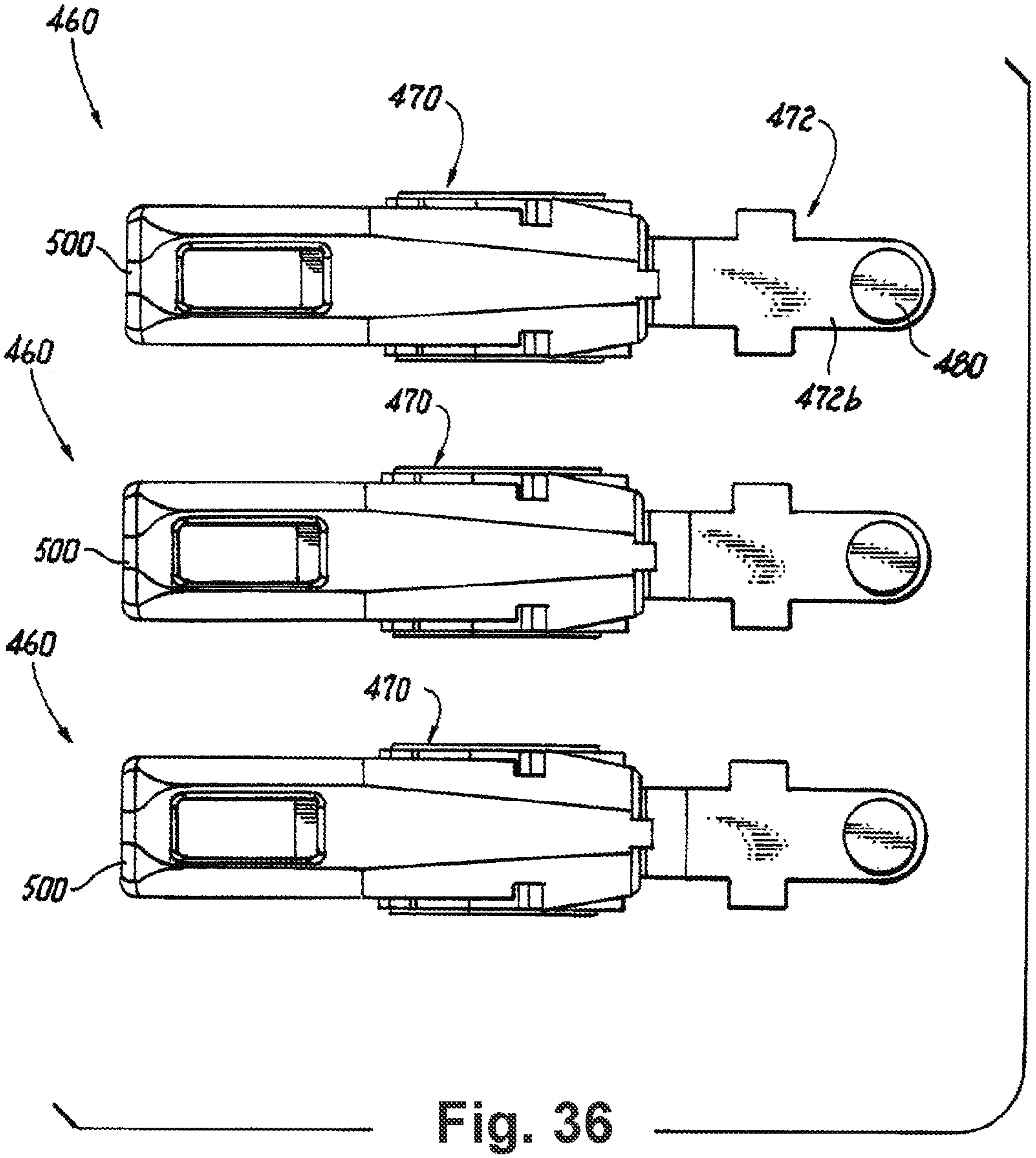
FIG. 36 is a bottom plan view of the wire termination assemblies of FIG. 34.

Referring to FIGS. 19 and 23-33, each wire attachment assembly 412 includes a housing 420 and one or more wire termination assemblies 460, seen in FIG. 28. The housing 420 may be a block that is at least partially solid in structure and having an upper exterior surface 422, a lower exterior surface 424, a first side exterior surface 426, second side exterior surface 428, a front exterior surface 430 and a rear exterior surface 432, seen in FIGS. 23 and 24. The housing 420 is preferably made of suitably rigid electrical insulating materials, such as plastic materials, including injection molded thermoplastic materials, such as Nylon. The housing 420 includes one or more wire termination cavities or chambers 434, seen in FIGS. 24 and 26, one or more wire receiving openings 436 and one or more activating member openings 438, seen in FIGS. 23 and 25. In the exemplary embodiment shown in FIGS. 24 and 26, each of the one or more wire termination cavities 434 provides access from the rear exterior surface 432 of the housing 420 to one of the one or more wire receiving openings 436 and to one of the one or more activating member openings 438. Each of the one or more wire termination cavities 434 is configured to receive and position one of the one or more wire termination assemblies 460 within the wire attachment assembly 412, as shown in FIGS. 28-33. In the exemplary embodiment shown in FIGS. 23 and 25, each of the one or more wire receiving openings 436 provides access from the front exterior surface 430 of the housing 420 to one of the one or more wire termination cavities 434 so that a wire can be inserted from an exterior of the housing 420 into a wire termination assembly 460 positioned within the one of the one or more wire termination cavities 434, seen in FIGS. 29-33, In the exemplary embodiment shown in FIGS. 23 and 25, each of the one or more activating member openings 438 provides access from the front exterior surface 430 of the housing 420 to one of the one or more wire termination cavities 434 so that an activating member 460 can be positioned relative to the wire termination assembly 460, seen in FIGS. 29-33.

Referring to FIGS. 27 and 28, the upper exterior surface 422 of the housing 420 includes one or more contact apertures or openings 440, Each of the one or more contact apertures or openings 440 extend from the upper exterior surface 422 of the housing 420 into one of the one or more wire termination cavities 434. The one or more contact apertures or openings 440 permit one or more contact pins or connectors (not shown) to be inserted into and through the one or more contact apertures 440 into the one of the one or more wire termination cavities 434 such that the one or more contact pins or connectors (not shown) can engage or contact the one of the one or more wire termination assemblies 460 positioned in the one of the one or more wire termination cavities 434. For example, one or more contact pins or connectors (not shown) may be electrically connected to a circuit board (not shown) positioned within an electrical enclosure or electrical box, such as the electrical enclosure 312 seen in FIGS. 14-17. The circuit board may include one or more indicators that provide status information about the operation of the switch 400. A more detailed description of the one or more contact pins or connectors and the circuit board is included in commonly owned U.S. Application Nos. 63/416,625 filed on Oct. 17, 2022 and U.S. application Ser. No. 18/484,487 filed Oct. 11, 2023, both of which are incorporated herein in their entirety by reference.

Referring now to FIGS. 26 and 27, the housing 420 may include one or more isolator cavities 442. Each of the one or more isolator cavities 442 is configured and dimensioned to receive an isolating member 444 to increase and/or provide electrical isolation between the one or more wire termination cavities 434. Preferably, the one or more isolating members 444 are made of suitably rigid electrical insulating materials, such as plastic materials, including injection molded thermoplastic materials, such as Nylon.

As shown in FIGS. 28-33, the housing 420 also includes one or more assembly interlocking members 446 and one or more assembly retaining members 448. Preferably, the one or more assembly interlocking members 446 and the one or more assembly retaining members 448 are made of suitably rigid electrical insulating materials, such as plastic materials, including injection molded thermoplastic materials, such as Nylon. In the exemplary embodiment shown, each of the one or more assembly interlocking members 446 includes a post 446*a* and a rail 446*b* forming a T-shaped like bracket. The post 446*a* may be integrally or monolithically formed into the lower exterior surface 424 of the housing 420, or the post 446*a* may be secured to the lower exterior surface 424 using, for example, adhesives or welds such as ultrasonic welds. The post 446*a* extends from the lower exterior surface 424 of the housing 420 in a direction beyond the rear exterior surface 432 of the housing 420 as shown. The rail 446*b* may be integrally or monolithically formed into a free end of the post 446*a*, or the rail 446*b* may be secured to the free end of the post 446*a* using, for example, adhesives or welds, such as ultrasonic welds. In the exemplary embodiment shown, each of the one or more assembly retaining members 448 includes a post 448*a* extending from the rear exterior surface 432 of the housing 420 as shown. The post 448*a* has a split distal end 448*b* that includes two legs that elastically deform when inserted into an aperture to hold the retaining member 448 within one of the one or more apertures 14*d* in the main body portion 14 of the switch housing 410.

Figure 43:
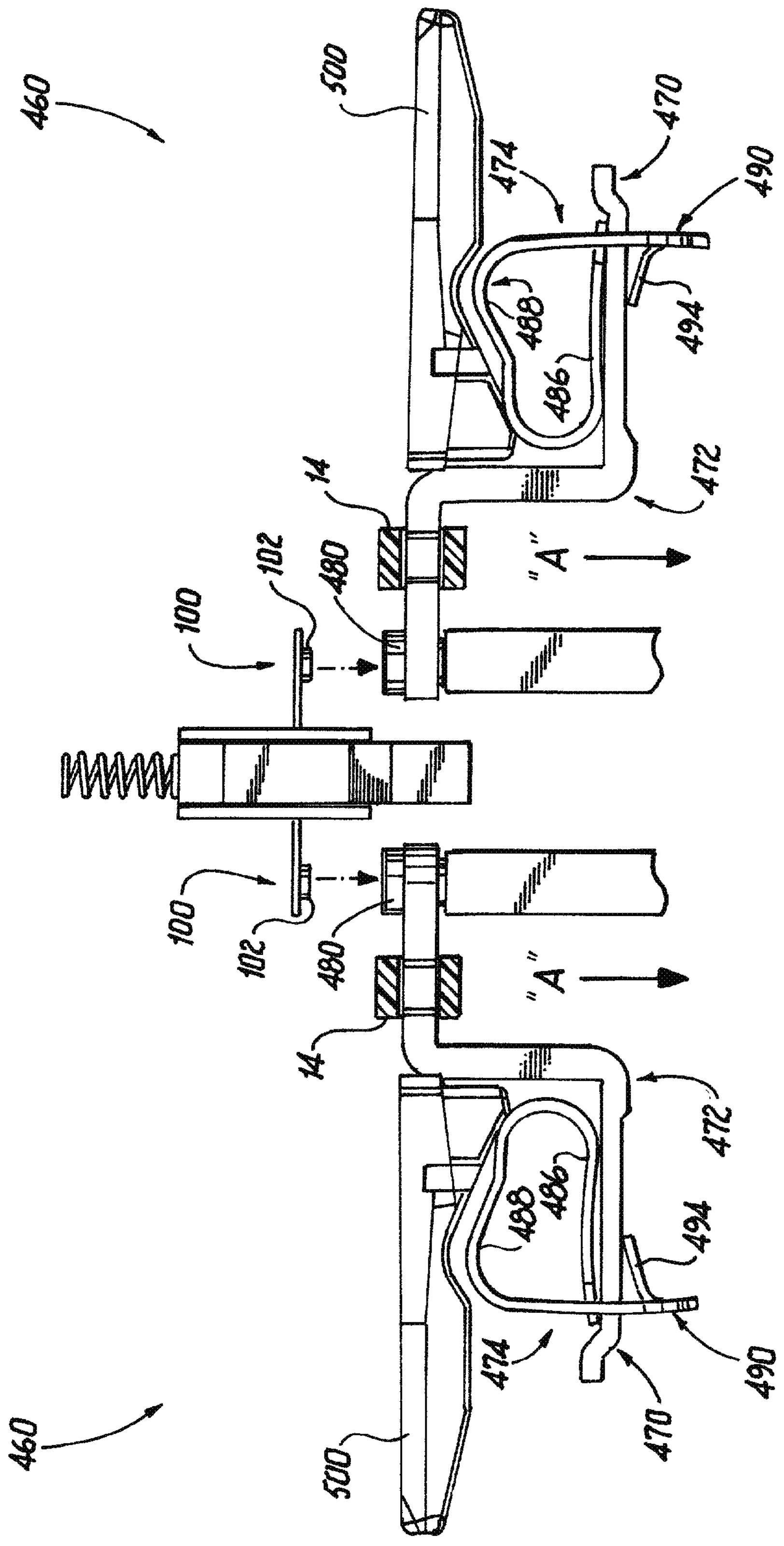
FIG. 43 is a side elevation view of a first wire termination assembly from a first wire attachment assembly and a first wire termination assembly from a second wire attachment assembly within the electrical wiring device of FIG. 18, which when in a closed position form an electrically conductive path between wires connected to the two wire termination assemblies.

Turning to FIGS. 34-39, another exemplary embodiment of a wire termination assembly 460 according to the present disclosure is shown. It is noted that the one or more wire attachment assemblies 412 are shown to receive three wire termination assemblies 460. However, the present disclosure contemplates that the one or more wire attachment assemblies 412 may be configured to receive less than three or more than there wire termination assemblies 460. Each wire termination assembly 460 is configured to receive and clamp a wire, such as wire 700 shown in FIGS. 45 and 46, to the switch 400, and to mate with the switch contacts 100 of the switch 400 as shown in FIG. 43. In the exemplary embodiment shown, the wire termination assembly 460 includes a wire terminal 470 and an activating member 500. The wire terminal 470 is at least partially made of an electrically conductive material, such as brass, copper or aluminum. In an exemplary embodiment, at least a portion of the wire terminal 470 is made of a resilient material with sufficient stiffness to flex when a mechanical load is applied and return to its normal position when the mechanical load is removed. An example of such a resilient material is spring steel. The wire terminal 470 can be formed as a unitary or monolithic structure, or the wire terminal 470 can be individual components mechanically fitted together, e.g., clipped together, or secured together by, for example, a solder joints, a brazed joints, or a welded joints. The activating member 500 is preferably made of suitable rigid electrical insulating materials, such as plastic materials. Non-limiting examples of plastic materials include injection molded thermoplastic materials, such as Nylon. The activating member 500 may also be referred to herein as a "plunger" in the singular and "plungers" in the plural.

Figure 39:
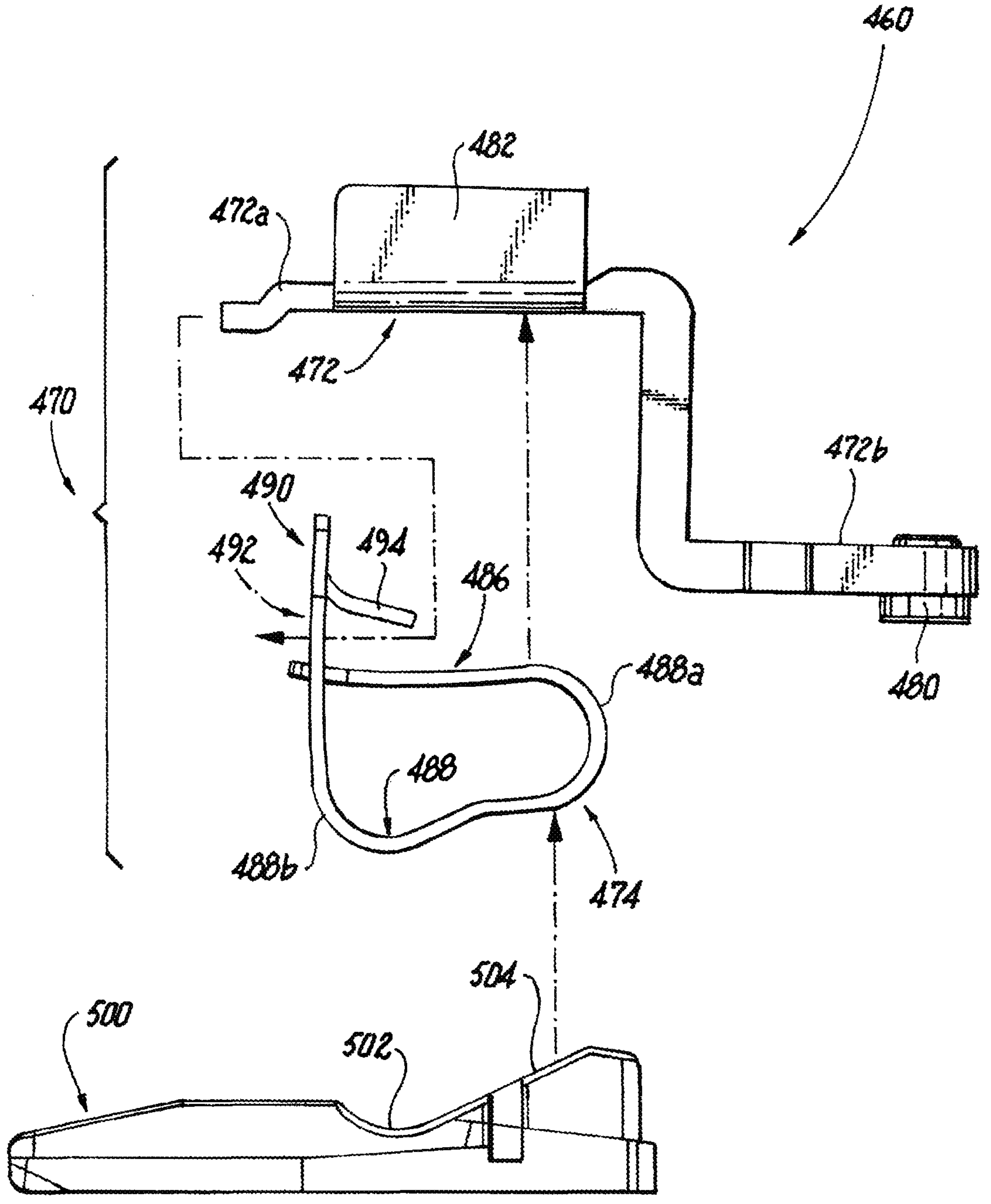
FIG. 39 is an exploded side elevation view of a wire termination assembly of FIG. 38, illustrating a clamp brace, a clamping member and an activating member.
Figure 40:
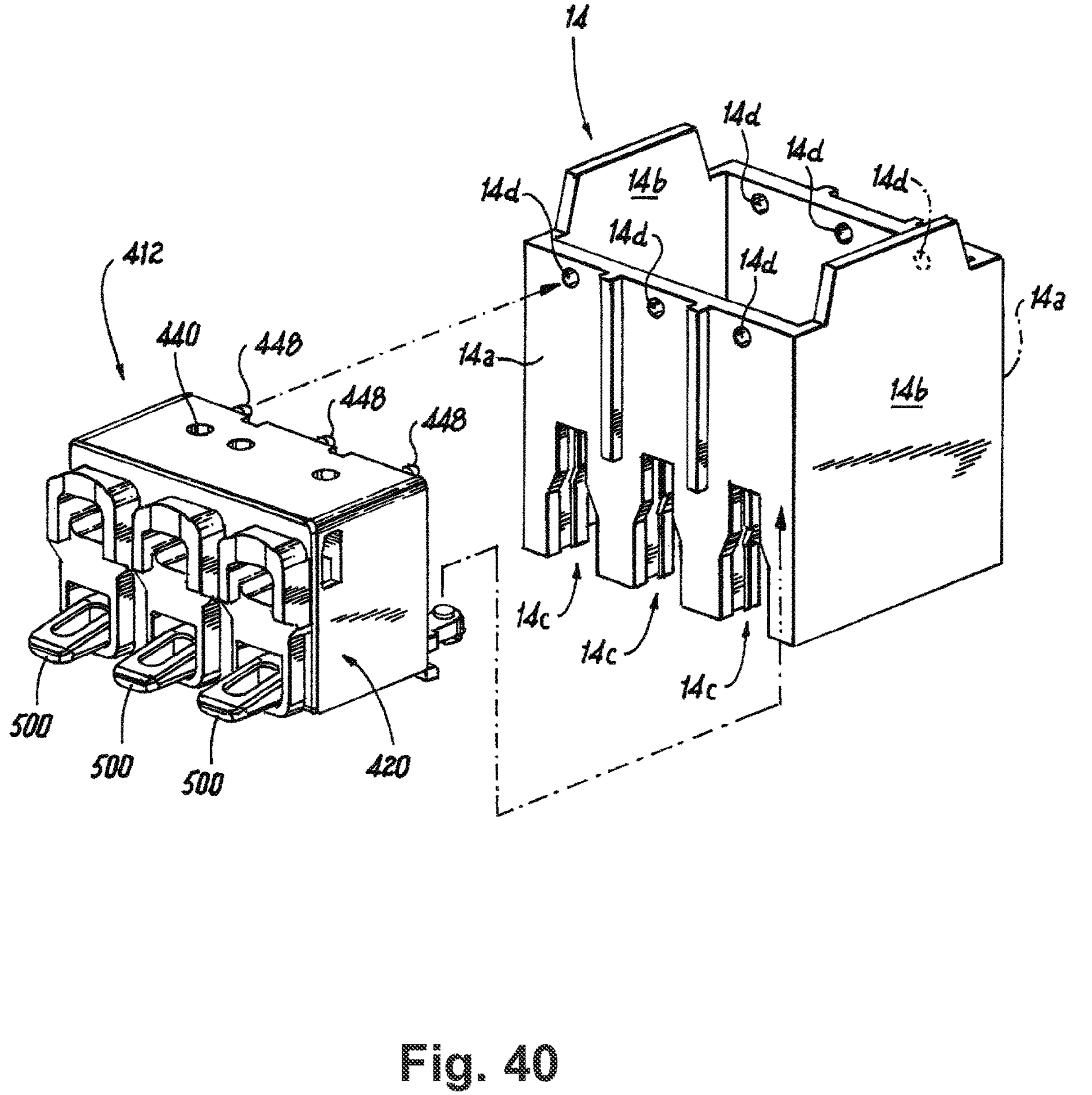
FIG. 40 is an exploded perspective view from a first end of the main body portion and one of the wire attachment assemblies of FIG. 19, illustrating the wire attachment assembly positioned for mating with the main body portion.
Figure 41:
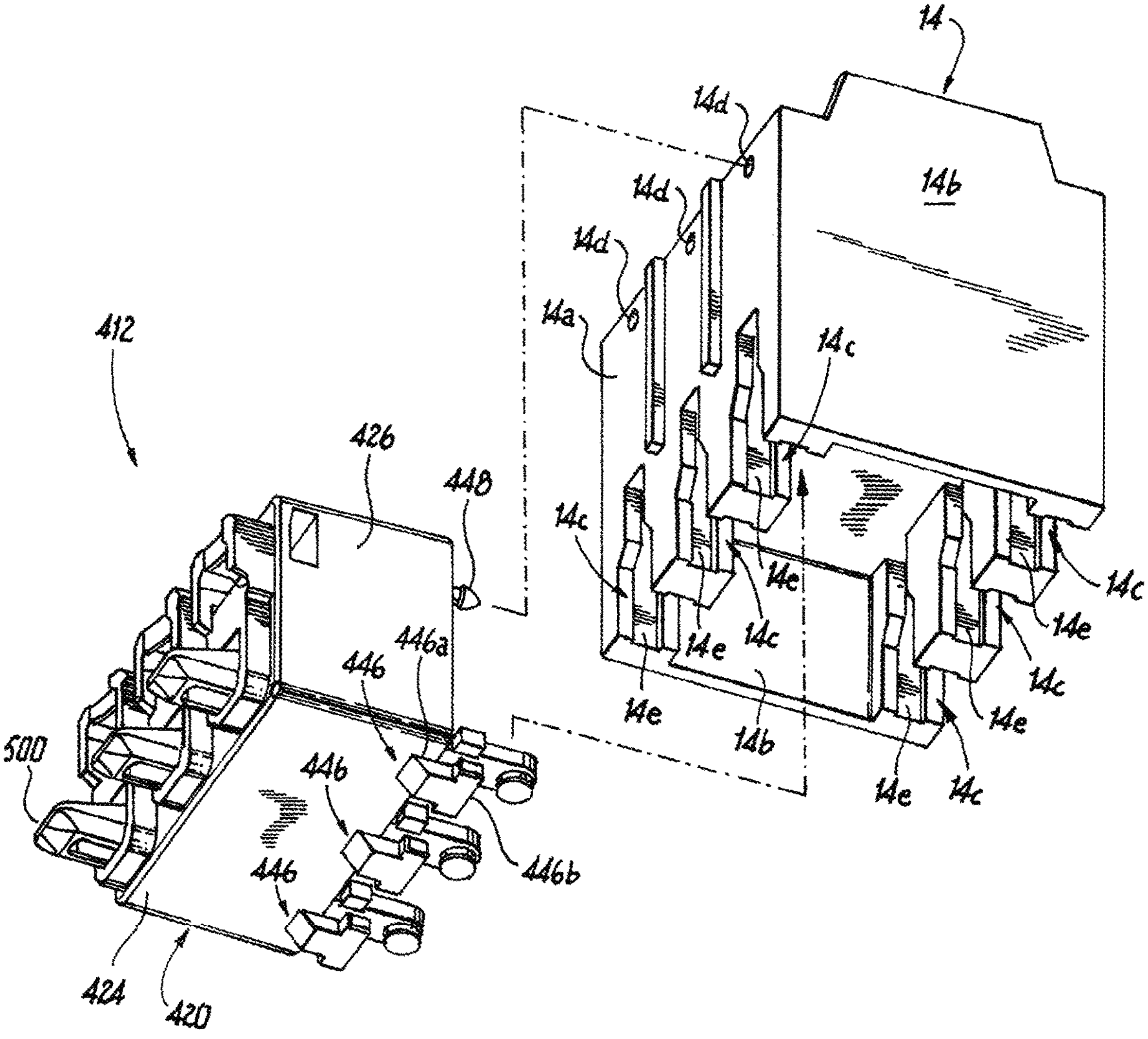
FIG. 41 is an exploded perspective view from a bottom of the main body portion and wire attachment assembly of FIG. 40.
Figure 42:
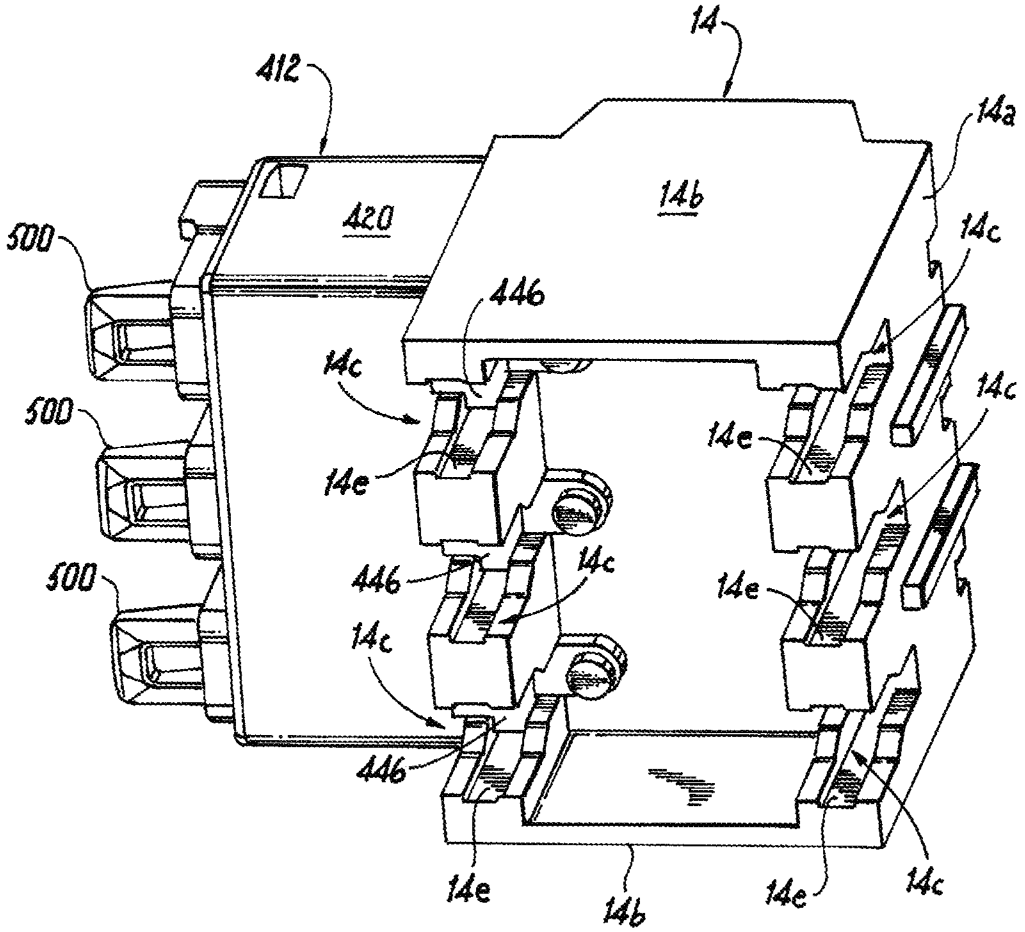
FIG. 42 is a bottom perspective view of the wire attachment assembly of FIG. 41 mated with the main body portion.

Continuing to refer to FIGS. 34-39, in this exemplary embodiment, the wire terminal 470 is a mechanical clamping terminal that may use one or more clamping members 474 that can deflect under a mechanical load applied by the activating member 500 and recover to their initial shape when the mechanical load is removed. The energy stored by the one or more clamping members 474 should be sufficient to apply a constant and continuous force to mechanically secure one or more wires, e.g., wires 700 shown in FIGS. 4 and 5, to the wire terminal 470. In the exemplary configuration shown in FIGS. 37-39, the wire terminal 470 includes a clamp brace 472 and the clamping member 474. The clamp brace 472 is an electrically conductive fixed terminal body that may be a substantially planar shaped member or an arcuate shaped member having a first end 472*a* secured to the clamping member 474. The clamp brace 472 may be mechanically fitted to, e.g., clipped to the clamping member 474, or secured to the clamping member 474 by, for example, a solder joint, a brazed joint, or a welded joint. The clamp brace 472 has a second end 472*b* that extends from the housing 420 of the wire attachment assembly 412 into the main body portion 14 of the switch housing 410. Preferably, the second end 472*b* of the clamp brace 472 is fixed or secured to the main body portion 14 of the switch housing 410 to limit and possibly prevent flexing of the second end 472*b* of the clamp brace 472 during operation of the switch 400. In an exemplary embodiment, a portion of the second end 472*b* of the clamp brace 472 may be positioned within slots on a portion of the main body portion 14 of the switch housing 410. Further, a portion of the second end 212*b* of the clamp brace 212 may rest on or be secured to a wall of and/or within the main body portion 14 of the switch housing 410 as shown in FIG. 43. By resting the second end 472*b* of the clamp brace 472 on or securing the second end 472*b* of the clamp brace 472 to the wall, flexing of the second end 472*b* of the clamp brace 472 in the direction of arrow "A," seen in FIG. 43, is limited or possibly prevented. The second end 472*b* of the clamp brace 472 may include an electrical contact pad 480 that is configured and dimensioned to contact an electrical contact pad 102 on the switch contact 100 as shown in FIGS. 39 and 43. The clamp brace 472 may include one or more wire guides 482 configured and dimensioned to position and/or maintain the wire, e.g., wire 700 seen in FIGS. 45 and 46, relative to the clamp brace 472.

Continuing to refer to FIGS. 37-39, in the exemplary embodiment shown, the clamping member 474 includes a brace contact member 486, a biasing member 488 and a clamp arm 490. The brace contact member 486 can be a substantially planar shaped member or an arcuate shaped member that is configured to mate with the clamp brace 472 and mechanically fitted to, e.g., clipped to, or is secured to the clamp brace by, for example, a solder joint, a brazed joint, or a welded joint. A non-limiting example of the biasing member 488 is a spring, such as a clamp spring. In the embodiments shown, the biasing member 488 is a spring. However, the present disclosure contemplates other types of mechanisms that can apply a constant and continuous force on the wire to electrically clamp, couple or otherwise connect the wire 700 to the wire terminal 474 in various temperatures and environmental conditions. The biasing member 488 has a first lobe 488*a* and a second lobe 488*b*. The first lobe 488*a* and the second lobe 488*b* are configured to interact with the plunger 500 so that movement of the plunger relative to the biasing member 488 is translated to the application of a mechanical load on the biasing member 488 or the removal of the mechanical load on the biasing member. For example, the plunger 500 can be a rectangular shaped member having a notch 502 that is configured to receive the second lobe 488*b* of the biasing member 488, as shown in FIGS. 37-39. The notch 502 has a camming surface 504 that rides along the biasing member 488 when the plunger 500 is moved in the direction of arrow "B," seen in FIG. 45, applying a mechanical load on the biasing member 488 causing the biasing member to deflect in the direction of arrow "C" toward the open position. The clamp arm 490 extends from the second lobe 488*b* of the biasing member 488 toward the clamp brace 472 as shown. The clamp arm 490 has an elongated opening 492, seen in FIG. 37, configured to receive a portion of the clamp brace 472 and at least a portion of a wire press member 494. The wire press member 494 is configured to contact and press a wire, e.g., wire 700 seen in FIGS. 45 and 46, against the clamp brace 472 when the wire is positioned between the clamp brace 472 and the wire press member 494 and the clamping member 474 is in the closed position, as shown in FIG. 46. The clamp arm 490 is movable relative to the clamp brace 472 between the closed position, seen in FIGS. 44 and 46, and the open position, seen in FIG. 45.

As noted, the wire terminal 470 can connect to electrical conductors of different sizes. For example, if the electrical wiring device, e.g., switch 400, is rated for 20 amps, then the wire terminal 470 should also be configured and rated for at least 20 amps. The wire size, i.e., the bare conductor size, for 20 amps is 12 AWG wire such that the clamp arm 490 should be able to move to an open position where the outer diameter of 12 AWG wire can fit. As another example, if the electrical wiring device is rated for 30 amps, then the wire terminal 470 should also be rated for at least 30 amps. The wire size, i.e., the bare conductor size, for 30 amps is 10 AWG wire such that the clamp arm 490 should be able to move to an open position where the outer diameter of 10 AWG wire can fit. As another example, if the electrical wiring device is rated for 40 amps, then the wire terminal 470 should also be rated for at least 40 amps. The wire size, i.e., the bare conductor size, for 40 amps is 8 AWG wire such that the clamp arm 490 should be able to move to an open position where the outer diameter of 8 AWG wire can fit. As another example, if the blade-type electrical receptacle is rated for 50 amps, then the wire terminal 470 should also be rated for at least 50 amps. The wire size, i.e., the bare conductor size, for 50 amps is 6 AWG wire such that the clamp arm 490 should be able to move to an open position where the outer diameter of 6 AWG wire can fit.

Figure 44:
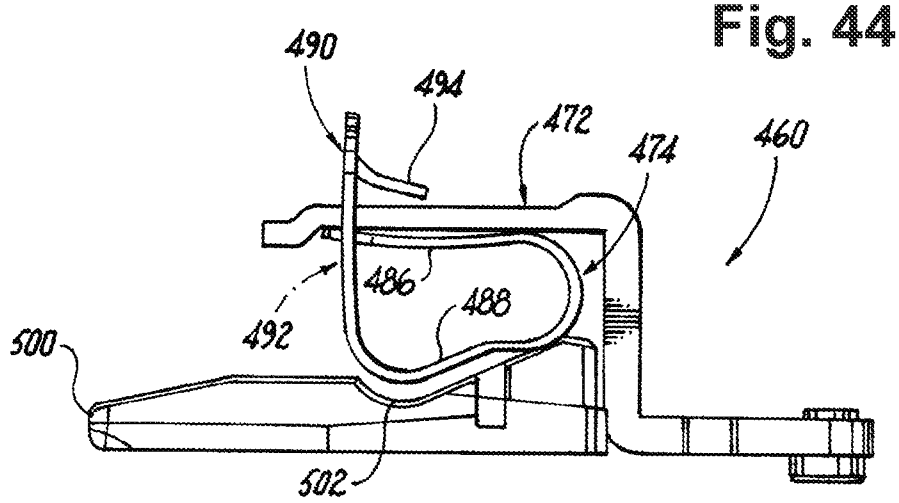
FIG. 44 is the side elevation view of the wire termination assembly of FIG. 38, illustrating the wire termination assembly in a closed position.
Figure 45:
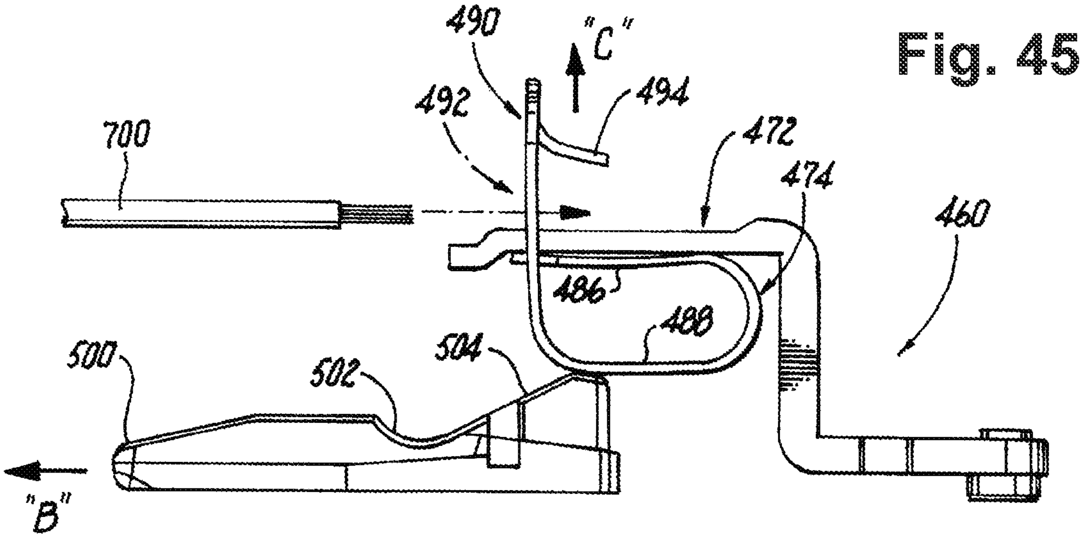
FIG. 45 is the side elevation view of the wire termination assembly of FIG. 44, illustrating the wire termination assembly in an open position and an electrical wire being inserted into the wire termination assembly.
Figure 46:
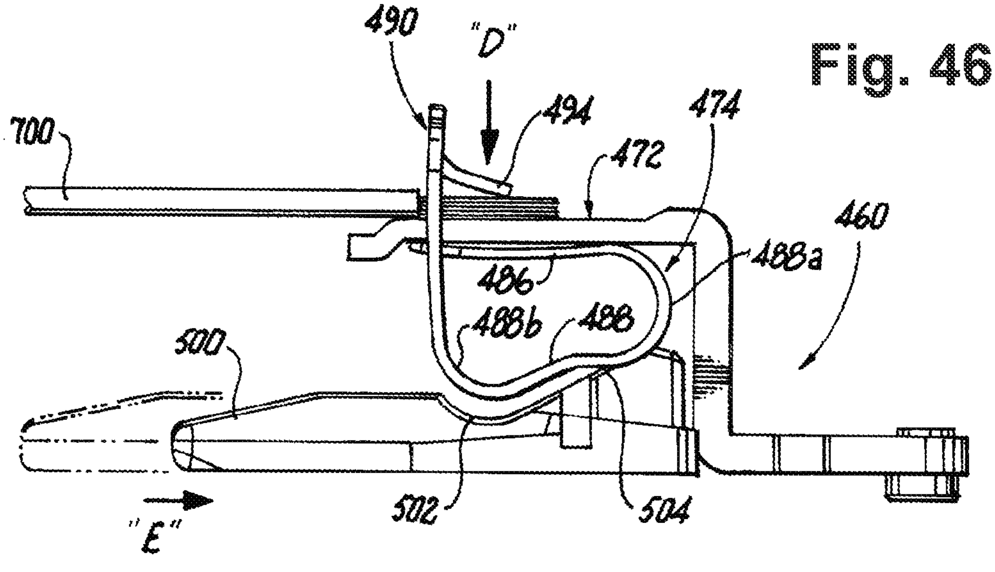
FIG. 46 is the side elevation view of the wire termination assembly of FIG. 45, illustrating the wire termination assembly returned to the closed position so that the electrical wire is clamped to the wire termination assembly.
Figure 47:
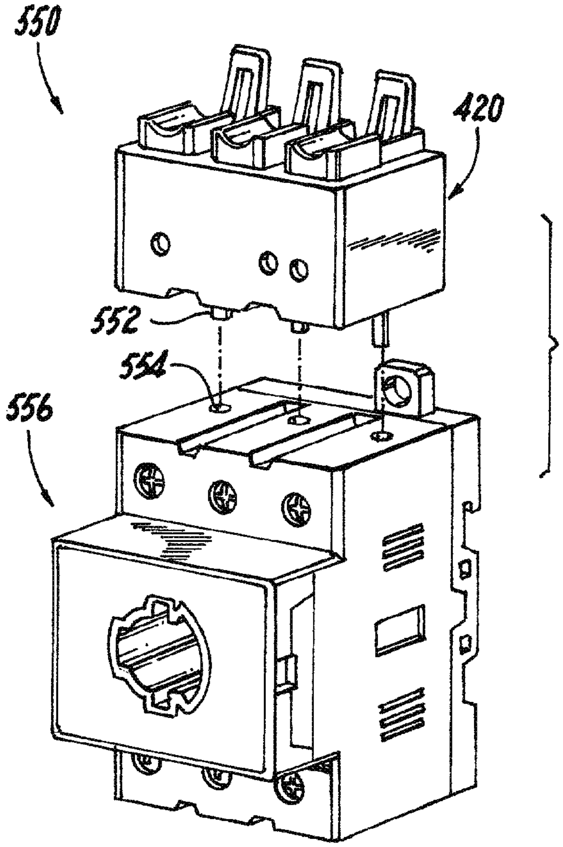
FIG. 47 is a top perspective view of another exemplary embodiment of a wire attachment assembly according to the present disclosure, illustrating the wire attachable assembly staged for attachment to a conventional multi-pole electrical wiring device.
Figure 48:
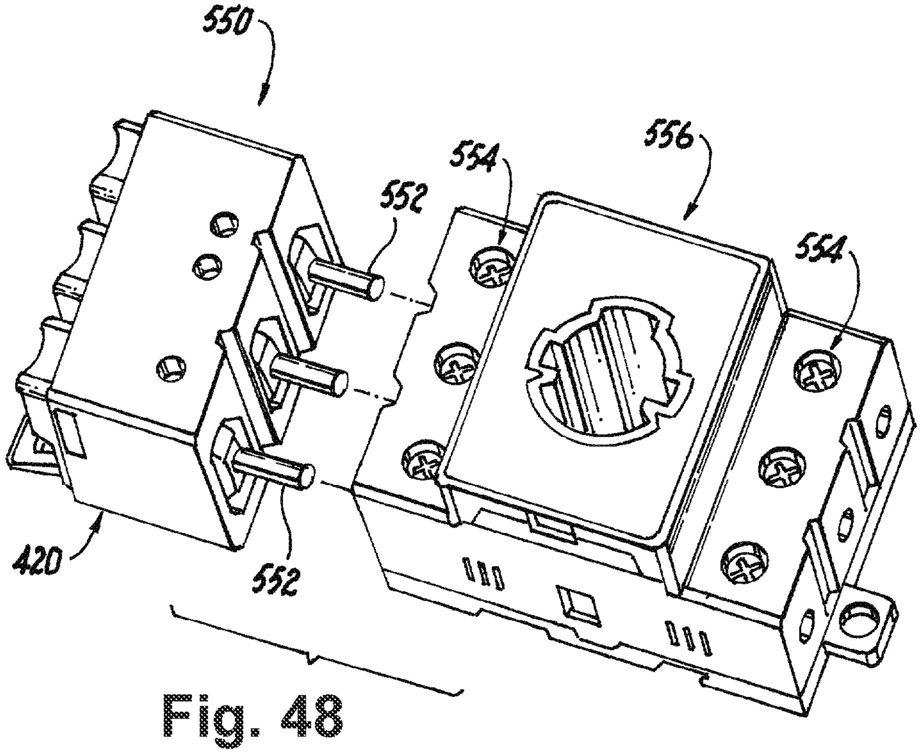
FIG. 48 is another top perspective view of the wire attachment assembly of FIG. 47.
Figure 49:
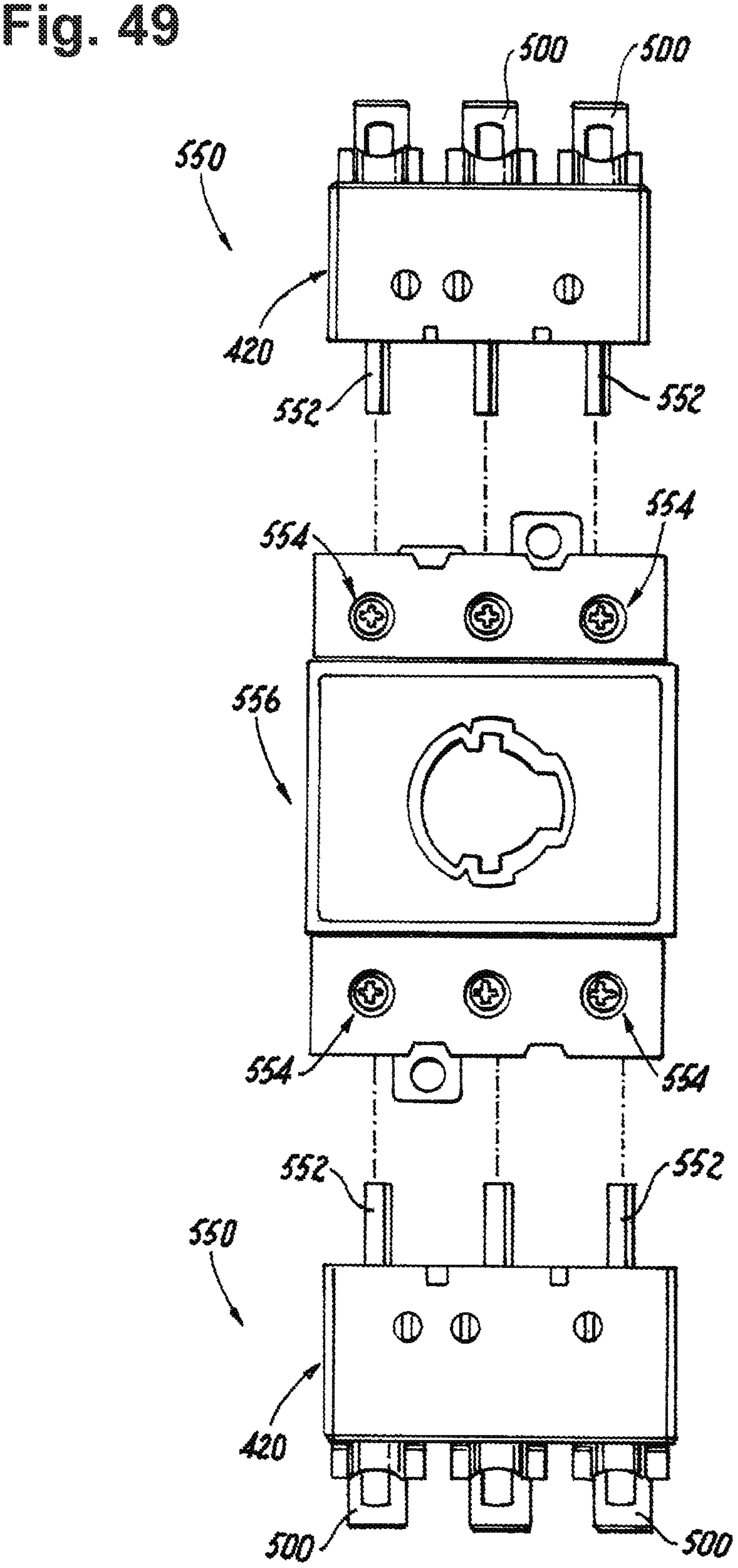
FIG. 49 is a top plan view of the wire attachment assembly of FIG. 47, illustrating two wire attachable assemblies staged for attachment to the conventional multi-pole electrical wiring device.
Figure 50:
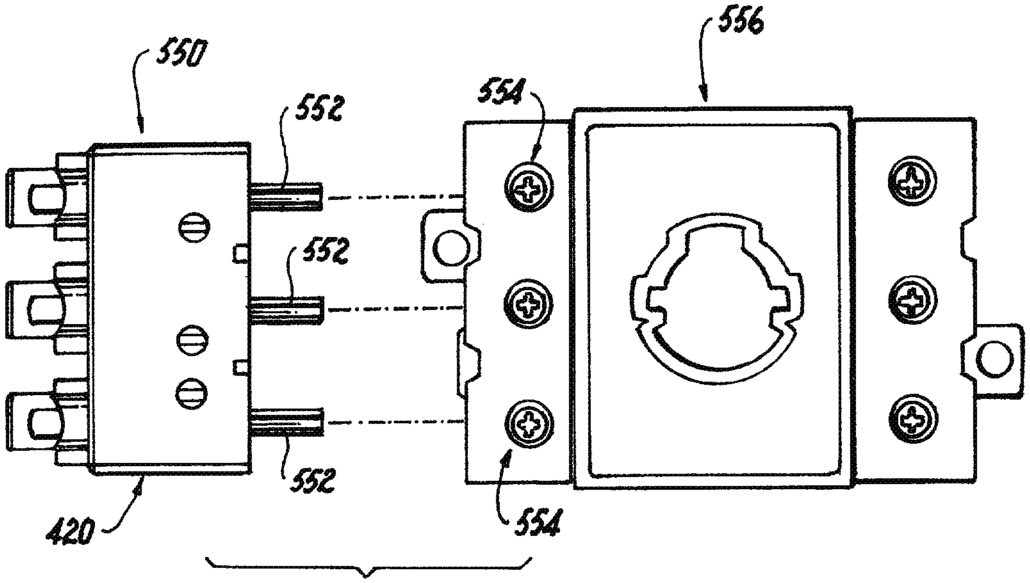
FIG. 50 is another top plan of the wire attachment assembly of FIG. 47.
Figure 51:
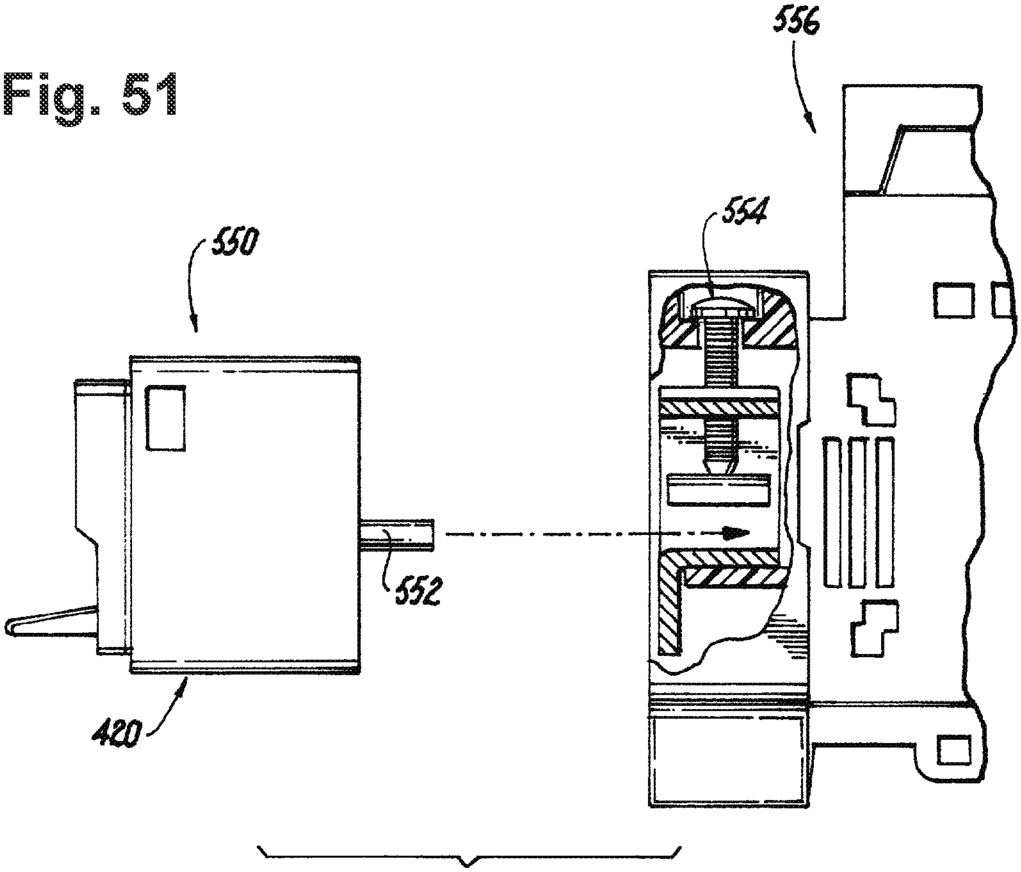
FIG. 51 is a side elevation view of the wire attachment assembly of FIG. 47.
Figure 52:
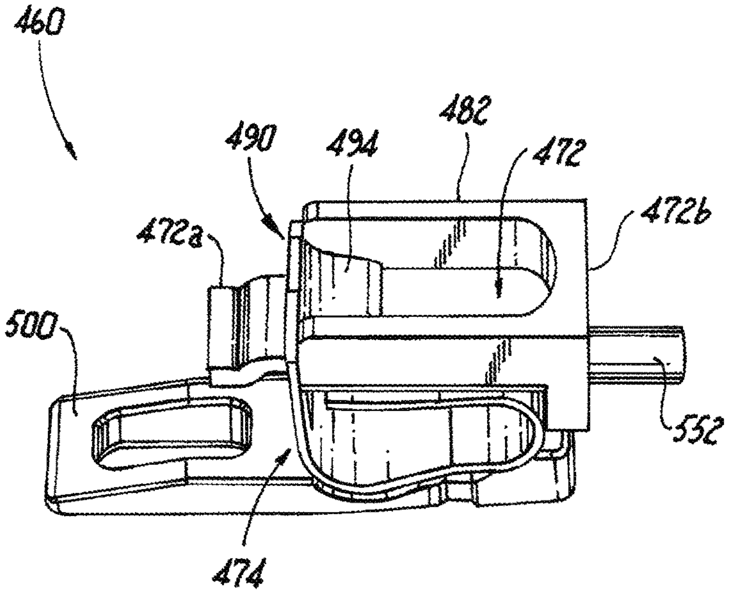
FIG. 52 is a top perspective view of another exemplary embodiment of a wire termination assembly according to the present disclosure.
Figure 53:
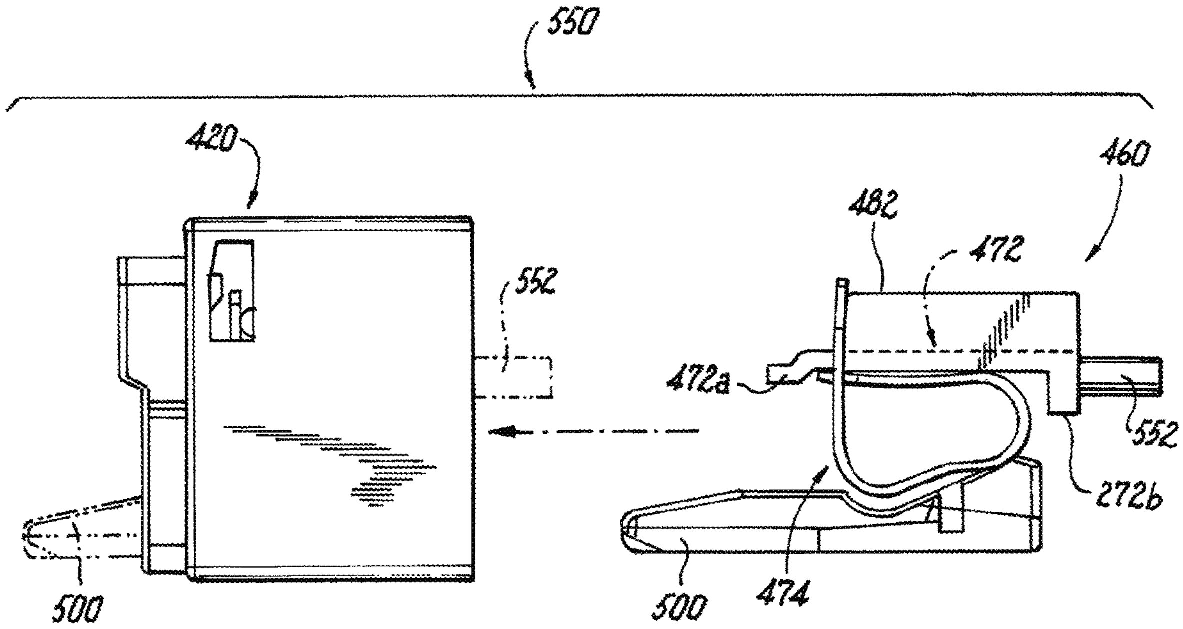
FIG. 53 is a side elevation view of the wire termination assembly of FIG. 52 staged for insertion into a housing of the wire attachment assembly of FIG. 47.

The biasing member 488 is made of a resilient material with sufficient stiffness to flex when the plunger 500 pushes the biasing member 488 from the closed position, seen in FIG. 44, to the open position, seen in FIG. 45. As noted, when in the closed position, the biasing member 488 can apply a force, e.g., a spring force, through the wire press member 494 to a wire 700 inserted between the wire press member 494 and the clamp brace 472 as shown in FIG. 46. As a non-limiting example, the biasing member 488 may be spring. A non-limiting example of a spring is a clamp spring. The biasing member 488 can be made of metal, such as spring steel. The biasing force, e.g., spring force, exerted by the biasing member 488 clamping a wire between the wire press member 494 and the clamp brace 472 should be sufficient to apply a constant and continuous force on the wire, e.g., wire 700, to electrically clamp, couple or otherwise connect the wire 700 to the wire terminal 470 in various temperatures and environmental conditions. The biasing member 488 is configured so that it is normally biased toward the closed position, i.e., in the direction of arrow "D," seen in FIG. 46, which is away from the clamp brace 472, as seen in FIG. 46. In the normal position of the biasing member 488 without a conductor inserted into the elongated opening 492, the wire press member 494 of the clamp arm 490 can contact the clamp brace 472, as shown in FIG. 44.

Figure 19:
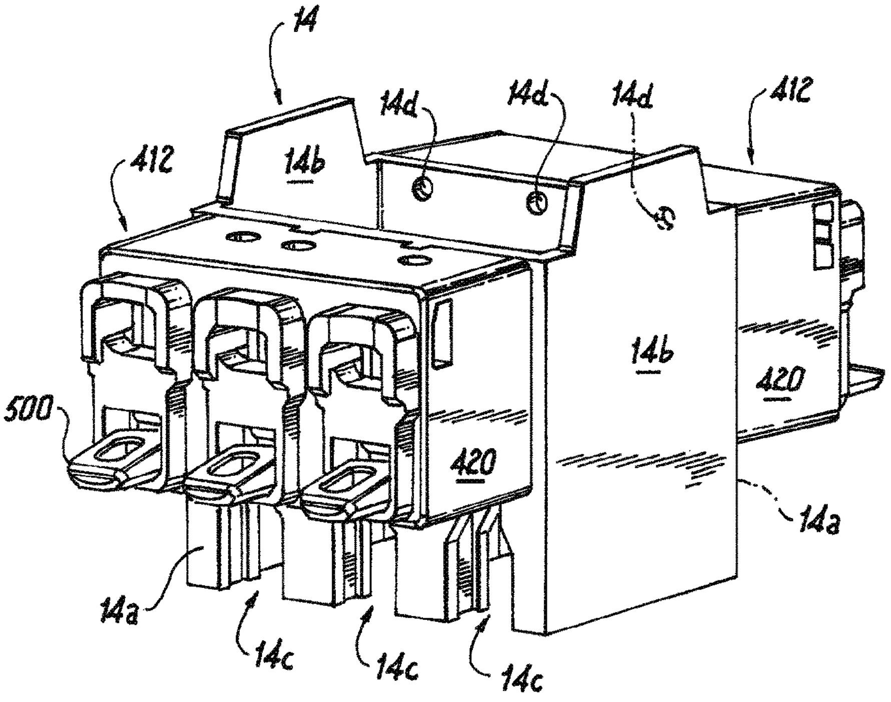
FIG. 19 is a side perspective view of a main body portion of a housing of the multi-pole electrical wiring device of FIG. 18, illustrating an orientation of a pair of wire attachment assemblies mated to the main body portion.
Figure 20:
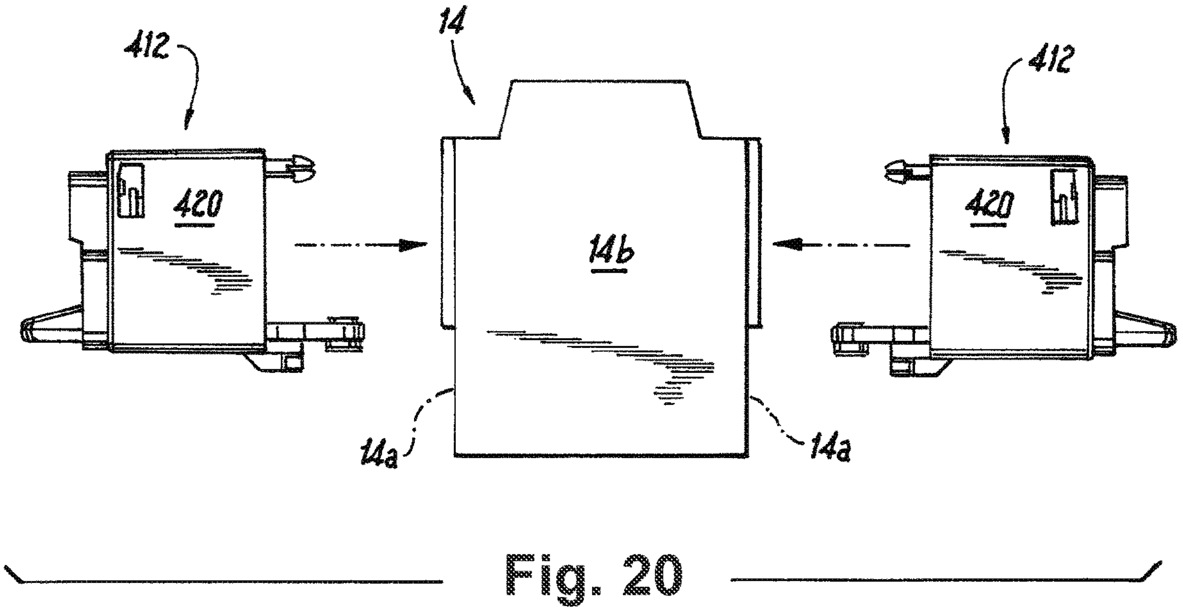
FIG. 20 is an exploded side elevation view of the main body portion and multiple wire attachment assemblies of FIG. 19, illustrating the orientation of the wire attachment assemblies relative to the main body portion.
Figure 21:
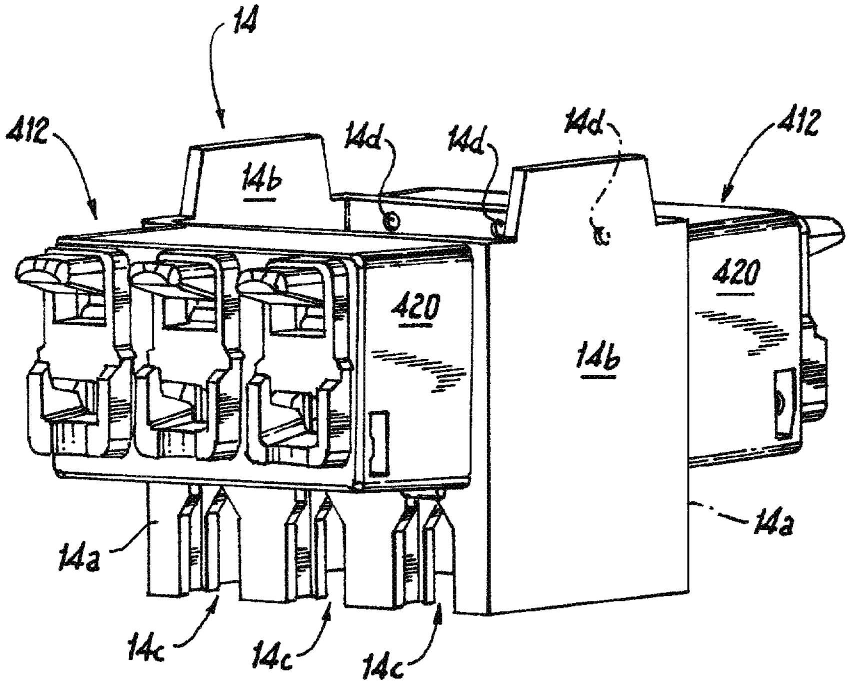
FIG. 21 is a side perspective view of a main body portion of a housing of the multi-pole electrical wiring device according to the present disclosure, illustrating another orientation of the pair of wire attachment assemblies mated to the main body portion.
Figure 22:
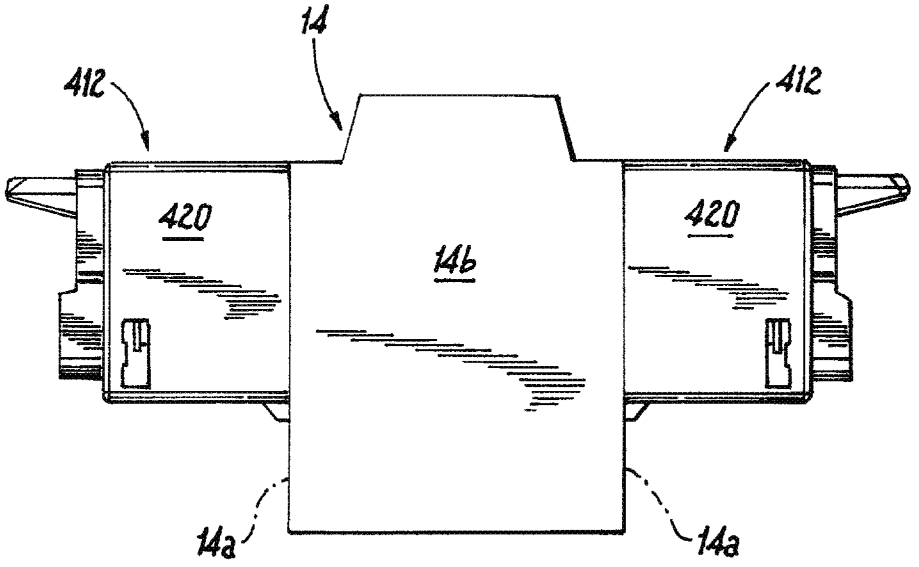
FIG. 22 is a side elevation view of the orientation of the wire attachment assemblies relative to the main body portion of FIG. 21.
Figure 23:
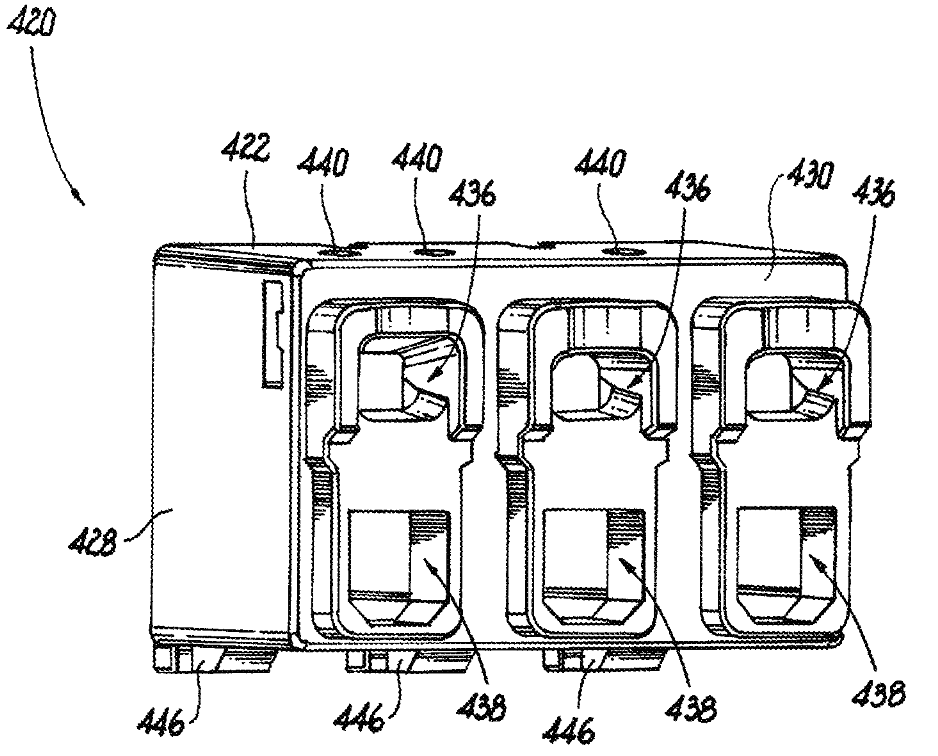
FIG. 23 is a front perspective view of a housing of the wire attachment assembly of FIG. 18, illustrating multiple wire receiving openings and multiple activating member openings in the housing.
Figure 24:
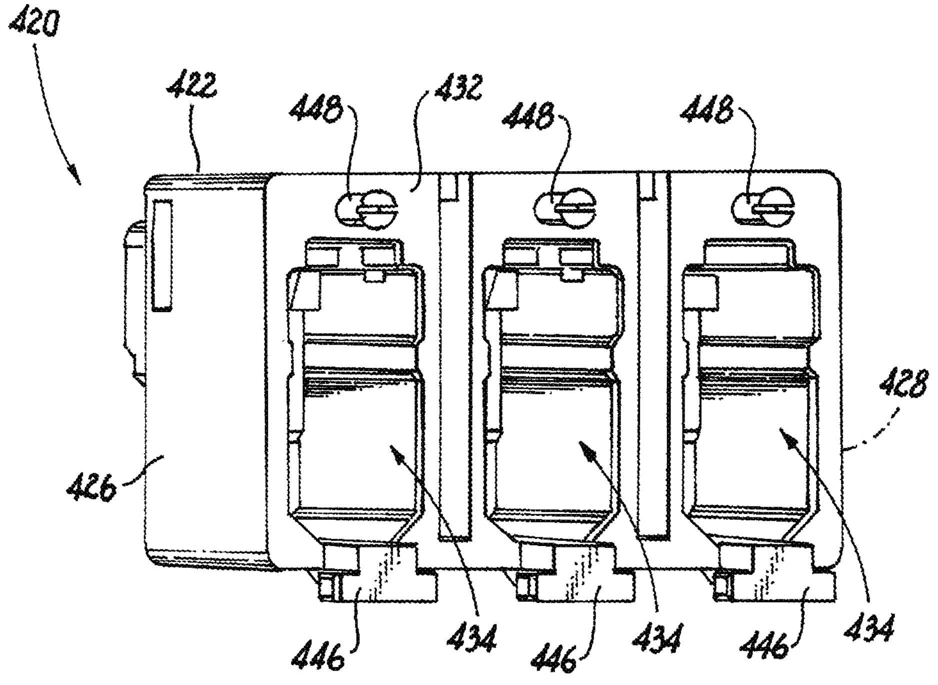
FIG. 24 is a rear perspective view of the housing of the wire attachment assembly of FIG. 23, illustrating multiple wire termination cavities in the housing.
Figure 25:
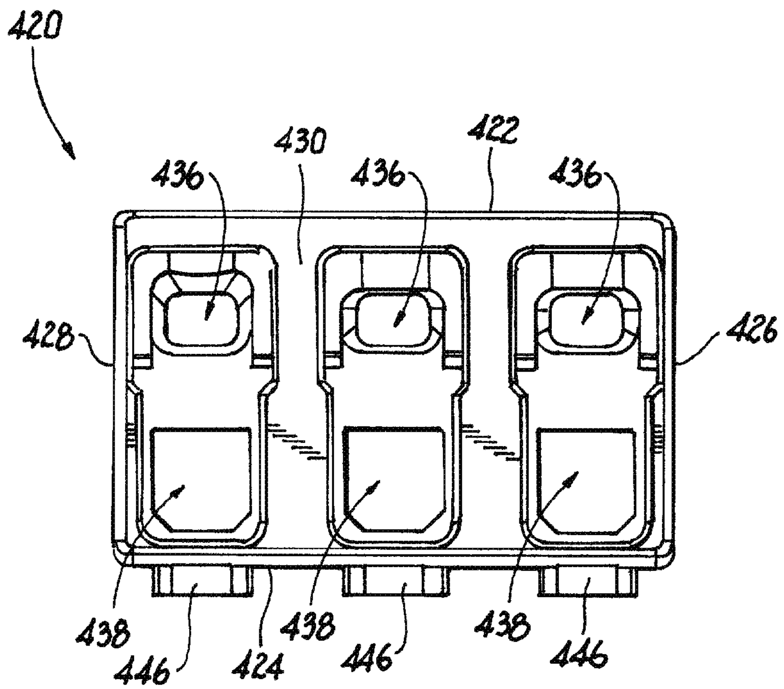
FIG. 25 is a front elevation view of the housing of FIG. 23.

Referring to FIGS. 18-20 and 40-42, each wire attachment assembly 412 is mated with the main body portion 14 of the switch housing 410 and secured to the switch housing 410 when the base 22 is attached to the switch housing 410. In the embodiment of FIGS. 19 and 20, each wire attachment assembly 412 is mated to the main body portion 14 so that the activating member 500 of the wire termination assembly 460 is oriented to be closer to the base 22 of the switch housing 410. In the embodiment of FIGS. 21 and 22, each wire attachment assembly 412 is mated to the main body portion 14 so that the activating member 500 of the wire termination assembly 460 is oriented to be closer to the top portion 20 of the switch housing 410. To mate the wire attachment assembly 412 to the main body portion 14 of the switch housing 410, the rails 446*b* of the one or more assembly interlocking members 446 extending from the housing 420 are positioned within tracks 14*e* in walls 14*a* of the main body portion 14 defining notches 14*c*. The one or more assembly retaining members 448 are then inserted into the apertures 14*d* in the main body portion 14 to mate the wire attachment assembly 412 to the main body portion 14 of the switch housing 410. As noted, when the base 22 of the switch housing 410 is attached to the main body portion 14, the wire attachment assemblies 412 are prevented from being detached from the main body portion 14 of the switch housing 410.

Referring to FIGS. 14, 15 and 44-46, an exemplary embodiment of a use scenario for the switch 400 described herein is shown. In this exemplary embodiment, a 30 amp, three-phase electrical motor 300 is controlled by a disconnect switch assembly 310. The disconnect switch assembly 310 includes an electrical enclosure or electrical box 312 having a main body 314 and a removable cover 316. For ease of description, the electrical enclosure or electrical box 312 may also be referred to herein as the "enclosure" in the singular and the "enclosures" in the plural. The enclosure 312 may be a weatherproof or watertight enclosure. A switch 400 is secured in the main body 314 of the enclosure 312. As described herein, the switch 400 includes two wire attachment assemblies 412 that include wire termination assemblies 460 to terminate electrical conductors or wires within the enclosure 312. To connect wires within the enclosure 312 to the switch 400, an installer, e.g., an electrician, strips the insulation from the end of each wire. In the exemplary embodiment shown in FIGS. 14-15, the switch 400 is a three-pole switch and each wire attachment assembly 412 has three wire termination assemblies 460, such that six wires can be connected to the switch 400. The six wires include line side phase 1, phase 2 and phase 3 wires, and load side phase 1, phase 2 and phase 3 wires. However, it is also contemplated that each wire attachment assembly 412 could be configured to electrically connect more than three wires to the wire termination assemblies 460. The plunger 500 for each wire termination assembly 460 extends through one of the one or more activating member openings 438 in the wire attachment assemblies 412. The plunger 500 of each wire termination assembly 460 extending from the housing 420 is then moved, e.g., pulled, in the direction of arrow "B," seen in FIGS. 44 and 45, which in this case is outward relative to the housing 420 of the wire attachment assembly 412. Moving the plunger 500 in the direction of arrow "B" causes the camming surface 504 of the notch 502 in the plunger 500 to ride along the biasing member 488 applying a mechanical load on the biasing member 488. Applying a mechanical load on the biasing member 488, causes the biasing member 488 to deflect in the direction of arrow "C," seen in FIG. 45, from the closed position toward the open position. With the wire terminals 470 in the open position, the electrical wires 700 are then inserted into the appropriate wire receiving opening 436 in the housing 420 in the wire attachment assembly 412. The wire receiving openings 436 also guide the bare end of the wires 700 into the portion of the elongated opening 492, seen in FIG. 37, of the clamping member 474 between clamp brace 472 and wire press member 494. When the bare end of each wire 700 is positioned between the clamp brace 472 and the wire press member 494, the respective plunger 500 is then moved, e.g., pushed in the direction of arrow "E," back into the activating member opening 438 in the housing 420 of the wire attachment assembly 412. Moving the plungers 500 in the direction of arrow "E" removes the mechanical load applied by the plunger 500 on the biasing member 488 so that the energy stored by the biasing member 488 moves the biasing member 488 to the closed position with sufficient force to secure or clamp the wire 700 between the clamp brace 472 and the wire press member 494 completing an electrically conductive path between the wire 700 and the wire termination assembly 460. It is noted that when the plunger 500 is moved in the direction of arrow "B" to a first position, plunger 500 extends out of the housing 420 of the wire attachment assembly 412 a distance that is greater than when the plunger 500 is moved in the direction of arrow "E" to a second position. The second direction may be a direction that is opposite the first direction. In addition, it is noted that when the plunger is moved to the first position or the second position, the plunger 500 may remain in the first position or the second position until the plunger 500 is manually moved to the other position.

With the wires 700 connected to the switch 400 and the motor 300, when the control knob 318 rotatably attached to the switch cover 316 is rotated from an "off" position to an "on" position, the drive rod 320 attached to the control knob 318 rotates the on-off control assembly 24 causing contact pads 102 the switch contact 100 of the switch 400 into engagement with the electrical contact pads 480 on the clamp brace 472 of the wire termination assemblies 460 completing an electrically conductive path from the wires 700 to the motor 300 turning the motor on.

Referring now to FIGS. 47-53, another exemplary embodiment of a wire attachment assembly according to the present disclosure is shown. In this exemplary embodiment, the wire attachment assembly 550 is substantially the same as the wire attachment assemblies 412 described above such that like elements use the same reference numerals. For example, the housing 420 of the wire attachment assembly is the same as the housing 420 described above. Further, the clamping member 474 of the wire terminal 470 and the activating member 500 of the wire termination assembly 460 are the same as the clamping member 474 and activating member 500 described above. Thus, a detailed description of the housing 420, the clamping member 474 and the activating member 500 are not repeated.

In this exemplary embodiment, a portion of the clamp brace 472 differs. More specifically, the second end 472*b* of the clamp brace 472 includes a contact pin 552 instead of the contact pad 480. The contact pin 552 is configured and dimensioned to extend away from the clamp brace 472 and to fit within the wire terminations 554 of a conventional electrical wiring device 556, such as, for example, the HBLDS3RS Disconnect Switch sold by Hubbell Incorporated, which is incorporated herein in its entirety by reference. Thus, in this exemplary embodiment, the wire attachment assembly 550 is releasably attached to the electrical wiring device 556.

While exemplary embodiments have been chosen to illustrate the invention, it will be understood by those skilled in the art that various changes, modifications, additions, and substitutions are possible, without departing from the scope and spirit of the invention.

What is claimed is:

1. A multi-pole electrical wiring device comprising:

a main housing having an interior that is at least partially hollow; and at least one wire attachment assembly attachable to the main housing, the at least one wire attachment assembly includes:

an assembly housing that is at least partially hollow, the assembly housing having at least one wire receiving opening providing access from an exterior of the assembly housing to the hollow portion of the assembly housing, and at least one activating member opening providing access from an exterior of the assembly housing to the hollow portion of the assembly housing; and at least one wire termination assembly positioned at least partially in the hollow portion of the assembly housing and at least partially in the hollow portion of the interior of the main housing when the at least one wire attachment assembly is attached to the main housing, the at least one wire termination assembly includes:

a wire terminal including a clamp brace connected to a clamping member, the clamping member being movable between a closed position where a wire can be clamped between the clamping member and the clamp brace, and an open position where the wire can be inserted through the at least one wire receiving opening in the assembly housing and between the clamping member and the clamp brace; and an activating member extending at least partially through the at least one activating member opening in the assembly housing, the activating member being interactive with the clamping member such that movement of the activating member in a first direction causes the activating member to apply a mechanical load to the clamping member causing the clamping member to move from the closed position to the open position, and movement of the activating member in a second direction removes the mechanical load from the clamping member so that the clamping member moves from the open position to the closed position.

2. The electrical wiring device according to claim 1, wherein the clamping member includes a wire press member such that the wire can be clamped between the wire press member and the clamp brace.

3. The electrical wiring device according to claim 1, wherein the clamping member comprises a biasing member.

4. The electrical wiring device according to claim 1, wherein the activating member remains in the first position or the second position until manually moved.

5. The electrical wiring device according to claim 1, wherein the movement of the activating member in the second direction is opposite the movement of the activating member in the first direction.

6. The electrical wiring device according to claim 1, wherein the movement of the activating member in the first direction and the second direction is parallel to the clamp brace.

7. The electrical wiring device according to claim 1, wherein the movement of the activating member in the first direction and the second direction is one of linear motion, rotational motion, torque motion, pivotable motion and twist motion.

8. The electrical wiring device according to claim 1, wherein the movement of the activating member in the first direction and the second direction is linear motion.

9. The electrical wiring device according to claim 1, wherein movement of the activating member in the first and second directions is relative to the clamping member.

10. The electrical wiring device according to claim 1, wherein movement of the activating member in the first direction is outward relative to the assembly housing and wherein movement of the activating member in the second direction is inward relative to the assembly housing.

11. The electrical wiring device according to claim 1, wherein when in the closed position the clamping member can clamp the wire with a force that is substantially perpendicular to a longitudinal axis of the wire.

12. A multi-pole electrical wiring device comprising:

a main housing having an interior that is at least partially hollow; and a plurality of wire attachment assemblies attachable to the main housing, each of the plurality of wire attachment assemblies includes:

an assembly housing having a plurality of cavities, a plurality of wire receiving openings and a plurality of activating member openings, where one of the plurality of wire receiving openings and one of the plurality of activating member openings provides access from an exterior of the assembly housing to one of the plurality of cavities; and a plurality of wire termination assemblies, where one of the plurality of wire termination assemblies is positioned at least partially the one of the plurality of cavities, each of the plurality of wire termination assemblies includes:

a wire terminal including a clamp brace connected to a clamping member, the clamping member being movable between a closed position where a wire can be clamped between the clamping member and the clamp brace, and an open position where the wire can be inserted through the one of the plurality of wire receiving openings in the housing and between the clamping member and the clamp brace; and an activating member extending at least partially through the one of the plurality of activating member openings in the assembly housing, the activating member being interactive with the clamping member such that movement of the activating member in a first direction causes the activating member to apply a mechanical load to the clamping member causing the clamping member to move from the closed position to the open position, and movement of the activating member in a second direction removes the mechanical load from the clamping member so that the clamping member moves from the open position to the closed position.

13. The electrical wiring device according to claim 12, wherein the clamping member includes a wire press member such that the wire can be clamped between the wire press member and the clamp brace.

14. The electrical wiring device according to claim 12, wherein the clamping member comprises a biasing member.

15. The electrical wiring device according to claim 12, wherein the activating member remains in the first position or the second position until manually moved.

16. The electrical wiring device according to claim 12, wherein the movement of the activating member in the second direction is opposite the movement of the activating member in the first direction.

17. The electrical wiring device according to claim 12, wherein the movement of the activating member in the first direction and the second direction is parallel to the clamp brace.

18. The electrical wiring device according to claim 12, wherein the movement of the activating member in the first direction and the second direction is one of linear motion, rotational motion, torque motion, pivotable motion and twist motion.

19. The electrical wiring device according to claim 12, wherein the movement of the activating member in the first direction and the second direction is linear motion.

20. The electrical wiring device according to claim 12, wherein movement of the activating member in the first and second directions is relative to the clamping member.

21. The electrical wiring device according to claim 12, wherein movement of the activating member in the first direction is outward relative to the assembly housing and wherein movement of the activating member in the second direction is inward relative to the assembly housing.

22. The electrical wiring device according to claim 12, wherein when in the closed position the clamping member for the line side wire termination assemblies and the load side wire termination assemblies can clamp the wire with a force that is substantially perpendicular to a longitudinal axis of the wire.

23. A multi-pole electrical wiring device comprising:

a main housing having an interior that is at least partially hollow;

a line side wire attachment assembly attachable to the main housing, the line side wire attachment assembly includes:

an assembly housing having a plurality of cavities, a plurality of wire receiving openings and a plurality of activating member openings, where one of the plurality of wire receiving openings and one of the plurality of activating member openings provides access from an exterior of the assembly housing to one of the plurality of cavities; and a plurality of wire termination assemblies, where one of the plurality of wire termination assemblies is positioned at least partially the one of the plurality of cavities, each of the plurality of line side wire termination assemblies includes:

a wire terminal including a clamp brace connected to a clamping member, the clamping member being movable between a closed position where a wire can be clamped between the clamping member and the clamp brace, and an open position where the wire can be inserted through the one of the plurality of wire receiving openings in the housing and between the clamping member and the clamp brace; and an activating member extending at least partially through the one of the plurality of activating member openings in the assembly housing, the activating member being interactive with the clamping member such that movement of the activating member in a first direction causes the activating member to apply a mechanical load to the clamping member causing the clamping member to move from the closed position to the open position, and movement of the activating member in a second direction removes the mechanical load from the clamping member so that the clamping member moves from the open position to the closed position; and a load side wire attachment assembly attachable to the main housing, the load side wire attachment assembly includes:

an assembly housing having a plurality of cavities, a plurality of wire receiving openings and a plurality of activating member openings, where one of the plurality of wire receiving openings and one of the plurality of activating member openings provides access from an exterior of the assembly housing to one of the plurality of cavities; and a plurality of wire termination assemblies, where one of the plurality of wire termination assemblies is positioned at least partially the one of the plurality of cavities, each of the plurality of load side wire termination assemblies includes:

a wire terminal including a clamp brace connected to a clamping member, the clamping member being movable between a closed position where a wire can be clamped between the clamping member and the clamp brace, and an open position where the wire can be inserted through the one of the plurality of wire receiving openings in the housing and between the clamping member and the clamp brace; and an activating member extending at least partially through the one of the plurality of activating member openings in the assembly housing, the activating member being interactive with the clamping member such that movement of the activating member in a first direction causes the activating member to apply a mechanical load to the clamping member causing the clamping member to move from the closed position to the open position, and movement of the activating member in a second direction removes the mechanical load from the clamping member so that the clamping member moves from the open position to the closed position.

24. The electrical wiring device according to claim 23, wherein the clamping member for the line side wire termination assemblies and the load side wire termination assemblies includes a wire press member such that the wire can be clamped between the wire press member and the clamp brace.

25. The electrical wiring device according to claim 23, wherein the clamping member for the line side wire termination assemblies and the load side wire termination assemblies is a biasing member.

26. The electrical wiring device according to claim 23, wherein the activating member for the line side wire termination assemblies and the load side wire termination assemblies remains in the first position or the second position until manually moved.

27. The electrical wiring device according to claim 23, wherein the movement of the activating member for the line side wire termination assemblies and the load side wire termination assemblies in the second direction is opposite the movement of the activating member in the first direction.

28. The electrical wiring device according to claim 23, wherein the movement of the activating member for the line side wire termination assemblies and the load side wire termination assemblies in the first direction and the second direction is parallel to the clamp brace.

29. The electrical wiring device according to claim 23, wherein the movement of the activating member for the line side wire termination assemblies and the load side wire termination assemblies in the first direction and the second direction is one of linear motion, rotational motion, torque motion, pivotable motion and twist motion.

30. The electrical wiring device according to claim 23, wherein the movement of the activating member for the line side wire termination assemblies and the load side wire termination assemblies in the first direction and the second direction is linear motion.

31. The electrical wiring device according to claim 23, wherein movement of the activating member for the line side wire termination assemblies and the load side wire termination assemblies in the first and second directions is relative to the clamping member.

32. The electrical wiring device according to claim 23, wherein movement of the activating member for the line side wire termination assemblies and the load side wire termination assemblies in the first direction is outward relative to the housing and wherein movement of the activating member in the second direction is inward relative to the housing.

33. The electrical wiring device according to claim 23, wherein when in the closed position the clamping member for the line side wire termination assemblies and the load side wire termination assemblies can clamp the wire with a force that is substantially perpendicular to a longitudinal axis of the wire.

34. A multi-pole electrical wiring device comprising:

a main housing having an interior that is at least partially hollow;

a line side wire attachment assembly attachable to the main housing, the line side wire attachment assembly includes:

an assembly housing having a plurality of cavities, a plurality of wire receiving openings and a plurality of activating member openings, where one of the plurality of wire receiving openings and one of the plurality of activating member openings provides access from an exterior of the assembly housing to one of the plurality of cavities; and a plurality of wire termination assemblies, where one of the plurality of wire termination assemblies is positioned at least partially the one of the plurality of cavities, each of the plurality of line side wire termination assemblies includes:

a wire terminal including a clamp brace connected to a clamping member, the clamping member being movable between a closed position where a wire can be clamped between the clamping member and the clamp brace, and an open position where the wire can be inserted between the clamping member and the clamp brace; and an activating member extending at least partially through the one of the plurality of activating member openings in the housing, the activating member being interactive with the clamping member such that movement of the activating member in a first direction from a first position to a second position causes the activating member to move the clamping member from the closed position to the open position, and movement of the activating member in a second direction permits the clamping member to automatically move from the open position to the closed position, wherein the activating member remains in the first position or the second position until manually moved; and a load side wire attachment assembly attachable to the main housing, the load side wire attachment assembly includes:

an assembly housing having a plurality of cavities, a plurality of wire receiving openings and a plurality of activating member openings, where one of the plurality of wire receiving openings and one of the plurality of activating member openings provides access from an exterior of the assembly housing to one of the plurality of cavities; and a plurality of wire termination assemblies, where one of the plurality of wire termination assemblies is positioned at least partially the one of the plurality of cavities, each of the plurality of load side wire termination assemblies includes:

a wire terminal including a clamp brace connected to a clamping member, the clamping member being movable between a closed position where a wire can be clamped between the clamping member and the clamp brace, and an open position where the wire can be inserted between the damping member and the clamp brace; and an activating member extending at least partially through the one of the plurality of activating member openings in the housing, the activating member being interactive with the clamping member such that movement of the activating member in a first direction from a first position to a second position causes the activating member to move the clamping member from the closed position to the open position, and movement of the activating member in a second direction permits the clamping member to automatically move from the open position to the closed position, wherein the activating member remains in the first position or the second position until manually moved.

35. The electrical wiring device according to claim 34, wherein the clamping member for the line side wire termination assemblies and the load side wire termination assemblies includes a wire press member such that the wire can be clamped between the wire press member and the clamp brace.

36. The electrical wiring device according to claim 34, wherein the clamping member for the line side wire termination assemblies and the load side wire termination assemblies is a biasing member.

37. The electrical wiring device according to claim 34, wherein the movement of the activating member for the line side wire termination assemblies and the load side wire termination assemblies in the second direction is opposite the movement of the activating member in the first direction.

38. The electrical wiring device according to claim 34, wherein the movement of the activating member for the line side wire termination assemblies and the load side wire termination assemblies in the first direction and the second direction is parallel to the clamp brace.

39. The electrical wiring device according to claim 34, wherein the movement of the activating member for the line side wire termination assemblies and the load side wire termination assemblies in the first direction and the second direction is one of linear motion, rotational motion, torque motion, pivotable motion and twist motion.

40. The electrical wiring device according to claim 34, wherein the movement of the activating member for the line side wire termination assemblies and the load side wire termination assemblies in the first direction and the second direction is linear motion.

41. The electrical wiring device according to claim 34, wherein when in the closed position the clamping member for the line side wire termination assemblies and the load side wire termination assemblies can clamp the wire with a force that is substantially perpendicular to a longitudinal axis of the wire.

42. The electrical wiring device according to claim 34, wherein movement of the activating member for the line side wire termination assemblies and the load side wire termination assemblies in the first and second directions is relative to the clamping member.

43. The electrical wiring device according to claim 34, wherein movement of the activating member for the line side wire termination assemblies and the load side wire termination assemblies in the first direction is outward relative to the housing and wherein movement of the activating member in the second direction is inward relative to the housing.

* * * * *